(12) United States Patent
Huang et al.

(10) Patent No.: US 12,526,797 B1
(45) Date of Patent: Jan. 13, 2026

(54) METHOD AND APPARATUS FOR TRANSPORT BLOCK GENERATION WITH RETRANSMISSION OF MIMO IN A WIRELESS COMMUNICATION SYSTEM

(71) Applicant: ASUS Technology Licensing Inc., Taipei (TW)

(72) Inventors: Yi-Hsuan Huang, Taipei (TW); Ko-Chiang Lin, Taipei (TW); Yi-Hsuan Kung, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/281,413

(22) Filed: Jul. 25, 2025

Related U.S. Application Data

(60) Provisional application No. 63/681,044, filed on Aug. 8, 2024, provisional application No. 63/681,054, filed on Aug. 8, 2024.

(51) Int. Cl.
*H04W 72/00* (2023.01)
*H04W 72/1268* (2023.01)
*H04W 80/02* (2009.01)

(52) U.S. Cl.
CPC ........ *H04W 72/1268* (2013.01); *H04W 80/02* (2013.01)

(58) Field of Classification Search
CPC ................................................. H04W 72/1268
See application file for complete search history.

(56) References Cited

U.S. PATENT DOCUMENTS

2021/0219322 A1\* 7/2021 Chin ...................... H04W 72/23
2022/0210860 A1\* 6/2022 Chin ...................... H04W 72/23
2022/0345252 A1\* 10/2022 Loehr ................... H04L 1/1874

FOREIGN PATENT DOCUMENTS

WO    WO-2020168235 A1 \*  8/2020  ............ H04W 72/23

\* cited by examiner

*Primary Examiner* — Erika A Washington
(74) *Attorney, Agent, or Firm* — Skaar Ulbrich Macari, P.A.

(57) ABSTRACT

Methods, systems, and apparatuses are provided for transport block generation with retransmission of Multi-Input Multi-Output (MIMO) in a wireless communication system, wherein a method comprises receiving, from a network node, a first parameter indicating MIMO layers with a value above four and a second parameter indicating Uplink (UL) skipping, receiving a first UL grant and a second UL grant on a first Physical Downlink Control Channel (PDCCH), wherein the first UL grant is for a retransmission of a first Medium Access Control (MAC) Protocol Data Unit (PDU) and the second UL grant is for a first new transmission, generating a second MAC PDU corresponding to the second UL grant indicated by the first PDCCH if the first MAC PDU is to be retransmitted for the first PDCCH, wherein there is no data available for transmission or for any Logical Channel Group (LCG), and performing the retransmission for the first MAC PDU using the first UL grant, and the first new transmission for the second MAC PDU using the second UL grant.

20 Claims, 10 Drawing Sheets

METHOD AND APPARATUS FOR TRANSPORT BLOCK GENERATION WITH RETRANSMISSION OF MIMO IN A WIRELESS COMMUNICATION SYSTEM

CROSS-REFERENCE TO RELATED APPLICATIONS

The present Application claims priority to and the benefit of U.S. Provisional Patent Application Ser. No. 63/681,044, filed Aug. 8, 2024, and U.S. Provisional Patent Application Ser. No. 63/681,054, filed Aug. 8, 2024; with each of the referenced and listed applications and disclosures hereby fully incorporated herein by reference.

FIELD

This disclosure generally relates to wireless communication networks and, more particularly, to a method and apparatus for transport block generation with retransmission of Multi-Input Multi-Output (MIMO) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for Transport Block (TB) generation with retransmission of Multi-Input Multi-Output (MIMO) such that two TBs are ensured to be available for Uplink (UL) spatial multiplexing with the case that one of the two TBs for a new transmission and the other for retransmission even if there is no data available for transmission.

In various embodiments, a method for a UE in a wireless communication system comprises receiving, from a network node, a first parameter indicating MIMO layers with a value above four and a second parameter indicating UL skipping, receiving a first UL grant and a second UL grant on a first Physical Downlink Control Channel (PDCCH), wherein the first UL grant is for a retransmission of a first Medium Access Control (MAC) Protocol Data Unit (PDU) and the second UL grant is for a first new transmission, generating a second MAC PDU corresponding to the second UL grant indicated by the first PDCCH if the first MAC PDU is to be retransmitted for the first PDCCH, wherein there is no data available for transmission or for any Logical Channel Group (LCG) or in (data) buffer, and performing the retransmission for the first MAC PDU using the first UL grant, and the first new transmission for the second MAC PDU using the second UL grant.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 36.321 V15.11.0, "E-UTRA, MAC protocol specification"; [2] 3GPP TS 36.331 V15.8.0, "E-UTRA, RRC protocol specification"; [3] 3GPP TS 38.214 V18.2.0, "NR Physical layer procedures for data"; [4] 3GPP TS 38.212 V18.2.0, "NR coding and multiplexing"; [5] 3GPP TS 38.211 V18.2.0, "NR coding and multiplexing"; [6] 3GPP TS 36.211 V15.8.1, "E-UTRA, Physical channels and modulations"; [7] 3GPP TS 36.213 V15.8.0, "E-UTRA, Physical layer procedure"; [8] 3GPP TS 36.212 V15.8.0, "E-UTRA, Multiplexing and channel coding"; and [9] 3GPP TS 38.321 V18.2.0, "NR MAC protocol specification". The standards and documents listed above are hereby expressly and fully incorporated herein by reference in their entirety.

Figure 1:
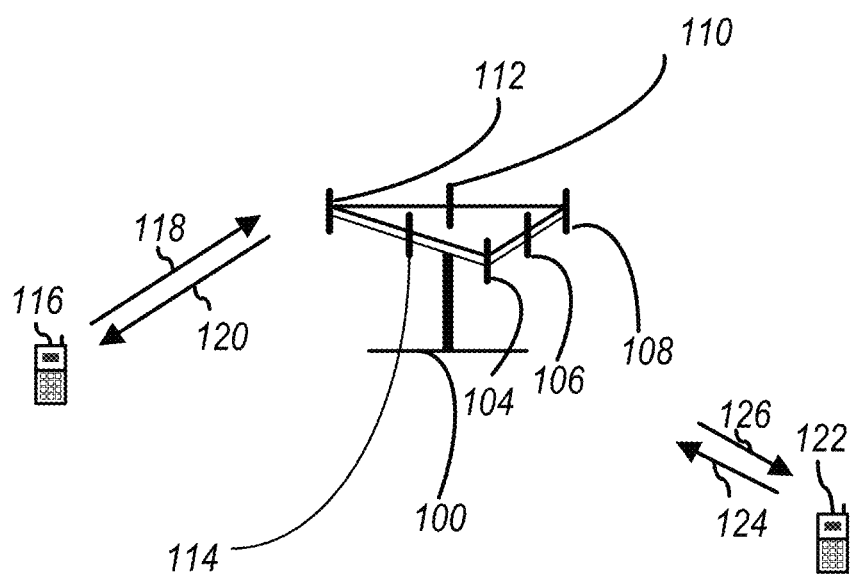
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
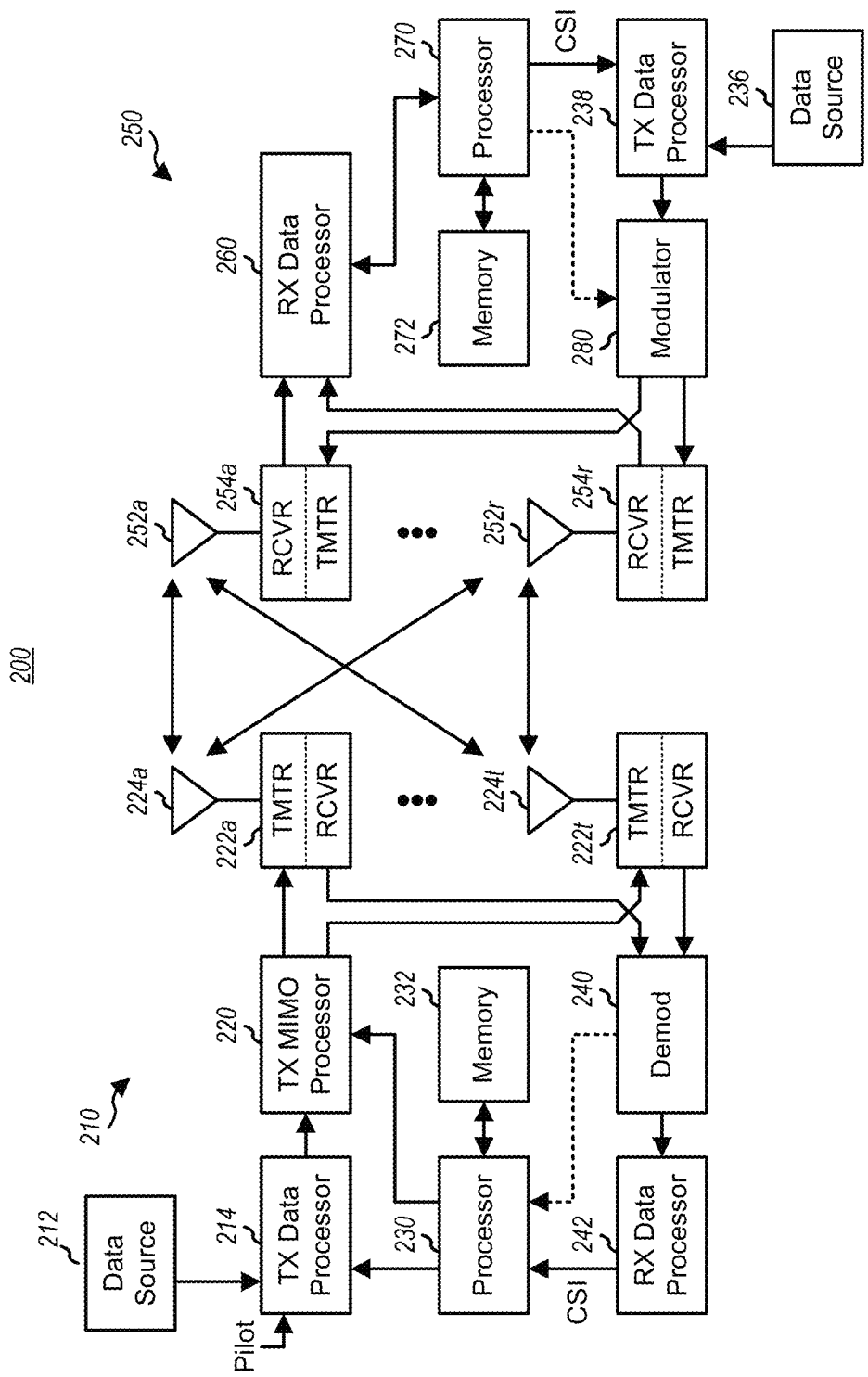
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides Nr modulation symbol streams to Nr transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Nr modulated signals from transmitters 222a through 222t are then transmitted from Nr antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
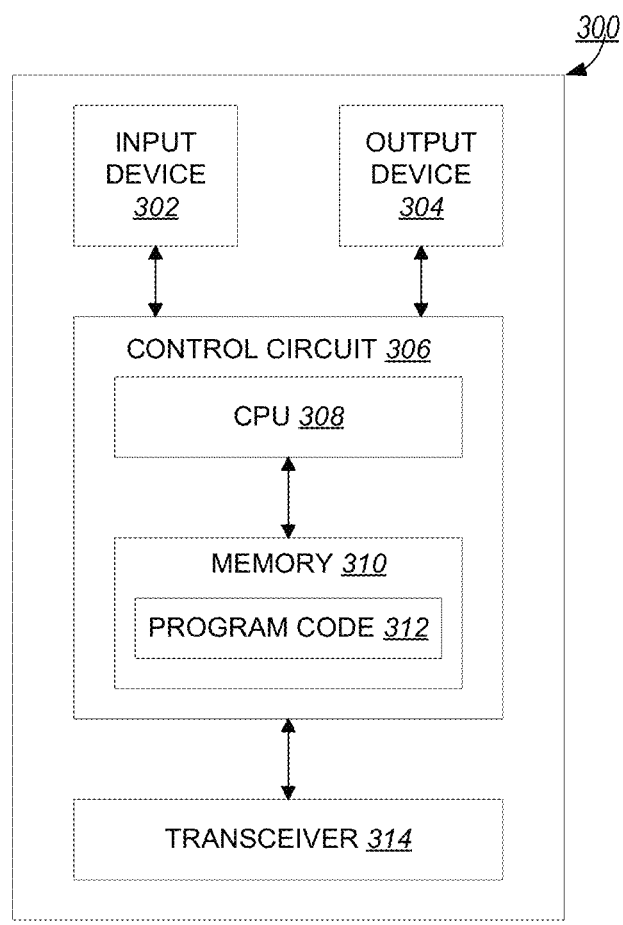
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
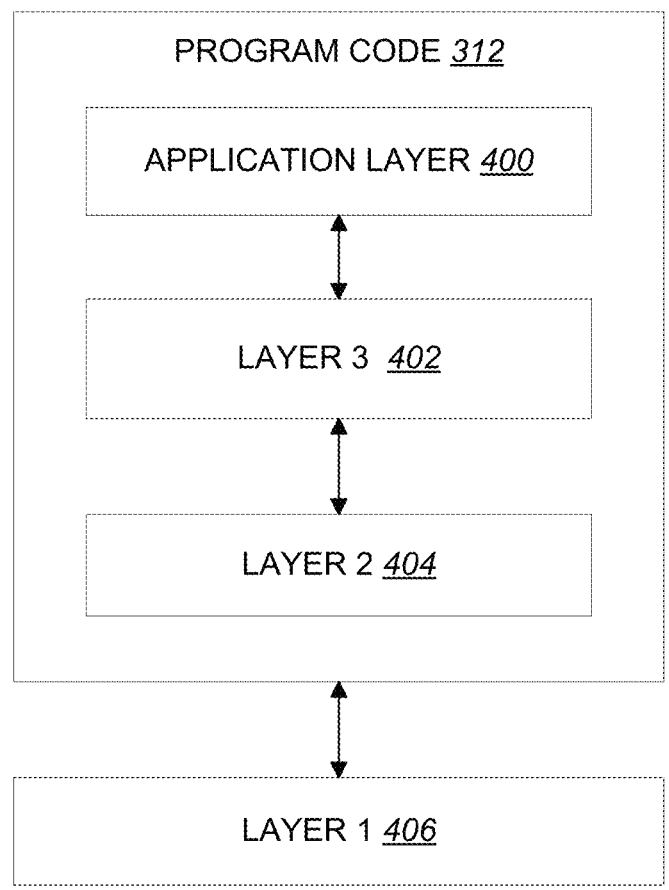
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In LTE, the MAC in a UE receives UL grant(s) at each TTI, and the HARQ entity identifies the HARQ process for each UL grant. For each HARQ process, the UE obtains the MAC PDU to transmit from the Multiplexing and assembly entity. When a UL grant is available, the UE could skip the UL grant (or not generate a MAC PDU, so called uplink skipping), if there is no uplink data (e.g. MAC SDU) and/or if the MAC PDU includes only MAC CE (e.g. MAC CE for a padding BSR or periodic BSR with zero MAC SDUs). The UL transmission procedure is specified in TS 36.321 ([1] 3GPP TS 36.321 V15.11.0) as below:

\* \* \* Quotation Start [1] \* \* \*

5.4 UL-SCH Data Transfer 5.4.1 UL Grant reception

In order to transmit on the UL-SCH the MAC entity must have a valid uplink grant (except for non-adaptive HARQ retransmissions) which it may receive dynamically on the PDCCH or in a Random Access Response or which may be configured semi-persistently or preallocated by RRC. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, a UL Semi-Persistent Scheduling V-RNTI, a AUL C-RNTI, or a Temporary C-RNTI, the MAC entity shall for each TTI and for each Serving Cell belonging to a TAG that has a running timeAlignmentTimer and for each grant received for this TTI and for each SPS configuration that is indicated by the PDCCH addressed to UL Semi-Persistent Scheduling V-RNTI:

if an uplink grant for this TTI and this Serving Cell has been received on the PDCCH for the MAC entity's C-RNTI or Temporary C-RNTI; or if an uplink grant for this TTI has been received in a Random Access Response:

if the uplink grant is for MAC entity's C-RNTI and if the previous uplink grant delivered to the HARQ entity for the same HARQ process was either an uplink grant received for the MAC entity's Semi-Persistent Scheduling C-RNTI, for the MAC entity's UL Semi-Persistent Scheduling V-RNTI, or a configured uplink grant for which the UL HARQ operation was not autonomous:
consider the NDI to have been toggled for the corresponding HARQ process regardless of the value of the NDI.
deliver the uplink grant and the associated HARQ information to the HARQ entity for this TTI.
. . .

5.4.2 HARQ Operation
5.4.2.1 HARQ entity

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

The number of parallel HARQ processes per HARQ entity is specified in TS 36.213, clause 8. NB-IoT has one or two UL HARQ processes.

When the physical layer is configured for uplink spatial multiplexing, as specified in TS 36.213, there are two HARQ processes associated with a given TTI. Otherwise there is one HARQ process associated with a given TTI.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

For each TTI, the HARQ entity shall:
identify the HARQ process(es) associated with this TTI, and for each identified HARQ process:
if an uplink grant has been indicated for this process and this TTI:
if the received grant was not addressed to a Temporary C-RNTI on PDCCH and if the NDI provided in the associated HARQ information has been toggled compared to the value in the previous transmission of this HARQ process; or
if the uplink grant was received on PDCCH for the C-RNTI and the HARQ buffer of the identified process is empty; or
. . .
else if the MAC entity is configured with semiPersistSchedIntervalUL shorter than 10 subframes and if the uplink grant is a configured grant, and if the HARQ buffer of the identified HARQ process is not empty, and if HARQ_FEEDBACK of the identified HARQ process is NACK; or if the MAC entity is configured with ul-SchedInterval shorter than 10 subframes and if the uplink grant is a preallocated uplink grant, and if the HARQ buffer of the identified HARQ process is not empty, and if HARQ_FEEDBACK of the identified HARQ process is NACK:
instruct the identified HARQ process to generate a non-adaptive retransmission.
else:
. . .
obtain the MAC PDU to transmit from the "Multiplexing and assembly" entity, if any;
if a MAC PDU to transmit has been obtained:
deliver the MAC PDU and the uplink grant and the HARQ information to the identified HARQ process;
instruct the identified HARQ process to trigger a new transmission.
else:
flush the HARQ buffer of the identified HARQ process.
else:
. . .
deliver the uplink grant and the HARQ information (redundancy version) to the identified HARQ process;
if UL HARQ operation is autonomous for the identified HARQ process and if the uplink grant is a configured UL grant:
instruct the identified HARQ process to generate a non adaptive retransmission.
else:
instruct the identified HARQ process to generate an adaptive retransmission.
. . .

Each HARQ process is associated with a HARQ buffer.

For synchronous HARQ, each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.
. . .

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.
. . .

If the HARQ entity requests a new transmission, the HARQ process shall:
if UL HARQ operation is synchronous:
set CURRENT_TX_NB to 0;
set HARQ_FEEDBACK to NACK;
set CURRENT_IRV to 0;
else:
if UL HARQ operation is autonomous asynchronous:
set HARQ_FEEDBACK to NACK.
if the uplink grant was addressed to the AUL C-RNTI:
set CURRENT_IRV to 0.
else:
set CURRENT_IRV to the index corresponding to the redundancy version value provided in the HARQ information;
store the MAC PDU in the associated HARQ buffer;
store the uplink grant received from the HARQ entity;
generate a transmission as described below.
If the HARQ entity requests a retransmission, the HARQ process shall:
if UL HARQ operation is synchronous:
increment CURRENT_TX_NB by 1;
if the HARQ entity requests an adaptive retransmission:
store the uplink grant received from the HARQ entity;

set CURRENT_IRV to the index corresponding to the redundancy version value provided in the HARQ information;
if UL HARQ operation is synchronous; or
if UL HARQ operation is autonomous:
set HARQ_FEEDBACK to NACK;
generate a transmission as described below.
else if the HARQ entity requests a non-adaptive retransmission:
if UL HARQ operation is asynchronous or HARQ_FEEDBACK=NACK:
if both skipUplinkTxSPS and fixedRV-NonAdaptive are configured and the uplink grant of the initial transmission of this HARQ process was performed on a configured grant and UL HARQ operation is not autonomous; or
if the uplink grant is a preallocated uplink grant:
set CURRENT_IRV to 0;
else if UL HARQ operation is autonomous:
set CURRENT_IRV to the index corresponding to the redundancy version value selected by the UE implementation.
generate a transmission as described below.
NOTE 1: When receiving a HARQ ACK alone, the MAC entity keeps the data in the HARQ buffer.
...
NOTE 3: For asynchronous HARQ operation, UL retransmissions are triggered only by adaptive retransmission grants, except for retransmissions within a bundle.
To generate a transmission, the HARQ process shall:
if the MAC PDU was obtained from the Msg3 buffer; or
if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or
...
instruct the physical layer to generate a transmission according to the stored uplink grant with the redundancy version corresponding to the CURRENT_IRV value;
increment CURRENT_IRV by 1 if UL HARQ operation is not autonomous;
if UL HARQ operation is synchronous and there is a measurement gap or Sidelink Discovery Gap for Reception at the time of the HARQ feedback reception for this transmission and if the MAC PDU was not obtained from the Msg3 buffer:
set HARQ_FEEDBACK to ACK at the time of the HARQ feedback reception for this transmission.
After performing above actions, if UL HARQ operation is synchronous the HARQ process then shall:
if CURRENT_TX_NB=maximum number of transmissions−1:
flush the HARQ buffer;
...

5.4.3 Multiplexing and Assembly
5.4.3.1 Logical channel prioritization

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD), and optionally allowedTTI-Lengths which sets the allowed TTI lengths. For NB-IoT, prioritisedBitRate, bucketSizeDuration and the corresponding steps of the Logical Channel Prioritisation procedure (i.e., Step 1 and Step 2 below) are not applicable.

The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed on an UL grant with a certain TTI length:
The MAC entity shall allocate resources to the logical channels that are allowed to transmit using the TTI length of the grant, in the following steps:
Step 1: All the allowed logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
Step 2: the MAC entity shall decrement Bj by the total size of MAC SDUs served to logical channel j in Step 1;
NOTE 1: The value of Bj can be negative.
Step 3: if any resources remain, all the allowed logical channels are served in a strict decreasing priority order (regardless of the value of Bj) until either the data for that logical channel or the UL grant is exhausted, whichever comes first. Logical channels configured with equal priority should be served equally.
The UE shall also follow the rules below during the scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data.
if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);
for transmissions on serving cells operating according to Frame Structure Type 3, the MAC entity shall only consider logical channels for which laa-UL-Allowed has been configured;
if a logical channel has been configured with lch-CellRestriction and if PDCP duplication within the same MAC entity (i.e. CA duplication) is activated, for this logical channel the MAC entity shall consider the cells indicated by lch-CellRestriction to be restricted for transmission.
for NB-IoT UEs, BL UEs or UEs in enhanced coverage, if edt-SmallTBS-Enabled is set to TRUE for the corresponding PRACH resource, the UE shall choose a TB size among the set of possible TB sizes as described in clauses 8.6.2 and 16.3.3 of TS 36.213.

The MAC entity shall not transmit data for a logical channel corresponding to a radio bearer that is suspended (the conditions for when a radio bearer is considered suspended are defined in TS 36.331).

If the MAC PDU includes only the MAC CE for padding BSR or periodic BSR with zero MAC SDUs and there is no aperiodic CSI requested for this TTI, as specified in TS \* \* \* Quotation End \* \* \*

In addition, the configurations of uplink skipping could be provided by RRC, as specified in TS 36.331 ([2] 3GPP TS 36.331 V15.8.0) as below:

\* \* \* Quotation Start [2] \* \* \*

The IE MAC-MainConfig is used to specify the MAC main configuration for signalling and data radio bearers. All MAC main configuration parameters can be configured independently per Cell Group (i.e. MCG or SCG), unless explicitly specified otherwise.

MAC-MainConfig information element

```
MAC-MainConfig ::=        SEQUENCE {
  ...
    skipUplinkTx-r14              CHOICE {
      release                       NULL,
      setup                         SEQUENCE {
        skipUplinkTxSPS-r14           ENUMERATED {true} OPTIONAL,   -- Need OR
        skipUplinkTxDynamic-r14       ENUMERATED {true} OPTIONAL    -- Need OR
      }
    }                             OPTIONAL,                          -- Need ON
  ...
}
...
``` skipUplinkTxDynamic

If configured, the UE skips UL transmissions for an uplink grant other than a configured uplink grant if no data is available for transmission in the UE buffer as described in TS 36.321.

36.213, the MAC entity shall not generate a MAC PDU for the HARQ entity in the following cases:

- in case the MAC entity is configured with skipUplinkTx-Dynamic and the grant indicated to the HARQ entity was addressed to a C-RNTI; or
- in case the MAC entity is configured with skipUplinkTxSPS and the grant indicated to the HARQ entity is a configured uplink grant activated by the MAC entity's Semi-Persistent Scheduling C-RNTI or by the MAC entity's UL Semi-Persistent Scheduling V-RNTI; or
- in case the grant indicated to the HARQ entity is a configured uplink grant activated by the MAC entity's AUL C-RNTI.

NOTE 1a: If at least one MAC PDU is to be generated for the HARQ entity for this TTI, the MAC entity generates MAC PDUs corresponding to all UL grants indicated to the HARQ entity for this TTI.

NOTE 2: When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

5.4.3.2 Multiplexing of MAC Control Elements and MAC SDUs

The MAC entity shall multiplex MAC control elements and MAC SDUs in a MAC PDU according to clauses 5.4.3.1 and 6.1.2.

\* \* \* Quotation End \* \* \*

UL spatial multiplexing is introduced to boost UL data rate. Multiple layers with different data could be transmitted on a same time/frequency resource (e.g. resource element(s) or resource block(s)), e.g. by mapping the multiple layers to multiple antenna elements or multiple antenna ports. With UL spatial multiplexing, currently there could be up to four layers and up to two transport blocks (codewords) supported for UL transmission in a TTI, e.g. a subframe. The UE is able to utilize UL spatial multiplexing when a (uplink) transmission mode, e.g. (uplink) transmission mode 2, is configured. PDCCH or DCI could be used to enable or disable spatial multiplexing. For example, the DCI format associated with a single antenna port (e.g. DCI format 0) could be used to disable spatial multiplexing. When the UE receives a DCI format associated with a single antenna port, the UE would perform a corresponding PUSCH transmission without spatial multiplexing (with a single antenna port). The PUSCH transmission without spatial multiplexing comprises a single transport block (or a single codeword). The DCI format associated with spatial multiplexing (e.g. DCI format 4) could be used to enable spatial multiplexing. When the UE receives a DCI format associated with spatial multiplexing, the UE would perform a corresponding PUSCH transmission with spatial multiplexing (with multiple antenna ports). The PUSCH transmission with spatial multiplexing could comprise a single transport block (a single codeword) or two transport blocks (two codewords). The information carried on a DCI format associated with spatial multiplexing could be used to disable a transport block of the corresponding PUSCH transmission. The information carried on a DCI format associated with spatial multiplexing could be used to inform the UE that the corresponding PUSCH transmission comprises a single transport block (one transport block enabled and one transport block disabled) or two transport blocks (both transport blocks enabled). For example, a resource block assignment field and a modulation coding scheme field associated with a transport block in a DCI format associated with spatial multiplexing could be used to inform the UE whether the transport block is enabled or disabled (e.g. a transport bock is disabled if either the combination of $I_{MCS}$=0 and $N_{PRB}$>1 or the combination of $I_{MCS}$=28 and $N_{PRB}$=1 is signalled). More details related to spatial multiplexing are specified in standards [6] 3GPP TS 36.211 V15.8.1, [7] 3GPP TS 36.213 V15.8.0, and [8] 3GPP TS 36.212 V15.8.0, as given below:

\* \* \* Quotation Start [6]\* \* \*

5.3.2A.2 Layer Mapping for Spatial Multiplexing

For spatial multiplexing, the layer mapping shall be done according to Table 5.3.2A.2-1. The number of layers υ is less than or equal to the number of antenna ports P used for transmission of the physical uplink shared channel. The case of a single codeword mapped to multiple layers is only applicable when the number of antenna ports used for PUSCH is four, except for slot-PUSCH and subslot-PUSCH transmission where a single codeword is used irrespective of the number of layers.

TABLE 5.3.2A.2-1

Codeword-to-layer mapping for spatial multiplexing

| Number of layers | Number of codewords | Codeword-to-layer mapping $i = 0, 1, \ldots, M_{symb}^{layer} - 1$ |
|---|---|---|
| 1 | 1 | $x^{(0)}(i) = d^{(0)}(i)$   $M_{symb}^{layer} = M_{symb}^{(0)}$ |
| 2 | 1 | $x^{(0)}(i) = d^{(0)}(2i)$<br>$x^{(1)}(i) = d^{(0)}(2i+1)$   $M_{symb}^{layer} = M_{symb}^{(0)}/2$ |
| 2 | 2 | $x^{(0)}(i) = d^{(0)}(i)$<br>$x^{(1)}(i) = d^{(1)}(i)$   $M_{symb}^{layer} = M_{symb}^{(0)} = M_{symb}^{(1)}$ |
| 3 | 2 | $x^{(0)}(i) = d^{(0)}(i)$<br>$x^{(1)}(i) = d^{(1)}(2i)$   $M_{symb}^{layer} = M_{symb}^{(0)} = M_{symb}^{(1)}/2$<br>$x^{(2)}(i) = d^{(1)}(2i+1)$ |
| 4 | 2 | $x^{(0)}(i) = d^{(0)}(2i)$<br>$x^{(1)}(i) = d^{(0)}(2i+1)$   $M_{symb}^{layer} = M_{symb}^{(0)}/2 = M_{symb}^{(1)}/2$<br>$x^{(2)}(i) = d^{(1)}(2i)$<br>$x^{(3)}(i) = d^{(1)}(2i+1)$ |
| 4[1] | 1[1] | $x^{(0)}(i) = d^{(0)}(4i)$<br>$x^{(1)}(i) = d^{(0)}(4i+1)$   $M_{symb}^{layer} = M_{symb}^{(0)}/4$<br>$x^{(2)}(i) = d^{(0)}(4i+2)$<br>$x^{(3)}(i) = d^{(0)}(4i+3)$ |

NOTE 1: Only used for slot-PUSCH and subslot-PUSCH

\* \* \* Quotation End \* \* \*

\* \* \* Quotation Start [7] \* \* \*

8 Physical Uplink Shared Channel Related Procedures

. . .

If a UE is configured by higher layers to decode PDCCHs with the CRC scrambled by the C-RNTI, the UE shall decode the PDCCH according to the combination defined in Table 8-3 and transmit the corresponding PUSCH if a transport block corresponding to the HARQ process of the PUSCH transmission is generated . . . . The scrambling initialization of this PUSCH corresponding to these PDCCHs and the PUSCH retransmission for the same transport block is by C-RNTI.

\* \* \* Quotation End \* \* \*

\* \* \* Quotation Start [8] \* \* \*

5.3.3.1.8 Format 4

DCI format 4 is used for the scheduling of PUSCH in one UL cell with multi-antenna port transmission mode,

. . .

In addition, for transport block 1:
Modulation and coding scheme and redundancy version—5 bits . . .
New data indicator—1 bit
In addition, for transport block 2:
Modulation and coding scheme and redundancy version—5 bits . . .
New data indicator—1 bit \* \* \* Quotation End \* \* \*

In NR, there are mainly two types of transmission scheme, codebook based and non-codebook based, whose main difference is whether to precode data stream over multiple antenna ports with an entry of a defined codebook (e.g. the entry which is explicitly indicated by base station). Also UL transmission(s) could be targeting to one or more UL beam(s) and/or one or more TRP(s), which could equivalent to or represented by SRI(s), and/or TCI state(s), and/or CORESET pool (index), and/or SRS resource set(s) and/or TA group(s). 8Tx is introduced to boost data rate as well as to increase the reliability. With placement of a larger amount of antenna, UE is able to transmit dual codewords to base station via a same time frequency resource. The transmission scheme used and/or the number of TB/codeword would be subject to indication from a base station, e.g. via RRC configuration and/or DCI indication and/or DCI format used. More details regarding UL transmission schemes of NR and 8Tx are quoted below from [3] 3GPP TS 38.214 V18.2.0, [4] 3GPP TS 38.212 V18.2.0, [5] 3GPP TS 38.211 V18.2.0, and [9] 3GPP TS 38.321 V18.2.0:

\* \* \* Quotation Start [3] \* \* \*

6.1 UE Procedure for Transmitting the Physical Uplink Shared Channel

PUSCH transmission(s) can be dynamically scheduled by an UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to clause 10.2 of [TS 38.213] after the reception of higher layer parameter configuredGrantConfig not including rrc-ConfiguredUplinkGrant. If configuredGrantConfigToAddModList is configured, more than one configured grant configuration of configured grant Type 1 and/or configured grant Type 2 may be active at the same time on an active BWP of a serving cell.

The UE can be configured with a list of up to 64 TCI-UL-State configurations within the higher layer parameter BWP-UplinkDedicated. Each TCI-UL-State configuration contains a parameter for configuring one reference signal, if applicable, for determining UL TX spatial filter for dynamic-grant and configured-grant based PUSCH and PUCCH resource in a CC, and SRS.

A UE shall upon detection of a PDCCH with a configured DCI format 0_0, 0_1, 0_2 or 0_3 transmit the corresponding PUSCH as indicated by that DCI unless the UE does not generate a transport block as described in [TS 38.321]. Upon detection of a DCI format 0_1 or 0_2 with 'UL-SCH indicator' set to '0' and with a non-zero 'CSI request' where the associated reportQuantity in CSI-ReportConfig set to 'none' for all CSI report(s) triggered by 'CSI request' in this DCI format 0_1 or 0_2, the UE ignores all fields in this DCI except the 'CSI request' and the UE shall not transmit the corresponding PUSCH as indicated by this DCI format 0_1 or 0_2. Upon detection of a DCI format 0_3 with 'UL-SCH indicator' set to '0' and with a non-zero 'CSI request' where the associated reportQuantity in CSI-ReportConfig set to 'none' for all CSI report(s) triggered by 'CSI request' in this DCI format 0_3, the UE ignores all fields for the scheduled cell with the smallest serving cell index in this DCI except the 'CSI request' and the UE shall not transmit the corresponding PUSCH on the serving cell with the smallest serving cell index as indicated by this DCI format 0_3.

. . .

For uplink, 16 HARQ processes per cell are supported by the UE, or subject to UE capability, a maximum of 32 HARQ processes per cell as defined in [TS 38.306]. The number of processes the UE may assume will at most be used for the uplink is configured to the UE for each cell separately by higher layer parameter nrofHARQ-ProcessesForPUSCH, or nrofHARQ-ProcessesForPUSCH-r17, and when no configuration is provided the UE may assume a default number of 16 processes.

6.1.1 Transmission Schemes

Two transmission schemes are supported for PUSCH: codebook based transmission and non-codebook based transmission. The UE is configured with codebook based transmission when the higher layer parameter txConfig in pusch-Config is set to 'codebook', the UE is configured non-codebook based transmission when the higher layer parameter txConfig is set to 'nonCodebook'. If the higher layer parameter txConfig is not configured, the UE is not expected to be scheduled by DCI format 0_1, 0_2 or 0_3. If PUSCH is scheduled by DCI format 0_0, the PUSCH transmission is based on a single antenna port . . .

6.1.1.1 Codebook Based UL Transmission

For codebook based transmission, PUSCH can be scheduled by DCI format 0_0, DCI format 0_1, DCI format 0_2, DCI format 0_3 or semi-statically configured to operate according to Clause 6.1.2.3. If this PUSCH is scheduled by DCI format 0_1, DCI format 0_2, or semi-statically configured to operate according to Clause 6.1.2.3, the UE determines its PUSCH transmission precoder(s) based on SRI(s), TPMI(s) and the transmission rank, where the SRI(s), TPMI (s) and the transmission rank are given by DCI fields of one or two SRS resource indicators and one or two Precoding information and number of layers in clause 7.3.1.1.2 and 7.3.1.1.3 of [TS 38.212] for DCI format 0_1 and 0_2 or given by srs-ResourceIndicator and precodingAndNumberOfLayers according to clause 6.1.2.3 or given by srs-ResourceIndicator, srs-ResourceIndicator2, precodingAndNumberOfLayers, and precodingAndNumberOfLayers2 according to clause 6.1.2.3 . . .

For codebook based transmission with two or four antenna ports, the UE determines its codebook subsets based on TPMI(s) and upon the reception of higher layer parameter codebookSubset in pusch-Config for PUSCH associated with DCI format 0_1 or 0_3 and codebookSubsetDCI-0-2 in pusch-Config for PUSCH associated with DCI format 0_2 which may be configured with 'fully AndPartialAndNonCoherent', or 'partialAndNonCoherent', or 'nonCoherent' depending on the UE capability for two or four antenna ports.

For codebook based transmission with eight antenna ports, the UE determines its codebook based upon the reception of higher layer parameter [s] CodebookTypeUL in pusch-Config for PUSCH associated with DCI format 0_1 and 0_2, depending on the UE capability. According to the configured CodebookType UL, coherent UL MIMO operation applies within antenna port groups as defined in Table 6.3.1.5-8 of [TS 38.211].

. . .

The maximum transmission rank may be configured by the higher layer parameter maxRank or maxRank-n8 in pusch-Config for PUSCH scheduled with DCI format 0_1 or 0_3 and maxRankDCI-O-2 for PUSCH scheduled with DCI format 0_2.

6.1.1.2 Non-Codebook Based UL Transmission

For non-codebook based transmission, PUSCH can be scheduled by DCI format 0_0, DCI format 0_1, DCI format 0_2, DCI format 0_3 or semi-statically configured to operate according to Clause 6.1.2.3. If this PUSCH is scheduled by DCI format 0_1, DCI format 0_2, DCI format 0_3 or semi-statically configured to operate according to Clause 6.1.2.3, the UE can determine its PUSCH precoder(s) and transmission rank based on the SRI(s) when multiple SRS resources are configured, where the SRI(s) is given by one or two SRS resource indicator(s) in DCI according to clause 7.3.1.1.2 and 7.3.1.1.3 of [38.212] for DCI format 0_1 and DCI format 0_2, or the SRI is given by one SRS resource indicator in DCI according to clause 7.3.1.1.4 of [38.212] for DCI format 0_3, or the SRI is given by srs-ResourceIndicator according to clause 6.1.2.3, or SRIs given by srs-ResourceIndicator and srs-ResourceIndicator2 according to clause 6.1.2.3.

. . .

When the UE is configured with the higher layer parameter txConfig set to 'Noncodebook', the UE is configured with at least one SRS resource. Each of the indicated one or two SRI(s) in slot n is associated with the most recent transmission of SRS resource of associated SRS resource set identified by the SRI, where the SRS resource is prior to the PDCCH carrying the SRI. When two SRS resource sets are configured in srs-ResourceSetToAddModList or srs-ResourceSetToAddModListDCI-0-2 with higher layer parameter usage in SRS-ResourceSet set to 'Noncodebook', the UE is not expected to be configured with different number of SRS resources in the two SRS resource sets.

. . .

The UE shall transmit PUSCH using the same antenna ports as the SRS port(s) in the SRS resource(s) indicated by SRI(s) given by DCI format 0_1 or 0_2 or by configuredGrantConfig according to clause 6.1.2.3, where the SRS port in (i+1)-th SRS resource in the SRS resource set is indexed as $p_i$=1000+i.

The DM-RS antenna ports {p̃₀, . . . , p̃_{υ-1}} in Clause 6.4.1.1.3 of [TS 38.211] are determined according to the ordering of DM-RS port(s) given by Tables 7.3.1.1.2-6 to 7.3.1.1.2-23 in Clause 7.3.1.1.2 of [TS 38.212].

. . .

5.1.3.2 Transport Block Size Determination

In case the higher layer parameter maxNrofCodeWordsScheduledByDCI in PDSCH-config indicates that two codeword transmission is enabled, then one of the two transport blocks is disabled by DCI format 1_1 or 1_3 if $I_{MCS}=26$ and if $rv_{id}=1$ for the corresponding transport block. In case the higher layer parameter maxNrofCodeWordsScheduledByDCI in pdsch-ConfigMulticast indicates that two codeword transmission is enabled, then one of the two transport blocks is disabled by DCI format 4_2 if $I_{MCS}=26$ and if $rv_{id}=1$ for the corresponding transport block. When the UE is configured with higher layer parameter pdsch-TimeDomainAllocationListForMultiPDSCH, either the first or the second transport block of all scheduled PDSCHs is disabled by the DCI format 1_1 if $I_{MCS}=26$ and if $rv_{id}=2$ for the corresponding transport block of all scheduled PDSCHs. If both transport blocks are enabled, transport block 1 and 2 are mapped to codeword 0 and 1 respectively. If only one transport block is enabled, then the enabled transport block is always mapped to the first codeword.

\* \* \* Quotation End \* \* \*

\* \* \* Quotation Start [4] \* \* \*

7.3.1.1 DCI Formats for Scheduling of PUSCH
7.3.1.1.1 Format 0_0
. . .
  Modulation and coding scheme—5 bits as defined in Clause 6.1.4.1 of [TS 38.214]
  New data indicator—1 bit
  Redundancy version—2 bits as defined in Table 7.3.1.1.1-2
  HARQ process number—4 bits
  TPC command for scheduled PUSCH—2 bits as defined in Clause 7.1.1 of [TS 38.213]
. . .
7.3.1.1.2 Format 0_1
  For transport block 1:
  Modulation and coding scheme-5 bits as defined in Clause 6.1.4.1 of [TS 38.214]
  New data indicator— . . .
  Redundancy version—number of bits . . .
  For transport block 2 (only present if maxRank-n8 is configured or maxMIMO-Layers-n8 is configured):
  Modulation and coding scheme—5 bits as defined in Clause 6.1.4.1 of [TS 38.214]
  New data indicator—1 bit
  Redundancy version—2 bits as defined in Table 7.3.1.1.1-2
. . .
  HARQ process number—5 bits if higher layer parameter harq-ProcessNumberSizeDCI-0-1 is configured; otherwise 4 bits
. . .
  SRS resource indicator-number of bits determined by the following:

$$\left\lceil \log_2\left( \sum_{k=1}^{min\{L_{max},N_{SRS}\}} \binom{N_{SRS}}{k} \right) \right\rceil$$

bits according to Tables 7.3.1.1.2-28/28A/29/29B/30/30B/31/31B/31C/31D/31E/31F if the higher layer parameter txConfig=nonCodebook, . . .

$\lceil \log_2(N_{SRS}) \rceil$ bits according to Tables 7.3.1.1.2-32, 7.3.1.1.2-32A and 7.3.1.1.2-32B if the higher layer parameter txConfig=codebook, where . . .

Second SRS resource indicator-number of bits determined by the following:

$$\left\lceil \log_2\left( \max_{k \in \{1,2,\ldots,min\{L_{max},N_{SRS}\}\}} \binom{N_{SRS}}{k} \right) \right\rceil$$

bits according to Tables 7.3.1.1.2-28/29A/30A/31A with the same number of layers indicated by SRS resource indicator field if the higher layer parameter txConfig=nonCodebook, the higher layer paramtere maxMIMO-LayersforSdm is not configured, and SRS resource set indicator field is present, where $N_{SRS}$ is the number of configured SRS resources in the second SRS resource set, . . .

$$\left\lceil \log_2\left( \sum_{k=1}^{min\{L_{max},N_{SRS}\}} \binom{N_{SRS}}{k} \right) \right\rceil$$

bits according to Tables 7.3.1.1.2-28/29 if the higher layer paramter txConfig=nonCodebook, the higher layer paramtere maxMIMO-LayersforSdm is configured and SRS resource set indicator field is present,

. . .

0 bit otherwise.

Precoding information and number of layers-number of bits determined by the following:
  0 bits if the higher layer parameter txConfig=nonCodeBook,
  0 bits for 1 antenna port and if the higher layer parameter txConfig=codebook;
  4, 5, or 6 bits according to Table 7.3.1.1.2-2 for 4 antenna ports, if txConfig=codebook, ul-FullPowerTransmission is not configured or configured to fullpowerMode 2 or configured to fullpower, transform precoder is disabled, and according to the values of higher layer parameters maxRank if multipanelScheme is not configured or max {maxRank, maxRankSfn} if multipanelScheme=sfnScheme or max {maxRank, maxRankSdm} if multipanelScheme=sdmScheme, and codebookSubset;

. . .

7 bits according to Table 7.3.1.1.2-5B for 8 antenna ports, if CodebookType UL=Codebook1, transform precoder is disabled, maxRank-n8=8, and according to ULcodebookFC-N1N2;
  7 bits according to Table 7.3.1.1.2-5C for 8 antenna ports, if CodebookType UL=Codebook1, transform precoder is disabled, maxRank-n8=7, and according to ULcodebookFC-N1N2;
  7 bits according to Table 7.3.1.1.2-5D for 8 antenna ports, if CodebookTypeUL=Codebook1, transform precoder is disabled, maxRank-n8=4, 5 or 6, and according to maxRank-n8;
  4, 6 or 7 bits according to Table 7.3.1.1.2-5E for 8 antenna ports, if CodebookTypeUL=Codebook1, transform precoder is enabled or maxRank=1, 2 or 3 if transform precoder is disabled, and according to transform precoder and maxRank;

...

Second Precoding information-number of bits . . .
Antenna ports-number of bits . . .

\* \* \* Quotation End \* \* \*

\* \* \* Quotation Start [5] \* \* \*

6.3.1 Physical Uplink Shared Channel 6.3.1.1 Scrambling

Up to two codewords $q \in \{0,1\}$ can be transmitted. In case of single-codeword transmission, q=0.

For each codeword, the block of bits $b^{(q)}(0), \ldots, b^{(q)}(M_{bit}^{(q)}-1)$, where $M_{bit}^{(q)}$ is the number of bits in codeword q transmitted on the physical channel, shall be scrambled prior to modulation, resulting in a block of scrambled bits $\tilde{b}^{(q)}(0), \ldots, \tilde{b}^{(q)}(M_{bit}^{(q)}-1)$ according to the following pseudo code

...

6.3.1.3 Layer Mapping

The complex-valued modulation symbols for each of the codewords to be transmitted shall be mapped onto up to four layers according to Table 7.3.1.3-1. Complex-valued modulation symbols $d^{(q)}(0), \ldots, d^{(q)}(M_{symb}^{(q)}-1)$ for codeword q shall be mapped onto the layers $x(i)=[x^{(0)}(i) \ldots x^{(v-1)}(i)]^T$, $i=0,1,\ldots,M_{symb}^{layer}-1$ where v is the number of layers and $M_{symb}^{layer}$ is the number of modulation symbols per layer.

...

6.3.1.5 Precoding

The block of vectors $[y^{(0)}(i) \ldots y^{(v-1)}(i)]^T$ shall be precoded according to $$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(v-1)}(i) \end{bmatrix}$$

where $i=0,1,\ldots,M_{symb}^{ap}-1$, $M_{symb}^{ap}=M_{symb}^{layer}$. The set of antenna ports $\{p_0, \ldots, p_{\rho-1}\}$ shall be determined according to the procedure in [TS 38.214].

For non-codebook-based transmission, the precoding matrix W equals the identity matrix.

For codebook-based transmission, the precoding matrix W depends on the number of antenna ports used for the transmission:

for single-layer transmission on a single antenna port, W=1;

for transmissions using 2, or 4 antenna ports, W is given by Tables 6.3.1.5-1 to 6.3.1.5-7;

for transmissions using 8 antenna ports, W is given by $W_{f(i)} = W'_i$ where the subscripts i and f (i) denote the row of the respective matrix;

f(i) is given by Table 6.3.1.5-8;

the intermediate precoding matrix W' is given by Tables 6.3.1.5-9 to 6.3.1.5-24, 6.3.1.5-29 to 6.3.1.5-36, and 6.3.1.5-39 to 6.3.1.5-47 with $0_{m \times n}$ representing the all-zero matrix with m rows and n columns;

the submatrices $\overline{W}_{m,n}$ are given by Tables 6.3.1.5-25 to 6.3.1.5-28 and 6.3.1.5-37 to 6.3.1.5-38.

The TPMI index used in the tables above is obtained from the DCI scheduling the uplink transmission or the higher layer parameters according to the procedure in [TS 38.214].

When the higher-layer parameter txConfig is not configured, the precoding matrix W=1.

TABLE 6.3.1.5-1

Precoding matrix W for single-layer transmisison using two antenna ports.

| TPMI index | W (ordered from left to right in increasing order of TPMI index) |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$  —  — |

TABLE 6.3.1.5-2

Precoding matrix W for single-layer transmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$  $\frac{1}{2}\begin{bmatrix}0\\1\\0\\0\end{bmatrix}$  $\frac{1}{2}\begin{bmatrix}0\\0\\1\\0\end{bmatrix}$  $\frac{1}{2}\begin{bmatrix}0\\0\\0\\1\end{bmatrix}$  $\frac{1}{2}\begin{bmatrix}1\\0\\1\\0\end{bmatrix}$  $\frac{1}{2}\begin{bmatrix}1\\0\\-1\\0\end{bmatrix}$  $\frac{1}{2}\begin{bmatrix}1\\0\\j\\0\end{bmatrix}$  $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$  $\frac{1}{2}\begin{bmatrix}0\\1\\0\\-1\end{bmatrix}$  $\frac{1}{2}\begin{bmatrix}0\\1\\0\\j\end{bmatrix}$  $\frac{1}{2}\begin{bmatrix}0\\1\\0\\-j\end{bmatrix}$  $\frac{1}{2}\begin{bmatrix}1\\1\\1\\-1\end{bmatrix}$  $\frac{1}{2}\begin{bmatrix}1\\1\\j\\-1\end{bmatrix}$  $\frac{1}{2}\begin{bmatrix}1\\1\\-1\\1\end{bmatrix}$  $\frac{1}{2}\begin{bmatrix}1\\1\\-j\\-j\end{bmatrix}$ |

TABLE 6.3.1.5-2-continued

Precoding matrix W for single-layer transmission using four antenna ports with transform precoding enabled.

| TPMI index | W (ordered from left to right in increasing order of TPMI index) |
|---|---|
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 6.3.1.5-5

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ — — |

TABLE 6.3.1.5-8

The port mapping function f(i) for transmission using 8 antenna ports.

| | Higher-layer parameter CodebookTypeUL | | | | | | |
|---|---|---|---|---|---|---|---|
| | codebook1 | | codebook2 | | codebook3 | | codebook4 |
| i | antenna port group | f(i) | antenna port group | f(i) | antenna port group | f(i) | antenna port group | f(i) |
| 0 | | 0 | | 0 | | 0 | | 0 |
| 1 | 0 | 1 | 0 | 1 | 0 | 4 | | 1 |
| 2 | | 2 | | 4 | 1 | 1 | | 2 |
| 3 | | 3 | | 5 | | 5 | | 3 |
| 4 | | 4 | | 2 | | 2 | | 4 |
| 5 | | 5 | | 3 | 2 | 6 | | 5 |
| 6 | | 6 | 1 | 6 | | 3 | | 6 |
| 7 | | 7 | | 7 | 3 | 7 | | 7 |

TABLE 6.3.1.5-9

Intermediate precoding matrix W' for codebook1=ng1n4n1 and single-layer transmission using eight antenna ports.

| TPMI index | Intermediate precoder matrix W' (ordered from left to right increasing order of TPMI index) |
|---|---|
| 0-7 | $\frac{1}{2\sqrt{2}}\begin{bmatrix}1\\1\\1\\1\\1\\1\\1\\1\end{bmatrix}$ $\frac{1}{2\sqrt{2}}\begin{bmatrix}1\\1\\1\\1\\j\\j\\j\\j\end{bmatrix}$ $\frac{1}{2\sqrt{2}}\begin{bmatrix}1\\1\\1\\1\\-1\\-1\\-1\\-1\end{bmatrix}$ $\frac{1}{2\sqrt{2}}\begin{bmatrix}1\\1\\1\\1\\-j\\-j\\-j\\-j\end{bmatrix}$ $\frac{1}{2\sqrt{2}}\begin{bmatrix}1\\j\\-1\\-j\\1\\j\\-1\\-j\end{bmatrix}$ $\frac{1}{2\sqrt{2}}\begin{bmatrix}1\\j\\-1\\-j\\j\\-1\\-j\\1\end{bmatrix}$ $\frac{1}{2\sqrt{2}}\begin{bmatrix}1\\j\\-1\\-j\\-1\\-j\\1\\j\end{bmatrix}$ $\frac{1}{2\sqrt{2}}\begin{bmatrix}1\\j\\-1\\-j\\-j\\1\\j\\-1\end{bmatrix}$ |

TABLE 6.3.1.5-9-continued

Intermediate precoding matrix W' for codebook1=ng1n4n1 and single-layer transmission using eight antenna ports.

| TPMI index | Intermediate precoder matrix W' (ordered from left to right increasing order of TPMI index) |
|---|---|
| 8-15 | $\frac{1}{2\sqrt{2}}\begin{bmatrix}1\\-1\\1\\-1\\1\\-1\\1\\-1\end{bmatrix}$ $\frac{1}{2\sqrt{2}}\begin{bmatrix}1\\-1\\1\\-1\\j\\-j\\j\\-j\end{bmatrix}$ $\frac{1}{2\sqrt{2}}\begin{bmatrix}1\\-1\\1\\-1\\-1\\1\\-1\\1\end{bmatrix}$ $\frac{1}{2\sqrt{2}}\begin{bmatrix}1\\-1\\1\\-1\\-j\\j\\-j\\j\end{bmatrix}$ $\frac{1}{2\sqrt{2}}\begin{bmatrix}1\\-j\\-1\\j\\1\\-j\\-1\\j\end{bmatrix}$ $\frac{1}{2\sqrt{2}}\begin{bmatrix}1\\-j\\-1\\j\\j\\1\\-j\\-1\end{bmatrix}$ $\frac{1}{2\sqrt{2}}\begin{bmatrix}1\\-j\\-1\\j\\-1\\j\\1\\-j\end{bmatrix}$ $\frac{1}{2\sqrt{2}}\begin{bmatrix}1\\-j\\-1\\j\\-j\\-1\\j\\1\end{bmatrix}$ |

TABLE 6. 3.1.5-12

Intermediate precoding matrix W' for codebook1=ng1n4n1 and four-layer transmission using eight antenna ports with transform precoding disabled.

| TPMI index | Intermediate precoder matrix W' (ordered from left to right in increasing order of TPMI index) |
|---|---|
| 0-3 | $\frac{1}{4\sqrt{2}}\begin{bmatrix}1&1&1&1\\1&j&1&j\\1&-1&1&-1\\1&-j&1&-j\\1&1&-1&-1\\1&j&-1&-j\\1&-1&-1&1\\1&-j&-1&j\end{bmatrix}$ $\frac{1}{4\sqrt{2}}\begin{bmatrix}1&1&1&1\\1&j&1&j\\1&-1&1&-1\\1&-j&1&-j\\j&j&-j&-j\\j&-1&-j&1\\j&-j&j&j\\j&1&-j&-1\end{bmatrix}$ $\frac{1}{4\sqrt{2}}\begin{bmatrix}1&1&1&1\\1&-1&1&-1\\1&1&1&1\\1&-1&1&-1\\1&1&-1&-1\\1&-1&-1&1\\1&1&-1&-1\\1&-1&-1&1\end{bmatrix}$ $\frac{1}{4\sqrt{2}}\begin{bmatrix}1&1&1&1\\1&-1&1&-1\\1&1&1&1\\1&-1&1&-1\\j&j&-j&-j\\j&-j&-j&j\\j&j&-j&-j\\j&-j&-j&j\end{bmatrix}$ |
| 4-7 | $\frac{1}{4\sqrt{2}}\begin{bmatrix}1&1&1&1\\1&-j&1&-j\\1&-1&1&-1\\1&j&1&j\\1&1&-1&-1\\1&-j&-1&j\\1&-1&-1&1\\1&j&-1&-j\end{bmatrix}$ $\frac{1}{4\sqrt{2}}\begin{bmatrix}1&1&1&1\\1&-j&1&-j\\1&-1&1&-1\\1&j&1&j\\j&j&-j&-j\\j&1&-j&-1\\j&-j&-j&j\\j&-1&-j&1\end{bmatrix}$ $\frac{1}{4\sqrt{2}}\begin{bmatrix}1&1&1&1\\j&-1&j&-1\\-1&1&-1&1\\-j&-1&-j&-1\\1&1&-1&-1\\j&-1&-j&1\\-1&1&1&-1\\-j&-1&j&1\end{bmatrix}$ $\frac{1}{4\sqrt{2}}\begin{bmatrix}1&1&1&1\\j&-1&j&-1\\-1&1&-1&1\\-j&-1&-j&-1\\j&j&-j&-j\\j&-j&-j&j\\-1&-j&1&-j\\-j&j&j&-j\\1&-j&-1&j\end{bmatrix}$ |
| 8-11 | $\frac{1}{4\sqrt{2}}\begin{bmatrix}1&1&1&1\\j&-j&j&-j\\-1&-1&-1&-1\\-j&j&-j&j\\1&1&-1&-1\\j&-j&-j&j\\-1&-1&1&1\\-j&j&j&-j\end{bmatrix}$ $\frac{1}{4\sqrt{2}}\begin{bmatrix}1&1&1&1\\j&-j&j&-j\\-1&-1&-1&-1\\-j&j&-j&j\\j&j&-j&-j\\-1&1&1&-1\\-j&-j&j&j\\1&-1&-1&1\end{bmatrix}$ $\frac{1}{4\sqrt{2}}\begin{bmatrix}1&1&1&1\\j&1&j&1\\-1&-1&-1&-1\\-j&1&-j&1\\1&1&-1&-1\\j&1&-j&-1\\-1&-1&1&1\\-j&1&j&-1\end{bmatrix}$ $\frac{1}{4\sqrt{2}}\begin{bmatrix}1&1&1&1\\j&1&j&1\\-1&-1&-1&-1\\-j&1&-j&1\\j&j&-j&-j\\-1&j&1&-j\\-j&-j&j&j\\1&j&-1&-j\end{bmatrix}$ |
| 12-15 | $\frac{1}{4\sqrt{2}}\begin{bmatrix}1&1&1&1\\-1&-j&-1&-j\\1&-1&1&-1\\-1&j&-1&j\\1&1&-1&-1\\-1&-j&1&j\\1&-1&-1&1\\-1&j&1&-j\end{bmatrix}$ $\frac{1}{4\sqrt{2}}\begin{bmatrix}1&1&1&1\\-1&-j&-1&-j\\1&-1&1&-1\\-1&j&-1&j\\j&j&-j&-j\\-j&1&j&-1\\j&-j&-j&j\\-j&-1&j&1\end{bmatrix}$ $\frac{1}{4\sqrt{2}}\begin{bmatrix}1&1&1&1\\-1&1&-1&1\\1&1&1&1\\-1&1&-1&1\\1&1&-1&-1\\-1&1&1&-1\\1&1&-1&-1\\-1&1&1&-1\end{bmatrix}$ $\frac{1}{4\sqrt{2}}\begin{bmatrix}1&1&1&1\\-1&1&-1&1\\1&1&1&1\\-1&1&-1&1\\j&j&-j&-j\\-j&j&j&-j\\j&j&-j&-j\\-j&j&j&-j\end{bmatrix}$ |
| 16-19 | $\frac{1}{4\sqrt{2}}\begin{bmatrix}1&1&1&1\\-1&j&-1&j\\1&-1&1&-1\\-1&-j&-1&-j\\1&1&-1&-1\\-1&j&1&-j\\1&-1&-1&1\\-1&-j&1&j\end{bmatrix}$ $\frac{1}{4\sqrt{2}}\begin{bmatrix}1&1&1&1\\-1&j&-1&j\\1&-1&1&-1\\-1&-j&-1&-j\\j&j&-j&-j\\-j&-1&j&1\\j&-j&-j&j\\-j&1&j&-1\end{bmatrix}$ $\frac{1}{4\sqrt{2}}\begin{bmatrix}1&1&1&1\\-j&1&-j&1\\-1&1&-1&1\\j&1&j&1\\1&1&-1&-1\\-j&1&j&-1\\-1&1&1&-1\\j&1&-j&-1\end{bmatrix}$ $\frac{1}{4\sqrt{2}}\begin{bmatrix}1&1&1&1\\-j&1&-j&1\\-1&1&-1&1\\j&1&j&1\\j&j&-j&-j\\1&j&-1&-j\\-j&j&j&-j\\-1&j&1&-j\end{bmatrix}$ |

TABLE 6. 3.1.5-12-continued

Intermediate precoding matrix W' for codebook1=ng1n4n1 and four-layer transmission using eight antenna ports with transform precoding disabled.

| TPMI index | Intermediate precoder matrix W' (ordered from left to right in increasing order of TPMI index) |
|---|---|
| 20-23 | $\frac{1}{4\sqrt{2}}\begin{bmatrix} 1 & 1 & 1 & 1 \\ -j & j & -j & j \\ -1 & -1 & -1 & -1 \\ j & -j & j & -j \\ 1 & 1 & -1 & -1 \\ -j & j & j & -j \\ -1 & -1 & 1 & 1 \\ j & -j & -j & j \end{bmatrix}$ $\frac{1}{4\sqrt{2}}\begin{bmatrix} 1 & 1 & 1 & 1 \\ -j & j & -j & j \\ -1 & -1 & -1 & -1 \\ j & -j & j & -j \\ j & j & -j & -j \\ 1 & -1 & -1 & 1 \\ -j & -j & j & j \\ -1 & 1 & 1 & -1 \end{bmatrix}$ $\frac{1}{4\sqrt{2}}\begin{bmatrix} 1 & 1 & 1 & 1 \\ -j & -1 & -j & -1 \\ -1 & 1 & -1 & 1 \\ j & -1 & j & -1 \\ 1 & 1 & -1 & -1 \\ -j & -1 & j & 1 \\ -1 & 1 & 1 & -1 \\ j & -1 & -j & 1 \end{bmatrix}$ $\frac{1}{4\sqrt{2}}\begin{bmatrix} 1 & 1 & 1 & 1 \\ -j & -1 & -j & -1 \\ -1 & 1 & -1 & 1 \\ j & -1 & j & -1 \\ j & j & -j & -j \\ 1 & -j & -1 & j \\ -j & j & j & -j \\ -1 & -j & 1 & j \end{bmatrix}$ |

TABLE 6.3.1.5-14

Intermediate precoding matrix W' for codebook1=ng1n4n1 and six-layer transmission using eight antenna ports with transform precoding disabled.

| TPMI index | Intermediate precoder matrix W' (ordered from left to right in increasing order of TPMI index) |
|---|---|
| 0-1 | $\frac{1}{4\sqrt{3}}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ 1 & -1 & 1 & -1 & 1 & -1 \\ 1 & -1 & j & -j & -1 & 1 \\ 1 & -1 & -1 & 1 & 1 & -1 \\ 1 & -1 & -j & j & -1 & 1 \end{bmatrix}$ $\frac{1}{4\sqrt{3}}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ j & -j & j & -j & 1 & -1 \\ j & -j & -1 & 1 & -1 & 1 \\ j & -j & -j & j & 1 & -1 \\ j & -j & 1 & -1 & -1 & 1 \end{bmatrix}$ |
| 2-3 | $\frac{1}{4\sqrt{3}}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ 1 & -1 & 1 & -1 & 1 & -1 \\ j & -j & -1 & 1 & -j & j \\ -1 & 1 & 1 & -1 & -1 & 1 \\ -j & j & -1 & 1 & j & -j \end{bmatrix}$ $\frac{1}{4\sqrt{3}}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ j & -j & j & -j & 1 & -1 \\ -1 & 1 & -j & j & -j & j \\ -j & j & j & -j & -1 & 1 \\ 1 & -1 & -j & j & j & -j \end{bmatrix}$ |
| 4-5 | $\frac{1}{4\sqrt{3}}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ 1 & -1 & 1 & -1 & 1 & -1 \\ -1 & 1 & -j & j & 1 & -1 \\ 1 & -1 & -1 & 1 & 1 & -1 \\ -1 & 1 & j & -j & 1 & -1 \end{bmatrix}$ $\frac{1}{4\sqrt{3}}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ j & -j & j & -j & 1 & -1 \\ -j & j & 1 & -1 & 1 & -1 \\ j & -j & -j & j & 1 & -1 \\ -j & j & -1 & 1 & 1 & -1 \end{bmatrix}$ |
| 6-7 | $\frac{1}{4\sqrt{3}}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ 1 & -1 & 1 & -1 & 1 & -1 \\ -j & j & 1 & -1 & j & -j \\ -1 & 1 & 1 & -1 & -1 & 1 \\ j & -j & 1 & -1 & -j & j \end{bmatrix}$ $\frac{1}{4\sqrt{3}}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ j & -j & j & -j & 1 & -1 \\ 1 & -1 & j & -j & j & -j \\ -j & j & j & -j & -1 & 1 \\ -1 & 1 & j & -j & -j & j \end{bmatrix}$ |

TABLE 6.3.1.5-16

Intermediate precoding matrix W' for codebook1=ng1n4n1 and eight-layer transmission using eight antenna ports with transform precoding disabled.

| TPMI index | Intermediate precoder matrix W' (ordered from left to right in increasing order of TPMI index) |
|---|---|
| 0-1 | $\frac{1}{8}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & 1 & -1 & 1 & -1 & 1 & -1 \\ 1 & -1 & j & -j & -1 & 1 & -j & j \\ 1 & -1 & -1 & 1 & 1 & -1 & -1 & 1 \\ 1 & -1 & -j & j & -1 & 1 & j & -j \end{bmatrix}$ $\frac{1}{8}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ j & -j & j & -j & 1 & -1 & 1 & -1 \\ j & -j & 1 & -1 & -1 & 1 & -j & j \\ j & -j & -j & j & 1 & -1 & -1 & 1 \\ j & -j & 1 & -1 & -1 & 1 & j & -j \end{bmatrix}$ |
| 2-3 | $\frac{1}{8}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ 1 & -1 & 1 & -1 & 1 & -1 & 1 & -1 \\ j & -j & -1 & 1 & -j & j & 1 & -1 \\ -1 & 1 & 1 & -1 & -1 & 1 & 1 & -1 \\ -j & j & -1 & 1 & j & -j & 1 & -1 \end{bmatrix}$ $\frac{1}{8}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ j & -j & j & -j & 1 & -1 & 1 & -1 \\ -1 & 1 & -j & j & -j & j & 1 & -1 \\ -j & j & j & -j & -1 & 1 & 1 & -1 \\ 1 & -1 & - & j & j & -j & 1 & -1 \end{bmatrix}$ |

\* \* \* Quotation End \* \* \*

\* \* \* Quotation Start [9] \* \* \*

5.4 UL-SCH Data Transfer
5.4.1 UL Grant reception

Uplink grant is either received dynamically on the PDCCH, in a Random Access Response, configured semi-persistently by RRC or determined to be associated with the PUSCH resource of MSGA as specified in clause 5.1.2a. The MAC entity shall have an uplink grant to transmit on the UL-SCH. To perform the requested transmissions, the MAC layer receives HARQ information from lower layers. An uplink grant addressed to CS-RNTI with NDI=0 is considered as a configured uplink grant. An uplink grant addressed to CS-RNTI with NDI=1 is considered as a dynamic uplink grant.

. . .

If the MAC entity has a C-RNTI, a Temporary C-RNTI, or CS-RNTI, the MAC entity shall for each PDCCH occasion and for each Serving Cell belonging to a TAG that has a running timeAlignmentTimer or a running cg-SDT-TimeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
  2> if the uplink grant is for MAC entity's C-RNTI and if the previous uplink grant delivered to the HARQ entity for the same HARQ process was either an uplink grant received for the MAC entity's CS-RNTI or a configured uplink grant:
    3> consider the NDI to have been toggled for the corresponding HARQ process regardless of the value of the NDI.

. . .

2> deliver the uplink grant and the associated HARQ information to the HARQ entity.
1> else if an uplink grant for this PDCCH occasion has been received for this Serving Cell on the PDCCH for the MAC entity's CS-RNTI:

2> if the NDI in the received HARQ information is 1:
    3> consider the NDI for the corresponding HARQ process not to have been toggled;

. . .

3> deliver the uplink grant and the associated HARQ information to the HARQ entity;

. . .

For the MAC entity configured with Ich-basedPrioritization, priority of an uplink grant is determined by the highest priority among priorities of the logical channels that are multiplexed (i.e. the MAC PDU to transmit is already stored in the HARQ buffer) or have data available that can be multiplexed (i.e. the MAC PDU to transmit is not stored in the HARQ buffer) in the MAC PDU, according to the mapping restrictions as described in clause 5.4.3.1.2. The priority of an uplink grant for which no data for logical channels is multiplexed or can be multiplexed in the MAC PDU is lower than either the priority of an uplink grant for which data for any logical channels is multiplexed or can be multiplexed in the MAC PDU or the priority of the logical channel triggering an SR.

For the MAC entity configured with Ich-basedPrioritization, if the corresponding PUSCH transmission of a configured uplink grant is cancelled by CI-RNTI as specified in clause 11.2A of TS 38.213 or cancelled by a high PHY-priority PUCCH transmission as specified in clause 9 of TS 38.213, this configured uplink grant is considered as a de-prioritized uplink grant. If this de-prioritized uplink grant is configured with autonomousTx, the configuredGrantTimer for the corresponding HARQ process of this de-prioritized uplink grant shall be stopped if it is running. If this de-prioritized uplink grant is configured with autonomousTx, the cg-RetransmissionTimer for the corresponding HARQ process of this de-prioritized uplink grant shall be stopped if it is running.

When the MAC entity is configured with Ich-basedPrioritization, for each uplink grant delivered to the HARQ entity and whose associated PUSCH can be transmitted by lower layers, the MAC entity shall:
  1> if this uplink grant is received in a Random Access Response (i.e. in a MAC RAR or fallback RAR), or addressed to Temporary C-RNTI, or is determined as specified in clause 5.1.2a for the transmission of the MSGA payload:
>> consider this uplink grant as a prioritized uplink grant.

...

5.4.2 HARQ Operation
5.4.2.1 HARQ Entity

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in TS 38.214.

Each HARQ process supports one or two TBs.

Each HARQ process is associated with a HARQ process identifier. For UL transmission with UL grant in RA Response or for UL transmission for MSGA payload, HARQ process identifier 0 is used.

...

The maximum number of transmissions of a TB within a bundle of the dynamic grant or configured grant or the uplink grant received in a MAC RAR is given by REPETITION_NUMBER as follows:

For a dynamic grant, REPETITION_NUMBER is set to a value provided by lower layers, as specified in clause 6.1.2.1 of TS 38.214;

For a configured grant, REPETITION_NUMBER is set to a value provided by lower layers, as specified in clause 6.1.2.3 of TS 38.214;

For an uplink grant received in a MAC RAR, REPETITION_NUMBER is set to a value provided by lower layers, as specified in clause 6.1.2.1 of TS 38.214.

If REPETITION_NUMBER>1, after the first transmission within a bundle, at most REPETITION_NUMBER−1 HARQ retransmissions follow within the bundle. For both dynamic grant and configured uplink grant, and uplink grant received in a MAC RAR bundling operation relies on the HARQ entity for invoking the same HARQ process for each transmission that is part of the same bundle. Within a bundle, HARQ retransmissions are triggered without waiting for feedback from previous transmission according to REPETITION_NUMBER for a dynamic grant or configured uplink grant or uplink grant received in a MAC RAR unless they are terminated as specified in clause 6.1 of TS 38.214. Each transmission within a bundle is a separate uplink grant delivered to the HARQ entity.

For each transmission within a bundle of the dynamic grant or uplink grant received in a MAC RAR, the sequence of redundancy versions is determined according to clause 6.1.2.1 of TS 38.214. For each transmission within a bundle of the configured uplink grant, the sequence of redundancy versions is determined according to clause 6.1.2.3 of TS 38.214.

For each uplink grant, the HARQ entity shall:
1> identify the HARQ process associated with this grant, and for each identified HARQ process:
  2> if the received grant was not addressed to a Temporary C-RNTI on PDCCH, and the NDI provided in the associated HARQ information has been toggled compared to the value in the previous transmission of this TB of this HARQ process; or
  2> if the uplink grant was received on PDCCH for the C-RNTI and the HARQ buffer of the identified process is empty; or
  2> if the uplink grant was received in a Random Access Response (i.e. in a MAC RAR or a fallback RAR); or
  2> if the uplink grant was determined as specified in clause 5.1.2a for the transmission of the MSGA payload; or 2> if the uplink grant was received on PDCCH for the C-RNTI in ra-ResponseWindow and this PDCCH successfully completed the Random Access procedure initiated for beam failure recovery; or
  2> if the uplink grant is part of a bundle of the configured uplink grant, and may be used for initial transmission according to clause 6.1.2.3 of TS 38.214, and if no MAC PDU has been obtained for this bundle:

...

3> else if this uplink grant is a configured grant configured with autonomousTx; and
    3> if the previous configured uplink grant, in the BWP, for this HARQ process was not prioritized; and
    3> if a MAC PDU had already been obtained for this HARQ process; and
    3> if the uplink grant size matches with size of the obtained MAC PDU; and
    3> if none of PUSCH transmission(s) of the obtained MAC PDU has been completely performed:
      4> consider the MAC PDU has been obtained.
    3> else if the MAC entity is not configured with lch-basedPrioritization; or
    3> if this uplink grant is a prioritized uplink grant:
      4> obtain the MAC PDU to transmit from the Multiplexing and assembly entity, if any;
    3> if a MAC PDU to transmit has been obtained:
      4> if the uplink grant is not a configured grant configured with autonomousTx; or
      4> if the uplink grant is a prioritized uplink grant:
        5> deliver the MAC PDU and the uplink grant and the HARQ information of the TB to the identified HARQ process;
        5> instruct the identified HARQ process to trigger a new transmission;
    ...
    3> else:
      4> flush the HARQ buffer of the identified HARQ process.
  2> else (i.e. retransmission):
    3> if the uplink grant received on PDCCH was addressed to CS-RNTI and if the HARQ buffer of the identified process is empty; or
    3> if the uplink grant is part of a bundle and if no MAC PDU has been obtained for this bundle; or
    3> if the uplink grant is part of a bundle of the configured uplink grant, and the PUSCH duration of the uplink grant overlaps with an uplink grant received in a Random Access Response (i.e. MAC RAR or fallbackRAR) or an uplink grant determined as specified in clause 5.1.2a for MSGA payload for this Serving Cell; or
    3> if the MAC entity is not configured with lch-basedPrioritization and the BWP is not configured with sTx-2Panel, and if this uplink grant is part of a bundle of the configured uplink grant and the PUSCH duration of the uplink grant overlaps with a PUSCH duration of another uplink grant received on the PDCCH; or 3> if the MAC entity is not configured with Ich-basedPrioritization and the BWP is configured with sTx-2Panel, and if this uplink grant is part of a bundle of the configured uplink grant associated with an srs-ResourceSetId corresponding to a coresetPoolIndex, and the PUSCH duration of the uplink grant overlaps with a PUSCH duration of another uplink grant received on the PDCCH associated with the same coresetPoolIndex; or 3> if the MAC entity is configured with Ich-basedPrioritization and this uplink grant is not a prioritized uplink grant:
    4> ignore the uplink grant.
3> else:
    4> deliver the uplink grant and the HARQ information (redundancy version) of the TB to the identified HARQ process;
    4> instruct the identified HARQ process to trigger a retransmission;
. . .

When determining if NDI has been toggled compared to the value in the previous transmission the MAC entity shall ignore NDI received in all uplink grants on PDCCH for its Temporary C-RNTI.
. . .

5.4.2.2 HARQ Process

Each HARQ process is associated with a HARQ buffer.

New transmissions are performed on the resource and with the MCS indicated on PDCCH or indicated in the Random Access Response (i.e. MAC RAR or fallbackRAR), or signalled in RRC or determined as specified in clause 5.1.2a for MSGA payload. Retransmissions are performed on the resource and, if provided, with the MCS indicated on PDCCH, or on the same resource and with the same MCS as was used for last made transmission attempt within a bundle, or on stored configured uplink grant resources and stored MCS when cg-RetransmissionTimer or cg-SDT-RetransmissionTimer or cg-RRC-RetransmissionTimer is configured. If cg-RetransmissionTimer is configured, retransmissions with the same HARQ process may be performed on any configured grant configuration if the configured grant configurations have the same TBS. If cg-SDT-RetransmissionTimer is configured, retransmission for the initial CG-SDT transmission with the same HARQ process may be performed on any configured grant configuration if the configured grant configurations have the same TBS.
. . .

If the HARQ entity requests a new transmission for a TB, the HARQ process shall:
  1> store the MAC PDU in the associated HARQ buffer;
  1> store the uplink grant received from the HARQ entity;
  1> generate a transmission as described below.

If the HARQ entity requests a retransmission for a TB, the HARQ process shall:
  1> store the uplink grant received from the HARQ entity;
  1> generate a transmission as described below.

To generate a transmission for a TB, the HARQ process shall:
. . .
  1> if there is no measurement gap at the time of the transmission and, in case of retransmission, the retransmission does not collide with a transmission for a MAC PDU obtained from the Msg3 buffer or the MSGA buffer:
    2> if there are neither NR sidelink transmission nor transmission of V2X sidelink communication at the time of the transmission; or
    2> if the transmission of the MAC PDU is prioritized over sidelink transmission or can be simultaneously performed with sidelink transmission:
      3> instruct the physical layer to generate a transmission according to the stored uplink grant.
. . .

5.4.3 Multiplexing and Assembly
5.4.3.1 Logical Channel Prioritization
5.4.3.1.1 General The Logical Channel Prioritization (LCP) procedure is applied whenever a new transmission is performed.

RRC controls the scheduling of uplink data by signalling for each logical channel per MAC entity:
  priority where an increasing priority value indicates a lower priority level;
  prioritisedBitRate which sets the Prioritized Bit Rate (PBR);
  bucketSizeDuration which sets the Bucket Size Duration (BSD).

RRC additionally controls the LCP procedure by configuring mapping restrictions for each logical channel:
  allowedSCS-List which sets the allowed Subcarrier Spacing(s) for transmission;
  maxPUSCH-Duration which sets the maximum PUSCH duration allowed for transmission;
  configuredGrantType1Allowed which sets whether a configured grant Type 1 can be used for transmission;
  allowedServingCells which sets the allowed cell(s) for transmission;
  allowedCG-List which sets the allowed configured grant(s) for transmission;
  allowedPHY-PriorityIndex which sets the allowed PHY priority index(es) of a dynamic grant for transmission;
  allowedHARQ-mode which sets the allowed UL HARQ mode for transmission.

The following UE variable is used for the Logical channel prioritization procedure:
  Bj which is maintained for each logical channel j.

The MAC entity shall initialize Bj of the logical channel to zero when the logical channel is established.

For each logical channel j, the MAC entity shall:
  1> increment Bj by the product PBR×T before every instance of the LCP procedure, where T is the time elapsed since Bj was last incremented;
  1> if the value of Bj is greater than the bucket size (i.e. PBR×BSD):
    2> set Bj to the bucket size.

NOTE: The exact moment(s) when the UE updates Bj between LCP procedures is up to UE implementation, as long as Bj is up to date at the time when a grant is processed by LCP.

5.4.3.1.2 Selection of Logical Channels

The MAC entity shall, when a new transmission is performed:
  1> select the logical channels for each UL grant that satisfy all the following conditions:
    2> the set of allowed Subcarrier Spacing index values in allowedSCS-List, if configured, includes the Subcarrier Spacing index associated to the UL grant; and
    2> maxPUSCH-Duration, if configured, is larger than or equal to the PUSCH transmission duration associated to the UL grant; and
    2> configuredGrantType1Allowed, if configured, is set to true in case the UL grant is a Configured Grant Type 1; and
    2> allowedServingCells, if configured, includes the Cell information associated to the UL grant. Does not apply to logical channels associated with a DRB configured with PDCP duplication within the same MAC entity (i.e. CA duplication) when CA duplication is deactivated for this DRB in this MAC entity; and
2> allowedCG-List, if configured, includes the configured grant index associated to the UL grant; and
2> allowedPHY-PriorityIndex, if configured, includes the priority index (as specified in clause 9 of TS 38.213) associated to the dynamic UL grant; and
2> allowedHARQ-mode, if configured, includes the allowed UL HARQ mode for the HARQ process associated to the UL grant.

NOTE: The Subcarrier Spacing index, PUSCH transmission duration, Cell information, and priority index are included in Uplink transmission information received from lower layers for the corresponding scheduled uplink transmission.

5.4.3.1.3 Allocation of Resources

Before the successful completion of the Random Access procedure initiated for DAPS handover, the target MAC entity shall not select the logical channel(s) corresponding to non-DAPS DRB(s) for the uplink grant received in a Random Access Response or the uplink grant for the transmission of the MSGA payload. The source MAC entity shall select only the logical channel(s) corresponding to DAPS DRB(s) during DAPS handover.

The MAC entity shall, when a new transmission is performed:
1> allocate resources to the logical channels as follows:
2> logical channels selected in clause 5.4.3.1.2 for the UL grant with Bj>0 are allocated resources in a decreasing priority order. If the PBR of a logical channel is set to infinity, the MAC entity shall allocate resources for all the data that is available for transmission on the logical channel before meeting the PBR of the lower priority logical channel(s);
2> decrement Bj by the total size of MAC SDUs served to logical channel j above;
2> if any resources remain, all the logical channels selected in clause 5.4.3.1.2 are served in a strict decreasing priority order (regardless of the value of Bj) until either the data for that logical channel or the UL grant is exhausted, whichever comes first. Logical channels configured with equal priority should be served equally.

NOTE 1: The value of Bj can be negative.

If the MAC entity is requested to simultaneously transmit multiple MAC PDUs, or if the MAC entity receives the multiple UL grants within one or more coinciding PDCCH occasions (i.e. on different Serving Cells), it is up to UE implementation in which order the grants are processed.

The UE shall also follow the rules below during the scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data;
if the MAC entity is given a UL grant size that is equal to or larger than 8 bytes (when eLCID is not used) or 10 bytes (when eLCID is used) while having data available and allowed (according to clause 5.4.3.1) for transmission, the MAC entity shall not transmit only padding BSR and/or padding.

The MAC entity shall:
1> if the MAC entity is configured with enhancedSkipUplinkTxDynamic with value true and the grant indicated to the HARQ entity was addressed to a C-RNTI, or if the MAC entity is configured with enhancedSkipUplinkTxConfigured with value true and the grant indicated to the HARQ entity is a configured uplink grant:
2> if there is no UCI to be multiplexed on this PUSCH transmission as specified in TS 38.213; and
2> if there is no aperiodic CSI requested for this PUSCH transmission as specified in TS 38.212; and
2> if the MAC PDU includes zero MAC SDUs; and
2> if the MAC PDU includes only the periodic BSR and there is no data available for any LCG, or the MAC PDU includes only the padding BSR:
3> not generate a MAC PDU for the HARQ entity.
1> else if the MAC entity is configured with skipUplinkTxDynamic with value true and the grant indicated to the HARQ entity was addressed to a C-RNTI, or the grant indicated to the HARQ entity is a configured uplink grant:
2> if there is no aperiodic CSI requested for this PUSCH transmission as specified in TS 38.212; and
2> if the MAC PDU includes zero MAC SDUs; and
2> if the MAC PDU includes only the periodic BSR and there is no data available for any LCG, or the MAC PDU includes only the padding BSR:
3> not generate a MAC PDU for the HARQ entity.

Logical channels shall be prioritised in accordance with the following order (highest priority listed first):
MAC CE for C-RNTI, or data from UL-CCCH;
MAC CE for (Enhanced) BFR, or MAC CE for Configured Grant Confirmation, or MAC CE for Multiple Entry Configured Grant Confirmation;
MAC CE for Sidelink Configured Grant Confirmation;
MAC CE for LBT failure;
MAC CE for SL LBT failure according to clause 5.31.2;
MAC CE for Timing Advance Report;
MAC CE for Delay Status Report;
MAC CE for SL-BSR prioritized according to clause 5.22.1.6;
MAC CE for (Extended) BSR, with exception of BSR included for padding;
MAC CE for (Enhanced) Single Entry PHR, or MAC CE for (Enhanced) Multiple Entry PHR or MAC CE for Single Entry PHR with assumed PUSCH, or MAC CE for Multiple Entry PHR with assumed PUSCH, or MAC CE for Enhanced Single Entry PHR for multiple TRP or MAC CE for Enhanced Multiple Entry PHR for multiple TRP, or MAC CE for Enhanced Single Entry PHR for multiple TRP STx2P or MAC CE for Enhanced Multiple Entry PHR for multiple TRP STx2P;
MAC CE for Positioning Measurement Gap Activation/Deactivation Request;
MAC CE for the number of Desired Guard Symbols;
MAC CE for Case-6 Timing Request;
MAC CE for (Extended) Pre-emptive BSR;
MAC CE for SL-BSR, with exception of SL-BSR prioritized according to clause 5.22.1.6 and SL-BSR included for padding;

MAC CE for IAB-MT Recommended Beam Indication, or MAC CE for Desired IAB-MT PSD range, or MAC CE for Desired DL Tx Power Adjustment;

data from any Logical Channel, except data from UL-CCCH;

MAC CE for Recommended bit rate query;

MAC CE for BSR included for padding;

MAC CE for SL-BSR included for padding.

NOTE 2: Prioritization among MAC CEs of same priority is up to UE implementation.

The MAC entity shall prioritize any MAC CE listed in a higher order than 'data from any Logical Channel, except data from UL-CCCH' over NR sidelink transmission.

5.4.3.2 Multiplexing of MAC Control Elements and MAC SDUs

The MAC entity shall multiplex MAC CEs and MAC SDUs in a MAC PDU according to clauses 5.4.3.1 and 6.1.2.

NOTE: Content of a MAC PDU does not change after being built for transmission on a dynamic uplink grant, regardless of LBT outcome.

\* \* \* Quotation End \* \* \*

In TS 38.321 ([9] 3GPP TS 38.321 V18.2.0), DL data transfer is introduced:

\* \* \* Quotation Start [9] \* \* \*

5.3 DL-SCH Data Transfer 5.3.1 DL Assignment reception

Downlink assignments received on the PDCCH both indicate that there is a transmission on a DL-SCH for a particular MAC entity and provide the relevant HARQ information.

When the MAC entity has a C-RNTI, Temporary C-RNTI, CS-RNTI, G-RNTI or G-CS-RNTI, the MAC entity shall for each PDCCH occasion during which it monitors PDCCH and for each Serving Cell:

1> if a downlink assignment for this PDCCH occasion and this Serving Cell has been received on the PDCCH for the MAC entity's C-RNTI, or Temporary C-RNTI, or G-RNTI configured for multicast MTCH:

2> if this is the first downlink assignment for this Temporary C-RNTI:

3> consider the NDI to have been toggled.

2> if the downlink assignment is for the MAC entity's C-RNTI, and if the previous downlink assignment indicated to the HARQ entity of the same HARQ process was either a downlink assignment received for the MAC entity's CS-RNTI or G-CS-RNTI, or a configured downlink assignment for unicast or MBS multicast; or 2> if the downlink assignment is for the MAC entity's G-RNTI configured for multicast MTCH, and if the previous downlink assignment indicated to the HARQ entity of the same HARQ process was either a downlink assignment received for the MAC entity's CS-RNTI or G-CS-RNTI, or other G-RNTI, or C-RNTI, or a configured downlink assignment for unicast or MBS multicast:

3> consider the NDI to have been toggled regardless of the value of the NDI.

. . .

2> indicate the presence of a downlink assignment and deliver the associated HARQ information to the HARQ entity.

. . .

5.3.2 HARQ Operation 5.3.2.1 HARQ Entity

The MAC entity includes a HARQ entity for each Serving Cell, which maintains a number of parallel HARQ processes. Each HARQ process is associated with a HARQ process identifier. The HARQ entity directs HARQ information and associated TBs received on the DL-SCH to the corresponding HARQ processes (see clause 5.3.2.2).

The number of parallel DL HARQ processes per HARQ entity is specified in TS 38.214. The dedicated broadcast HARQ process is used for BCCH.

The HARQ process supports one TB when the physical layer is not configured for downlink spatial multiplexing. The HARQ process supports one or two TBs when the physical layer is configured for downlink spatial multiplexing.

When the MAC entity is configured with pdsch-AggregationFactor>1, the parameter pdsch-AggregationFactor provides the number of transmissions of a TB within a bundle of the downlink assignment. Bundling operation relies on the HARQ entity for invoking the same HARQ process for each transmission that is part of the same bundle. After the initial transmission, pdsch-AggregationFactor−1 HARQ retransmissions follow within a bundle.

The MAC entity shall:

1> if a downlink assignment has been indicated:

2> allocate the TB(s) received from the physical layer and the associated HARQ information to the HARQ process indicated by the associated HARQ information.

1> if a downlink assignment has been indicated for the broadcast HARQ process:

2> allocate the received TB to the broadcast HARQ process.

NOTE: It is up to UE implementation to allocate the received TB for multicast MCCH or broadcast MCCH or broadcast MTCH to one HARQ process.

5.3.2.2 HARQ Process

When a transmission takes place for the HARQ process, one or two (in case of downlink spatial multiplexing) TBs and the associated HARQ information are received from the HARQ entity.

For each received TB and associated HARQ information, the HARQ process shall:

1> if the NDI, when provided, has been toggled compared to the value of the previous received transmission corresponding to this TB; or 1> if the HARQ process is equal to the broadcast process, and this is the first received transmission for the TB according to the system information schedule indicated by RRC; or 1> if the HARQ process is associated with a transmission indicated with a MCCH-RNTI for MBS broadcast, and this is the first received transmission for the TB according to the broadcast MCCH schedule indicated by RRC; or 1> if the HARQ process is associated with a transmission indicated with a Multicast MCCH-RNTI for MBS multicast in RRC_INACTIVE, and this is the first received transmission for the TB according to the multicast MCCH schedule indicated by RRC; or 1> if the HARQ process is associated with a transmission indicated with a G-RNTI for MBS broadcast, and this is the first received transmission for the TB according to the MTCH schedule indicated by RRC or according to the scheduling indicated by DCI as specified in TS 38.214; or 1> if this is the very first received transmission for this TB (i.e. there is no previous NDI for this TB):
 2> consider this transmission to be a new transmission.
1> else:
 2> consider this transmission to be a retransmission.
The MAC entity then shall:
1> if this is a new transmission:
 2> attempt to decode the received data.
1> else if this is a retransmission:
 2> if the data for this TB has not yet been successfully decoded:
  3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
 2> if the HARQ process is equal to the broadcast process:
  3> deliver the decoded MAC PDU to upper layers.
 2> else if this is the first successful decoding of the data for this TB:
  3> deliver the decoded MAC PDU to the disassembly and demultiplexing entity.
1> else:
 2> instruct the physical layer to replace the data in the soft buffer for this TB with the data which the MAC entity attempted to decode.
1> if the HARQ process is associated with a transmission indicated with a Temporary C-RNTI and the Contention Resolution is not yet successful (see clause 5.1.5); or
1> if the HARQ process is associated with a transmission indicated with a MSGB-RNTI and the Random Access procedure is not yet successfully completed (see clause 5.1.4a); or
1> if the HARQ process is equal to the broadcast process; or
1> if the HARQ process is associated with a transmission indicated with a MCCH-RNTI or a G-RNTI for MBS broadcast; or
1> if the HARQ process is associated with a transmission indicated with a Multicast MCCH-RNTI for MBS multicast; or
1> if the HARQ process is associated with a transmission indicated with a G-RNTI or a G-CS-RNTI or a configured downlink assignment for MBS multicast and HARQ feedback is disabled for this G-RNTI or G-CS-RNTI or the corresponding G-CS-RNTI, as specified in clause 18 of TS 38.213; or
1> if the HARQ process is associated with a transmission indicated with a G-RNTI or a G-CS-RNTI or a configured downlink assignment for MBS multicast and NACK only HARQ feedback is used for this G-RNTI or G-CS-RNTI or the corresponding G-CS-RNTI and the data for this TB is successfully decoded and the transmission is not the first transmission of PDSCH where the configured downlink assignment was (re-)initialised; or
1> if the timeAlignmentTimer, associated with the TAG containing the Serving Cell on which the HARQ feedback is to be transmitted, is stopped or expired, and the Serving Cell is not configured with two TAGs, and if the cg-SDT-TimeAlignmentTimer, if configured, is not running; or 1> if the Serving Cell on which the HARQ feedback is to be transmitted is configured with two TAGs and if the timeAlignmentTimer of the TAG, associated with the TCI state(s) used for transmitting the HARQ feedback, is stopped or expired:
 2> not instruct the physical layer to generate acknowledgement(s) of the data in this TB.
1> else if the HARQ process is configured with disabled HARQ feedback:
 2> if harq-FeedbackEnablingforSPSactive is configured with value true and the transmission is the first transmission on the configured downlink assignment after activation of the configured downlink assignment:
  3> instruct the physical layer to generate acknowledgement(s) of the data in this TB.
 2> else:
  3> not instruct the physical layer to generate acknowledgement(s) of the data in this TB.
1> else:
 2> instruct the physical layer to generate acknowledgement(s) of the data in this TB.
The MAC entity shall ignore NDI received in all downlink assignments on PDCCH for its Temporary C-RNTI when determining if NDI on PDCCH for its C-RNTI has been toggled compared to the value in the previous transmission.
NOTE: If the MAC entity receives a retransmission with a TB size different from the last TB size signalled for this TB, the UE behavior is left up to UE implementation.

\* \* \* Quotation End \* \* \*

When a User Equipment (UE) is configured with or scheduled with or indicated a dual codeword transmission (e.g., for spatial multiplexing or 8Tx), the UE may generate (up to) two codewords and/or two Transport Blocks (TBs) for transmission. Whether to perform a new transmission (e.g., to generate a new codeword/TB and/or perform a transmission with the newly generated codeword/TB) or perform a retransmission (e.g., perform transmission with codeword/TB that has been generated previously) for the two codewords could be determined independently. For example, whether to perform a new transmission or a retransmission for a TB/codeword could be based on an associated New Data Indicator (NDI) in a corresponding (e.g., scheduling) Downlink Control Information (DCI)/Physical Downlink Control Channel (PDCCH). For example, when an associated NDI is toggled (e.g., value changed), the UE would realize a new transmission is to be performed (or similarly if an associated NDI is not toggled, the UE would realize a retransmission is to be performed). Since there are separate NDI bits for the two TBs/codewords, whether to perform a new transmission or retransmission could be determined independently for the two TBs/codewords. In other words, when receiving a DCI scheduling two TBs/codewords, one TB/codeword may be for the new transmission and another TB/codeword may be for the retransmission. The UE may generate a Medium Access Control (MAC) Protocol Data Unit (PDU) and/or to obtain the MAC PDU to transmit from the Multiplexing and assembly entity for the one TB/codeword for the new transmission. The UE may instruct a (corresponding/identified) Hybrid Automatic Repeat Request (HARQ) process to trigger a retransmission for the another/other TB/codeword for retransmission. If the UE does not have (any) data in the (data) buffer, the UE would not generate or would skip generating the MAC PDU for the one TB/codeword for the new transmission since the MAC PDU would include only the MAC Control Unit (CE) for padding a Buffer Status Report (BSR) or a periodic BSR with zero MAC SDUs and there is no aperiodic Channel State Information (CSI) and/or not any Uplink Control Information (UCI) requested (for this Transmission Time Interval (TTI)) and/or there is no MAC PDU to be generated for the HARQ entity (for this TTI). The UE would then perform the UL transmission with the one TB/codeword. The UE may not be able to perform the UL transmission properly, since the precoder used is for a two TB transmission. The base station may not be able to receive and or decode the transmission properly since the base station would expect/assume two TBs are transmitted by the UE.

The MAC of a UE can receive a UL grant dynamically on the PDCCH, in a Random Access Response (RAR), and/or configured semi-persistently. In the MAC, a HARQ entity maintains a number of parallel HARQ processes. The HARQ entity identifies a HARQ process for each UL grant for a given TTI. The HARQ entity obtains the MAC PDU from the Msg3 buffer and/or Multiplexing and assembly entity for the identified HARQ process. If the Multiplexing and assembly entity does not generate a MAC PDU according to the Logical Channel Prioritization (LCP) procedure, the HARQ entity flushes the related HARQ buffer. A MAC PDU may not be generated if there are no available data for transmission, when the skipUplinkTxDynamic is configured for dynamic UL grant (addressed to a Cell-Radio Network Temporary Identifier (C-RNTI)) and/or the skipUplinkTxSPS is configured for a configured UL grant (addressed to a Semi-Persistent Scheduling C-RNTI). The uplink skipping (e.g., skipUplinkTxDynamic and/or skipUplinkTxSPS) is configured by the Radio Resource Control (RRC). Throughout the present disclosure, skipUplinkTxDynamic and/or skipUplinkTxSPS may be or may be referred to as uplink skipping and/or UL transmission skipping. Throughout the present disclosure, one, some, and/or all instances of "UL transmission skipping" may correspond to, may be supplemented with and/or may be replaced by "uplink skipping", "skipUplinkTxDynamic", and/or "skipUplinkTxSPS".

In Long Term Evolution (LTE), when the Physical Layer (PHY) is configured for UL spatial multiplexing, the MAC may receive two dynamic UL grants at a given TTI from the lower layers. One dynamic UL grant (e.g., of the two dynamic UL grants) may be for a new transmission. The other dynamic UL grant (e.g., of the two dynamic UL grants) may be for a retransmission. The HARQ entity identifies two HARQ processes for the given TTI. The HARQ entity obtains a MAC PDU for the HARQ process for a new transmission. And the HARQ entity instructs the HARQ process for retransmission to perform a retransmission. Then the MAC transmits the one MAC PDU for the new transmission as the TBs to the PHY for the given TTI. However, if there is no (any) available data at the given TTI and the skipUplinkTxDynamic is configured in a UE, the Multiplexing and assembly entity would not generate the one MAC PDU, e.g., since the UE would not generate MAC PDU comprising pure padding when skipUplinkTxDynamic is configured (and there is no aperiodic CSI requested for the TTI) and/or there is no MAC PDU to be generated for the HARQ entity for this TTI (e.g., since the MAC PDU for retransmission has been generated before). In other words, UL skipping for the two UL grants are examined separately. The UE may transmit only one TB (for retransmission) although the UE receives two UL grants with UL spatial multiplexing. UL skipping could be applied for one UL grant (for new transmission) while not applied for the other UL grant (for retransmission). PHY would expect two TBs (or two codewords) when there are two dynamic UL grants at a given TTI. For example, a 4 layer UL transmission could be indicated (e.g., with both TBs enabled) for the TTI and PHY expect there would be two TBs generated with each TB mapped to two layers. The PHY is unable to generate a 4 layer transmission with one TB only (e.g., with a precoder for spatial multiplexing $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix})$$

properly and/or the base station may not be able to receive/decode the Physical Uplink Shared Channel (PUSCH) properly.

In New Radio (NR), when the PHY is configured for UL 8Tx, the MAC may receive a PDCCH indicating one or two dynamic UL grant(s) indicating two TBs and associated HARQ information (at a given TTI) from the lower layers. One TB (e.g., of the two TBs) may be for a new transmission. The other TB (e.g., of the two TBs) may be for a retransmission. The HARQ entity identifies one or two HARQ process(es) for the UL grant(s). The HARQ entity obtains a MAC PDU for the one TB for (one of) the HARQ process(es) for a new transmission. And the HARQ entity instructs (the other of) the HARQ process(es) to perform a retransmission for the other TB. Then the MAC transmits the one MAC PDU for the new transmission as the TBs to the PHY (for the given TTI). However, if there is no (any) available data and the skipUplinkTxDynamic is configured in a UE, the Multiplexing and assembly entity would not generate the one MAC PDU, e.g., since the UE would not generate a MAC PDU comprising pure padding when skipUplinkTxDynamic is configured (and there is no aperiodic CSI requested for the UL transmission) and/or there is no MAC PDU to be generated for the TB (e.g., since the MAC PDU for retransmission has been generated before). In other words, UL skipping for the two TBs are examined separately. The UE may transmit only one TB (for retransmission) although the UE receives the PDCCH indicating the UL grant(s) indicating two TBs (for 8Tx UL transmission). UL skipping could be applied for one TB (for new transmission) while not apply for the other TB (for retransmission). The PHY would expect two TBs (or two codewords). For example, a 4 layer UL transmission could be indicated (e.g., with both TBs enabled) for the UL grant(s) and PHY expect there would be two TBs generated with each TB mapped to two layers. The PHY is unable to generate a 4 layer transmission with one TB only properly and/or the base station may not be able to receive/decode the PUSCH properly.

When the PHY is configured for 8Tx (operation) and/or when maxRank>4 or maxMIMO-Layers>4 and/or the rank is more than 4 and/or when the number of layers is more than 4 and/or when dual codewords are indicated, the MAC may receive one (or two) dynamic UL grant(s) for two transport blocks and/or for two codewords (for a given TTI, e.g., slot) from the lower layers (on a PDCCH). The one (or two) UL grant(s) may be for a same time/frequency resource. The one (or two) UL grant(s) may be for the same (Orthogonal Frequency-Division Multiplexing (OFDM)) symbols. The one (or two) UL grant(s) may be for the same Physical Resource Blocks (PRBs). The one (or two) UL grant(s) may be for a same Transmit-Receive Point (TRP). The one (or two) UL grant(s) may be for two TRPs respectively. The one (or two) UL grant(s) may be associated with a same UL beam. The one (or two) UL grant(s) may be associated with two uplink beam(s) respectively. The one (or two) UL grant(s) may be associated with a same Sounding Reference Signal Resource (SRS) Indicator (SRI). The one (or two) UL grant(s) may be associated with two SRIs respectively. The one (or two) UL grant(s) may be associated with a same Control Resource Set (CORESET) pool index. The one (or two) UL grant(s) may be associated with two CORESET pool indices respectively. The one (or two) UL grant(s) may be associated with a same SRS resource set. The one (or two) UL grant(s) may be associated with two SRS resource sets respectively. The one (or two) UL grant(s) may be for a codebook based UL transmission scheme. The one (or two) UL grant(s) may be for a non-codebook based UL transmission scheme. The two transport blocks or codewords may be precoded jointly (e.g., with a same precoder). The two transport blocks or codewords may be precoded separately (e.g., with separate/different precoders). The one (or two) UL grant(s) may be associated with a same Transmission (Tx)/Reception (Rx) point (TRP). The one (or two) UL grant(s) may be associated with two TRPs respectively. One dynamic UL grant (e.g., of the two dynamic UL grants) may be for a new transmission. The other dynamic UL grant (e.g., of the two dynamic UL grants) may be for a retransmission. The HARQ entity identifies one (or two) HARQ processes for the two transport blocks/codewords (for the given TTI). And the HARQ entity obtains a (or one) MAC PDU for a new transmission for the HARQ process. And the HARQ entity instructs the HARQ process to perform a retransmission. Then the MAC transmits the one MAC PDU as the TB to the PHY (for the given TTI/symbols/PRBs).

However, if there is no (any) available data (at the given TTI) and the skipUplinkTxDynamic is configured in a UE, the Multiplexing and assembly entity would not generate the one MAC PDU, e.g., since the UE would not generate the MAC PDU comprising pure padding when skipUplinkTxDynamic is configured (and there is no aperiodic CSI requested for the PUSCH and/or no UCI to be multiplexed on the PUSCH) and/or there is no MAC PDU to be generated for the HARQ entity (for this TTI) (e.g., since the MAC PDU for retransmission has been generated before). In other words, UL skipping for the two TBs (e.g., one for the new transmission and/or one for the retransmission) are examined separately. The UE may transmit only one TB (for retransmission) although the UE receives one (or two) UL grant(s) for two TBs (or two codewords). The PHY would expect two TBs (or two codewords) when there is one (or two) dynamic UL grant(s) for two TBs/codewords for a PUSCH (at a given TTI). For example, an 8 layer UL transmission could be indicated (e.g., with both TBs enabled) for a PUSCH (for the TTI) and the PHY expects there would be two TBs generated with each TB mapped to four layers. The PHY is unable to generate an 8 layer transmission with one TB only (e.g., with a precoder for 8 layer $$\frac{1}{8}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & 1 & -1 & 1 & -1 & 1 & -1 \\ 1 & -1 & j & -j & -1 & 1 & -j & j \\ 1 & -1 & -1 & 1 & 1 & -1 & -1 & 1 \\ 1 & -1 & -j & j & -1 & 1 & j & -j \end{bmatrix}$$

properly and/or the base station may not be able to receive/decode the PUSCH properly.

If there is not enough available data (for the given TTI) and the skipUplinkTxDynamic is configured in a UE, e.g., if one of the UL grants (and/or TBs) accommodates available data and there is only padding left for the other of the UL grant (and/or TB), the Multiplexing and assembly entity generates only one MAC PDU, e.g., since the UE would not generate a MAC PDU comprising pure padding when skipUplinkTxDynamic is configured (and there is no aperiodic/periodic CSI requested for the TTI). In other words, UL skipping for the two UL grants (and/or TBs) are examined separately. The MAC may transmit only one TB to the PHY although the MAC receives two UL grants (and/or TBs) for two transport blocks and/or for two codewords (for a given TTI). UL skipping could be applied for one UL grant while not apply for the other UL grant. However, depending on the transmission schemes and/or the transmission properties, the PHY may expect two TBs (or two codewords) when there are UL grant(s) for two TBs (for a given TTI) (for a same time/frequency resource). For example, the 8 layer UL transmission could be indicated (e.g., with both TBs enabled) for the TTI and the PHY expects there would be two TBs generated with each TB mapped to four layers. Under some situations/transmission schemes/transmission properties, the PHY may be unable to generate the 8 layer transmission with one TB only. The two UL grants are associated with a same TTI. The two TBs are associated with a same HARQ process and/or UL grant.

Throughout the present disclosure, "8Tx" may be, be replaced by, represent, be referred to as "dual codeword", "maxRank>4", or "maxMIMO-Layers>4". The UE configured with 8Tx may be configured with maxRank>4 and/or maxMIMO-Layers>4.

In NR R18 MIMO, 8Tx UL was introduced. According to the PHY procedure and RRC configuration(s), maxRank and maxMIMO-Layers could be configured above 4 (up to 8). Based on the configuration(s), there could be up to two code words for PUSCH. That is to say, the UE could transmit up to two TBs (scheduled by one PDCCH or DCI) at a same timing.

In LTE, when the UE is configured for uplink spatial multiplexing, the MAC could receive two UL grants (for new transmission) for two TBs for a same TTI. When there is available data but the data amount is insufficient for two TBs (for a TTI), if at least one MAC PDU is to be generated (for this TTI), the MAC generates MAC PDUs corresponding to all UL grants (for this TTI) (even if UL skipping is configured and/or a condition for UL skipping may be fulfilled).

However, there is one case where one of two uplink grants is for retransmission and the other is for a new transmission. The first MAC PDU for retransmission "has been generated previously" and is waiting for retransmission. And when skipUplinkTxDynamic is configured, the Multiplexing and assembly entity would not generate the second MAC PDU for a new transmission if at least there is no available data. The PHY is unable to perform a corresponding transmission (e.g., 2-TB transmission) properly when a MAC generates only one TB for UL spatial multiplexing, as a two TB transmission is scheduled by DCI and is expected by a Network (NW).

To solve the issue, it may not be allowed (for the network) to provide a configuration (or any configuration) such that a UE is configured with (both) 8Tx and UL transmission skipping (simultaneously). Alternatively and/or additionally, it may be allowed (for the network) to provide a configuration (or any configuration) such that a UE is configured with 8Tx and without UL transmission skipping, or a UE is configured with UL transmission skipping and without 8Tx.

The NW may not provide a configuration (or any configuration) such that a parameter to indicate UL skipping (e.g., skipUplinkTxDynamic set to true), if the PHY is configured for 8Tx (or dual codeword) (or if maxRank>4 or maxMIMO-Layers>4). For example, the NW may not configure a parameter to indicate UL skipping (e.g., skipUplinkTxDynamic) to the UE when 8Tx is configured. For example, the NW may configure the value of a parameter to indicate UL skipping (e.g., skipUplinkTxDynamic) as false to the UE when 8Tx is configured.

The NW may not provide a configuration (or any configuration) such that the PHY is configured with 8Tx, if a parameter to indicate UL skipping (e.g., skipUplinkTxDynamic) in an RRC configuration is set to true. For example, the NW may not configure 8Tx if a parameter to indicate UL skipping (e.g., skipUplinkTxDynamic) is configured. For example, the NW may not configure 8Tx if the value of a parameter to indicate UL skipping (e.g., skipUplinkTxDynamic) is configured as true.

The NW may configure 8Tx and UL skipping to the UE (simultaneously). The NW is not allowed to indicate (in a DCI) the UE to perform a UL transmission with two transport blocks when the NW configures 8Tx and UL skipping to the UE. The NW is not allowed to indicate (in a DCI) one or two UL grants for two codewords (transport blocks) for a given TTI and/or for a same time/frequency resource to the UE when the NW configures 8Tx and UL skipping to the UE. The NW is not allowed to indicate (in a DCI) the UE to enable both transport blocks when the NW configures 8Tx and UL skipping to the UE. The NW is not allowed to indicate (in a DCI format associated with dual codeword) both codewords/transport blocks enabled when the NW configures 8Tx and UL skipping to the UE. The NW is not allowed to indicate (in a DCI format associated with a dual codeword) neither the combination of $I_{MCS}=0$ and $N_{PRB}>1$ nor the combination of $I_{MCS}=28$ and $N_{PRB}=1$ for both transport blocks when the NW configures 8Tx and UL skipping to the UE. The NW shall indicate (in a DCI) the UE to perform a UL transmission with a single transport block when the NW configures 8Tx and UL skipping to the UE. The NW shall indicate (in a DCI) the UE to enable a single transport block when the NW configures 8Tx and UL skipping to the UE.

The NW shall indicate (in a DCI) the UE to disable one transport block when the NW configures 8Tx and UL skipping to the UE. The NW shall indicate (in a DCI format associated with a dual codeword) the UE either the combination of $I_{MCS}=0$ and $N_{PRB}>1$ or the combination of $I_{MCS}=28$ and $N_{PRB}=1$ for a transport block when the NW configures 8Tx and UL skipping to the UE. The NW shall schedule the UE with DCI format 0 or schedule the UE with a DCI format associated with a dual codeword wherein either the combination of $I_{MCS}=0$ and $N_{PRB}>1$ or the combination of $I_{MCS}=28$ and $N_{PRB}=1$ for a transport block in a DCI format associated with a dual codeword when the NW configures 8Tx and UL skipping to the UE.

The NW may configure UL spatial multiplexing and UL skipping to the UE (simultaneously). The NW is not allowed to indicate (in a DCI) the UE to perform a UL transmission with one transport block for a new transmission and the other transport block for retransmission when the NW configures UL spatial multiplexing and UL skipping to the UE. The NW shall indicate (in a DCI) the UE to perform a UL transmission with either both transport blocks for a new transmission or both transport blocks for retransmission when the NW configures UL spatial multiplexing and UL skipping to the UE. The NW is not allowed to indicate (in a DCI) the UE with a first NDI bit for one transport block toggled and a second NDI bit for the other transport block not toggled when the NW configures UL spatial multiplexing and UL skipping to the UE. The NW shall indicate (in a DCI) the UE with either a first NDI bit for one transport block toggled and a second NDI bit for the other transport block toggled or a first NDI bit for one transport block not toggled and a second NDI bit for the other transport block not toggled when the NW configures UL spatial multiplexing and UL skipping to the UE. The NW shall enable a single transport block (in a DCI) for the UE when a single transport block requires retransmission and the NW configures UL spatial multiplexing and UL skipping to the UE. The NW shall enable a single transport block (in a DCI) for the UE when at least one and/or only one NDI bit (in the DCI) is not toggled and the NW configures UL spatial multiplexing and UL skipping to the UE. The NW could enable both transport blocks (in a DCI) for the UE when both NDI bits (in the DCI) are not toggled and the NW configures UL spatial multiplexing and UL skipping to the UE. The NW could enable both transport blocks (in a DCI) for the UE when both NDI bits (in the DCI) are toggled and the NW configures UL spatial multiplexing and UL skipping to the UE.

The NW may configure 8Tx (or dual codeword or maxRank>4 or maxMIMO-Layers>4) for UL and UL skipping to the UE (simultaneously). The NW is not allowed to indicate (in a DCI) the UE to perform a UL transmission with one transport block for a new transmission and the other transport block for retransmission when the NW configures 8Tx for UL and UL skipping to the UE. The NW shall indicate (in a DCI) the UE to perform a UL transmission with either both transport blocks for a new transmission or both transport blocks for retransmission when the NW configures 8Tx for UL and UL skipping to the UE. The NW is not allowed to indicate (in a DCI) the UE with a first NDI bit for one transport block toggled and a second NDI bit for the other transport block not toggled when the NW configures 8Tx for UL and UL skipping to the UE. The NW shall indicate (in a DCI) the UE with either a first NDI bit for one transport block toggled and a second NDI bit for the other transport block toggled or a first NDI bit for one transport block not toggled and a second NDI bit for the other transport block not toggled when the NW configures 8Tx for UL and UL skipping to the UE. The NW shall enable a single transport block (in a DCI) for the UE when a single transport block requires retransmission and the NW configures 8Tx for UL and UL skipping to the UE. The NW shall enable a single transport block (in a DCI) for the UE when at least one and/or only one NDI bit (in the DCI) is not toggled and the NW configures 8Tx for UL and UL skipping to the UE. The NW could enable both transport blocks (in a DCI) for the UE when both NDI bits (in the DCI) are not toggled and the NW configures 8Tx for UL and UL skipping to the UE.

The NW could enable both transport blocks (in a DCI) for the UE when both NDI bits (in the DCI) are toggled and the NW configures 8Tx for UL and UL skipping to the UE.

The NW may configure 8Tx and UL skipping to the UE (simultaneously). The NW is not allowed to enable 8Tx with DCI when the NW configures 8Tx and UL skipping to the UE. The NW is not allowed to indicate (in a DCI) the UE to perform a UL transmission with 8Tx when the NW configures 8Tx and UL skipping to the UE. The NW is not allowed to schedule the UE with DCI format associated with a dual codeword (e.g., to perform UL transmission with multiple codewords/TBs) when the NW configures 8Tx and UL skipping to the UE. The NW shall indicate (in a DCI) the UE to perform a UL transmission without 8Tx when the NW configures 8Tx and UL skipping to the UE. The NW shall indicate (in a DCI) the UE to perform a UL transmission with a single codeword/TB when the NW configures 8Tx and UL skipping to the UE. The NW shall schedule the UE with DCI format 0 (e.g., to perform a UL transmission with a single TB/codeword) when the NW configures 8Tx and UL skipping to the UE.

The above restriction(s) to NW configurations and/or NW indications may be applied when the NW is unsure about the available data at the UE side and/or when the NW realizes the amount of available data at the UE side is small. The above restriction(s) to the NW configuration and/or NW indication is not applied when the NW realizes the amount of available data at the UE side is large. For example, the NW could realize the amount of available data based on a buffer status report from a UE. The above restriction(s) to the NW configuration and/or the NW indication is applied when the NW does not receive the buffer status report from the UE (for a long time) and/or the NW does not have the latest buffer status information of the UE and/or when the NW receives a scheduling request from the UE and/or when the NW schedules the UE in response to a scheduling request from the UE and/or when the NW receives a buffer status report indicating a small amount of available data and/or when the NW receives a buffer status report indicating the amount of available data is smaller than a size of one transport block and/or when the NW receives a buffer status report indicating the amount of available data resulting in data in one transport block while no data in another transport block. The above restriction(s) to the NW configuration and/or NW indication is not applied when the NW receives a buffer status report indicating a large amount of available data and/or when the NW receives a buffer status report indicating the amount of available data is larger than a size of one transport block and/or when the NW receives a buffer status report indicating the amount of available data resulting in data in both transport blocks.

The NW may configure 8Tx and UL skipping to the UE (simultaneously). The NW may not be allowed to perform a first event in response to a third event. The NW may perform a second event in response to the third event. The NW may perform a fourth event in response to a fifth condition.

The first event may be (at least) one or more of the following:
  Indicate (in a DCI) the UE to perform a UL transmission with two transport blocks;
  Indicate (in a DCI) two UL grants or two TBs for a UL grant (or e.g., two TB transmission, dual codeword transmissions, rank>4, MIMO layer>4) for a given TTI to the UE;
  Indicate (in a DCI) the UE to enable both transport blocks (or e.g., two TB transmissions, dual codeword transmissions, rank>4, MIMO layer>4);
  Indicate (in a DCI) the UE to perform a UL transmission with a single transport block (or e.g., single TB transmissions, single codeword transmissions, rank<=4, MIMO layer<=4);
  Indicate (in a DCI) the UE to enable a single transport block (or e.g., single TB transmissions, single codeword transmissions, rank<=4, MIMO layer<=4);
  Indicate (in a DCI) the UE to disable one transport block;
  Indicate (in a DCI format) combination(s) other than $I_{MCS}=26$ and $rv_{id}=1$ for both transport blocks;
  Enable 8Tx (or e.g., two TB transmissions, dual codeword transmissions, rank>4, MIMO layer>4) with DCI;
  Indicate (in a DCI) the UE to perform a UL transmission with 8Tx (or e.g., two TB transmissions, dual codeword transmissions, rank>4, MIMO layer>4); and/or
  Schedule the UE with a DCI format associated with 8Tx (e.g., to perform a UL transmission with multiple antenna ports).

The second event may be (at least) one or more of the following:
  Indicate (in a DCI format) the UE $I_{MCS}=26$ and $rv_{id}=1$ for a transport block;
  Schedule the UE with DCI format 0 or schedule the UE with a DCI format associated with 8Tx, wherein the combination of $I_{MCS}=26$ and $rv_{id}=1$ is indicated for a transport block in a DCI format associated with 8Tx;
  Indicate (in a DCI) the UE to perform a UL transmission without 8Tx (or e.g., two TB transmissions, dual codeword transmissions, rank>4, MIMO layer>4);
  Indicate (in a DCI) the UE to perform a UL transmission with a single antenna port; and/or
  Schedule the UE with DCI format 0 (e.g., to perform a UL transmission with a single antenna port).

The third event may be (at least) one or more of the following:
  The NW is unsure about the available data at the UE side;
  The NW realizes the amount of available data at the UE side is small;
  The NW does not receive a buffer status report from the UE (for a long time);
  The NW does not have the latest buffer status information of the UE;
  The NW receives a scheduling request from the UE;
  The NW schedules the UE in response to a scheduling request from the UE;
  The NW receives a buffer status report indicating a small amount of available data;
  The NW receives a buffer status report indicating the amount of available data is smaller than a size of one transport block; and/or
  The NW receives a buffer status report indicating the amount of available data resulting in data in one transport block while no data in another transport block (and/or when the NW configures 8Tx and UL skipping to the UE).

The fourth event may be (at least) one or more of the following:
  Indicate (in a DCI) the UE to perform a UL transmission with two transport blocks (e.g., dual codeword, rank>4, MIMO layer>4);
  Indicate (in a DCI) two UL grants or two TBs for a UL grant (or e.g., two TB transmissions, dual codeword transmissions, rank>4, MIMO layer>4) for a given TTI to the UE;
  Indicate (in a DCI) the UE to enable both transport blocks (or e.g., two TB transmissions, dual codeword transmissions, rank>4, MIMO layer>4);

Indicate (in a DCI) the UE to perform a UL transmission with a single transport block (or e.g., single TB transmissions, single codeword transmissions, rank<=4, MIMO layer<=4) or two transport blocks (or e.g., two TB transmissions, dual codeword transmissions, rank>4, MIMO layer>4);

Indicate (in a DCI) the UE to enable a single transport block (or e.g., single TB transmissions, single codeword transmissions, rank<=4, MIMO layer<=4) or two transport blocks (or e.g., two TB transmissions, dual codeword transmissions, rank>4, MIMO layer>4);

Indicate (in a DCI) the UE to disable one transport block or to enable both transport blocks (or e.g., two TB transmissions, dual codeword transmissions, rank>4, MIMO layer>4);

Indicate (in a DCI associated with 8Tx) so that $I_{MCS}=26$ and $rv_{id}=1$ is not satisfied for both transport blocks;

Indicate (in a DCI format) the UE combination(s) other than $I_{MCS}=26$ and $rv_{id}=1$ for both transport blocks;

-Schedule the UE with DCI format associated with 8Tx wherein combination(s) other than $I_{MCS}=26$ and $rv_{id}=1$ for both transport blocks are signaled in DCI format associated with 8Tx;

Enable 8Tx (or e.g., two TB transmissions, dual codeword transmissions, rank>4, MIMO layer>4) with DCI;

Indicate (in a DCI) the UE to perform a UL transmission with 8Tx (or e.g., two TB transmissions, dual codeword transmissions, rank>4, MIMO layer>4);

Indicate (in a DCI) the UE to perform a UL transmission with or without 8Tx (or e.g., two TB transmissions, dual codeword transmissions, rank>4, MIMO layer>4);

Indicate (in a DCI) the UE to perform a UL transmission with a single antenna port or multiple antenna ports;

Schedule the UE with a DCI format associated with 8Tx (e.g., to perform a UL transmission with multiple antenna ports); and/or Schedule the UE with a DCI format associated with 8Tx (e.g., to perform a UL transmission with multiple antenna ports).

The fifth event may be (at least) one or more of the following:

The NW realizes the amount of available data at the UE side is large;

The NW receives a buffer status report indicating a large amount of available data;

The NW receives a buffer status report indicating the amount of available data is larger than a size of one transport block; and/or The NW receives a buffer status report indicating the amount of available data resulting in data in both transport blocks (and/or when the NW configures 8Tx and UL skipping to the UE).

To solve the issue, the UE may not skip any UL transmissions for UL spatial multiplexing. The UE may be configured with UL spatial multiplexing. The UE may not have any available data for transmission. The UE may have generated a TB or MAC PDU (previously). The UE may receive one UL grant for a new transmission (for a TTI). The UE may receive another UL grant for retransmission (for the TTI). The UL grant for the new transmission and the UL grant for retransmission may be for UL spatial multiplexing, e.g., for transmission in a same time/frequency resource(s). The UE may receive one UL grant for a new transmission and another UL grant for retransmission of the TB or MAC PDU (e.g., which have been generated previously) (for one TTI). The UE may not skip a UL transmission and/or may generate one MAC PDU for a new transmission (for a TTI) when the UE receives one UL grant for the new transmission and another UL grant for retransmission (for the TTI). The UE may not skip a UL transmission and/or may generate one MAC PDU for a new transmission (for a TTI) due to or in response to a retransmission (e.g., being triggered) (e.g., for another MAC PDU (e.g., generated previously)) (for the TTI). The UE may generate one MAC PDU including padding only for a new transmission (e.g., for a TTI) when the UE receives one UL grant for the new transmission and another UL grant for retransmission (for the TTI). The UE may generate one MAC PDU including padding only for a new transmission due to or in response to a retransmission (e.g., being triggered) (e.g., for another MAC PDU (e.g., generated previously)) (for the TTI). The UE may generate one MAC PDU for the new transmission (e.g., for a TTI) including only MAC CE for padding a BSR or a periodic BSR with zero MAC SDUs when the UE receives one UL grant for a new transmission and another UL grant for retransmission (for the TTI). The UE may generate one MAC PDU for a new transmission including only MAC CE for a padding BSR or a periodic BSR with zero MAC SDUs due to or in response to a retransmission (e.g., being triggered) (e.g., for another MAC PDU (e.g., generated previously)) (for the TTI).

The UE may perform a UL transmission with one MAC PDU for a new transmission and another MAC PDU for retransmission in the TTI. For example, the Multiplexing and assembly entity may ignore the condition of not generating the MAC PDU when the UE receives one UL grant for the new transmission and another UL grant for retransmission (for the TTI). For example, the HARQ entity may indicate the Multiplexing and assembly entity to generate a padding MAC PDU when the UE receives one UL grant for the new transmission and another UL grant for retransmission (for the TTI). For example, the HARQ entity may obtain the MAC PDU from another/other HARQ buffer when the UE receives one UL grant for the new transmission and another UL grant for retransmission (for the TTI).

The NW may configure UL spatial multiplexing and a parameter to indicate UL skipping (e.g., skipUplinkTxDynamic) to the UE. The UE may receive two UL grants (for a given TTI) (on a PDCCH/DCI). One UL grant of the two UL grants may be for a new transmission. Another UL grant of the two UL grants may be for retransmission.

In one example, the UE may generate a MAC PDU for a given TTI (or for a UL grant) regardless of whether the UE has available data or not when the UE receives (the) one UL grant for a new transmission and another UL grant for retransmission for the given TTI (or scheduled by a PDCCH). The UE may generate a MAC PDU for a given TTI (or for a UL grant) when the UE has no data available for transmission and/or when the UE receives one UL grant for a new transmission and another UL grant for retransmission for the given TTI. With the LCP procedure, the UE may not generate a MAC PDU(s) if the UE has no data available for transmission, the MAC entity is configured with a second parameter (e.g., skipUplinkTxDynamic), and/or the grant is addressed to a C-RNTI, and/or the UE does not have two UL grants for the given TTI and/or the UE has two UL grants both for new transmissions for the given TTI.

In one example, the UE may generate a MAC PDU regardless of whether the UE has available data or not when the UE is configured for UL spatial multiplexing. With the LCP procedure, the UE may not generate a MAC PDU if the UE have no data available for transmission, the MAC entity is configured with a second parameter (e.g., skipUplinkTx- Dynamic), and/or the grant is addressed to a C-RNTI, and/or the PHY is not configured for UL spatial multiplexing.

In one example, the UE may generate MAC PDU(s) regardless of whether the UE has data available for retransmission or not when the UL grant is for spatial multiplexing transmission. With the LCP procedure, the UE may not generate a MAC PDU if the UE has no data available for retransmission, and/or the MAC entity is configured with a second parameter (e.g., skipUplinkTxDynamic), and/or the grant is addressed to a C-RNTI not for UL spatial multiplexing.

In one example, the UE may generate a padding MAC PDU if the UE does not obtain a MAC PDU for a new transmission for a given TTI, when the UE has one UL grant for a new transmission and another UL grant for retransmission for the TTI. If a MAC PDU to transmit has not been obtained for the new transmission for the given TTI and a MAC PDU for retransmission has been generated, the UE may indicate the Multiplexing and an assembly entity to generate a padding MAC PDU for the new transmission. A padding MAC PDU may not be generated when receiving two UL grants, both for new transmissions for the TTI.

In one example, the UE may obtain a MAC PDU from other HARQ buffer if the UE does not obtain a MAC PDU for a new transmission for a TTI, when the UE has one UL grant for a new transmission and another UL grant for retransmission for the TTI. If a MAC PDU to transmit for a new transmission has not been obtained and the UE has one UL grant for the new transmission and another UL grant for retransmission for the TTI, the UE may obtain the MAC PDU from the other HARQ buffer associated with the TTI. The UE may not obtain a MAC PDU(s) from another/other HARQ buffer when the UE has two UL grants, both for new transmissions for the TTI. The UE may not obtain a MAC PDU(s) for a new transmission when the UE has two UL grants, both for new transmissions for the TTI, e.g., if there is no data available for transmission.

One and/or both of the MAC PDUs associated with the given TTI may contain only padding, padding BSR, and/or periodic BSR with zero MAC SDU.

The following Text Proposals (TPs) could be considered as examples for the present invention:

indicated to the HARQ entity (for the TTI). If (at least) one MAC PDU (e.g., the first MAC PDU) has been generated for the PDCCH, (the MAC entity of) the UE may generate the MAC PDU (e.g., the second MAC PDU) corresponding to (one of) UL grants (e.g., the second UL grant) indicated to the PDCCH. The UE may receive two UL grants indicated to the HARQ entity (for the TTI). A first UL grant of the two UL grants may be for a retransmission. A second UL grant of the two UL grants may be for a new transmission. The UE may receive the PDCCH indicating the two UL grants. The PDCCH may indicate a first UL grant for retransmission of the first MAC PDU and the second UL grant for a new transmission. The UE may retransmit the first MAC PDU (for the TTI) using the first UL grant. There may be no available data for the new transmission (for the TTI). The second MAC PDU for the new transmission may contain only padding, padding BSR, and/or periodic BSR with a zero MAC SDU. The UE may generate the second MAC PDU (corresponding to the second UL grant) based on the first MAC PDU being retransmitted. The UE may generate the second MAC PDU based on the first MAC PDU has been generated.

To solve the issue, the UE could generate a MAC PDU corresponding to a UL grant indicating by a PDCCH, based on another MAC PDU is to be retransmitted for the PDCCH. The UE may receive a first parameter (e.g., maxMIMO-Layers)>4 and a second parameter (e.g., skipUplinkTxDynamic). The UE may have no available data for a new transmission. The UE may receive a first UL grant for retransmission and a second UL grant for a new transmission on a first PDCCH. The UE may generate a second MAC PDU corresponding to the second UL grant indicated by the first PDCCH, based on a first MAC PDU is to be retransmitted for the first PDCCH, wherein the second MAC PDU comprises a zero MAC SDU and/or there is no data available for transmission. The UE may perform the retransmission of the first MAC PDU and a new transmission of the second MAC PDU using the two UL grants.

In one example, the UE may receive, from a network node, a first parameter indicating MIMO layers (e.g., maxRank or maxMIMO-Layers) with a value above 4. The UE may receive, from the network node, a second parameter

---

NOTE 1a: If at least one MAC PDU is to be generated or to be retransmitted for the HARQ entity for this TTI, the MAC entity generates MAC PDU(s) corresponding to all UL grant(s) indicated to the HARQ entity for this TTI.

NOTE 1a: If at least one MAC PDU is to be generated or has been generated for the HARQ entity for this TTI, the MAC entity generates MAC PDU(s) corresponding to all UL grant(s) indicated to the HARQ entity for this TTI.

---

For example, if (at least) one MAC PDU (e.g., a first MAC PDU) is to be retransmitted for a HARQ entity (for a TTI), (a MAC entity of) the UE may generate a MAC PDU (e.g., a second MAC PDU) corresponding to (one of) UL grants indicated to the HARQ entity (for the TTI). If (at least) one MAC PDU (e.g., the first MAC PDU) is to be retransmitted for a PDCCH, (a MAC entity of) the UE may generate a MAC PDU (e.g., the second MAC PDU) corresponding to (one of) UL grants (e.g., a second UL grant) indicated by the PDCCH. Alternatively and/or additionally, if (at least) one MAC PDU (e.g., the first MAC PDU) has been generated for the HARQ entity (for the TTI) and/or has been stored in an associated HARQ buffer (e.g., when a retransmission for the first MAC PDU is requested), (the MAC entity of) the UE may generate the MAC PDU (e.g., the second MAC PDU) corresponding to (one of) UL grants indicating UL skipping (e.g., skipUplinkTxDynamic). The UE may be configured with 8Tx transmission. The UE may be configured with UL skipping. The UE may receive a first UL grant and a second UL grant on a first PDCCH. The first UL grant may be for a retransmission of a first MAC PDU. The second UL grant may be for a first new transmission. The UE may generate a second MAC PDU corresponding to the second UL grant indicated by the first PDCCH if, when, and/or based on (at least) the first MAC PDU is to be retransmitted for the first PDCCH and/or (wherein) there is no data available for transmission and/or there is no data available for any Logical Channel Group (LCG) and/or there is no data available in (data) buffer. The UE may perform the retransmission for the first MAC PDU using the first UL grant and perform the first new transmission for the second MAC PDU using the second UL grant. The second MAC PDU may comprise a zero MAC SDU. The first MAC PDU may have been generated before receiving the first PDCCH. The first PDCCH may indicate a first NDI for the first UL grant and a second NDI for the second UL grant. The first PDCCH may indicate UL transmissions for two TBs. The first NDI may be not toggled. The second NDI may be toggled. There may be no aperiodic CSI requested for a PUSCH transmission of the first new transmission and the retransmission. There may be no UCI to be multiplexed for the PUSCH transmission of the first new transmission and the retransmission. The UE may receive a third UL grant for a second new transmission on a second PDCCH for the first MAC PDU before receiving the first PDCCH. The second PDCCH may indicate a third NDI for the third UL grant. The third NDI may be toggled. The UE may receive a fourth UL grant for a third new transmission and a fifth UL grant for a fourth new transmission on a third PDCCH. The UE may not generate MAC PDUs for the fourth UL grant and the fifth UL grant if, when, and/or based on (at least) there is no data available for transmission, and/or there is no data available for any LCG and/or there is no data available in (data) buffer and/or there is no MAC PDU to be generated/retransmitted for the third PDCCH. The UE may not generate (any of) the MAC PDUs (for the fourth UL grant and the fifth UL grant) including zero MAC SDUs.

In one example, the UE may receive, from a network node, a first parameter indicating MIMO layers (e.g., maxRank or maxMIMO-Layers) with a value above 4. The UE may receive, from the network node, a second parameter indicating UL skipping (e.g., skipUplinkTxDynamic). The UE may be configured with 8Tx transmission. The UE may be configured with UL skipping. The UE may receive a first UL grant and a second UL grant on a first PDCCH. The first UL grant may be for a first new transmission. The second UL grant may be for a second new transmission. The UE may perform the first new transmission for a first MAC PDU using the first UL grant and the second new transmission for a second MAC PDU using the second UL grant. The UE may receive a third UL grant and a fourth UL grant on a second PDCCH. The third UL grant may be for a retransmission of the first MAC PDU. The fourth UL grant may be for a third new transmission. The UE may generate a third MAC PDU corresponding to the fourth UL grant indicated by the second PDCCH if, when, and/or based on (at least) the first MAC PDU is to be retransmitted for the second PDCCH, there is no data available for transmission and/or there is no data available for any LCG and/or there is no data available in (data) buffer. The UE may perform the retransmission for the first MAC PDU using the third UL grant and the third new transmission for the third MAC PDU using the fourth UL grant. The first PDCCH may indicate a first NDI for the first UL grant, wherein the first NDI is toggled. The first PDCCH may indicate a second NDI for the second UL grant, wherein the second NDI is toggled. The second PDCCH may indicate a third NDI for the third UL grant, wherein the third NDI is not toggled. The second PDCCH may indicate a fourth NDI for the fourth UL grant, wherein the fourth NDI is toggled. The third MAC PDU may comprise a zero MAC SDU. There may be no aperiodic CSI requested for a PUSCH transmission of the third new transmission and the retransmission. There may be no UCI to be multiplexed for the PUSCH transmission of the third new transmission and the retransmission. The first PDCCH may indicate UL transmissions for two TBs. The second PDCCH may indicate other/another UL transmissions for two TBs. The UE may receive a fifth UL grant for a fourth new transmission and a sixth UL grant for a fifth new transmission on a third PDCCH. The UE may not generate MAC PDUs for the fifth UL grant and the sixth UL grant if, when, and/or based on (at least) there is no data available for transmission, and/or there is no data available for any LCG and/or there is no data available in (data) buffer and/or there is no MAC PDU to be generated/retransmitted for the third PDCCH. The UE may not generate (any of) the MAC PDUs (for the fifth UL grant and the sixth UL grant) including zero MAC SDUs.

To solve the issue, the UE may skip both UL transmissions for UL spatial multiplexing for a given TTI. The UE may skip UL transmissions and/or not generate any MAC PDUs for a given TTI if the UE has no data available for transmission when the UE receives one UL grant for a new transmission and another UL grant for retransmission for the given TTI. The UE may skip UL transmissions and/or not generate any MAC PDUs for a given TTI if the UE has no data available for transmission when the UE is configured for UL spatial multiplexing. The UE may skip UL transmissions and/or not generate any MAC PDUs for a given TTI if the UE has no data available for transmission when the UL grants associated with the TTI are for UL spatial multiplexing transmission.

The UE may skip both UL transmissions for UL spatial multiplexing for a given TTI when the UE receives one UL grant for a new transmission and another UL grant for retransmission and MAC PDUs for the new transmission includes padding only. The UE may skip both UL transmissions for UL spatial multiplexing for a given TTI when the UE receives one UL grant for a new transmission and another UL grant for retransmission for the TTI and the MAC PDU for a new transmission includes only the MAC CE for padding BSR or periodic BSR with zero MAC SDUs. The UE may skip both UL transmissions for UL spatial multiplexing for a given TTI when the UE receives one UL grant for a new transmission and another UL grant for retransmission for the TTI and the MAC PDU for a new transmission (or MAC PDU associated with one of the UL grants) includes only the MAC CE for a padding BSR or periodic BSR with zero MAC SDUs and a MAC for retransmission has been generated.

For example, the Multiplexing and assembly entity may not generate any MAC PDU when there is no data available for transmission and/or for any LCG and/or in (data) buffer and the UE receives one UL grant for a new transmission and another UL grant for retransmission for a given TTI. For example, the HARQ entity may discard a MAC PDU for retransmission (e.g., which has been generated previously) if the other MAC PDU for a new transmission for the given TTI is not obtained. For example, the HARQ entity may not instruct the PHY to generate a transmission if a MAC PDU for a new transmission for a given TTI is not obtained and a MAC PDU for retransmission has been generated. The UE may not perform transmission in a TTI if a MAC PDU for a new transmission for the TTI is not obtained and a MAC PDU for retransmission for the TTI has been generated.

The NW may configure UL spatial multiplexing and a second parameter (e.g., skipUplinkTxDynamic) to the UE. The UE may receive one UL grant for a new transmission and another UL grant for retransmission.

In one example, the UE may discard a MAC PDU for retransmission for a TTI or flush HARQ buffer associated with a MAC PDU for retransmission for a TTI if the other MAC PDU for the TTI would not be obtained when the UE receives one UL grant for a new transmission and another UL grant for retransmission for the TTI. If a MAC PDU for a new transmission for a TTI is not obtained, the UE may discard the other MAC PDU for retransmission for the TTI. The UE may flush the related HARQ buffer associated with the TTI and/or not instruct the identified HARQ process for the TTI to trigger a retransmission.

In one example, the UE may not instruct the PHY in the UE to generate a transmission if a MAC PDU for a new transmission for a TTI is not obtained when the UE receives one UL grant for the new transmission and another UL grant for retransmission for a TTI. If the UE receives one UL grant for a new transmission and another UL grant for retransmission for a TTI and a MAC PDU for the new transmission for the TTI is obtained, the UE may instruct to generate a transmission for the MAC PDU. Otherwise, the UE may flush the related HARQ buffer.

The NW may request an aperiodic CSI for a TTI when scheduling a UE with a new transmission and a retransmission for the TTI.

The following TPs could be considered as examples for the present invention:

---

The UE is not expected to be scheduled a new transmission and a retransmission for a TTI when/if UL spatial multiplexing is configured and/or UL skipping is configured and/or there is no data available for transmission and/or aperiodic CSI is not requested.

The UE is not expected to generate a MAC PDU for a new transmission for a TTI comprising only the MAC CE for padding BSR or periodic BSR with zero MAC SDUs when/if a retransmission is scheduled for the TTI and/or UL spatial multiplexing is configured and/or UL skipping is configured and/or there is no data available for transmission and/or aperiodic CSI is not requested.

---

To solve the issue, the UE may not skip any UL transmissions for 8Tx (or dual codeword or maxRank>4 or maxMIMO-Layers>4 or rank>4 or MIMO layer>4). The UE may be configured with 8Tx (or dual codeword or maxRank>4 or maxMIMO-Layers>4 or rank>4 or MIMO layer>4). The UE may not have any available data for a (new) transmission. The UE may have generated a (second) TB or MAC PDU (previously). The UE may receive one UL grant for a new transmission of a TB/MAC PDU for a HARQ process and/or for a slot and for retransmission of another TB/MAC PDU (e.g., the second TB/MAC PDU) for the (same) HARQ process and/or for the slot. The UL grant for a new transmission and for retransmission may be for UL spatial multiplexing and/or for transmission in a same time/frequency resource(s). The UL grant for a new transmission and for retransmission may be for 8Tx or two TB transmission.

The UE may receive one UL grant for a new transmission of one (first) TB/MAC PDU (e.g., to be generated) and for retransmission of the (second) TB or MAC PDU (e.g., which have been generated previously) (for one TTI). The UE may not skip a UL transmission and/or may generate one MAC PDU for a new transmission for a HARQ process and/or for a TTI when the UE receives one UL grant for the new transmission and another UL grant for retransmission (for the TTI) and/or when there is no data available for transmission and/or for any LCG and/or in (data) buffer. The UE may not skip UL transmission and/or may generate one MAC PDU for a new transmission for a HARQ process and/or for a TTI due to or in response to a retransmission (e.g., being triggered) (e.g., for another MAC PDU (e.g., generated previously)) (for the TTI). The UE may generate one MAC PDU including padding only for a new transmission (e.g., for a HARQ process and/or for a TTI) when the UE receives one UL grant for the new transmission for retransmission for a HARQ process and/or for a TTI. The UE may generate one MAC PDU includes padding only for a new transmission due to or in response to a retransmission (e.g., being triggered) (e.g., for another MAC PDU (e.g., generated previously)) (for the TTI). The UE may generate one MAC PDU for a new transmission including only MAC CE for a padding a BSR or periodic BSR with zero MAC SDUs (e.g., for a HARQ process and/or for a TTI) when the UE receives one UL grant for the new transmission and for retransmission for a HARQ process and/or for a TTI. The UE may generate one MAC PDU for a new transmission including only MAC CE for a padding BSR or periodic BSR with zero MAC SDUs (e.g., for a HARQ process and/or for a TTI) due to or in response to a retransmission (e.g., being triggered) (e.g., for another MAC PDU (e.g., generated previously)) for a HARQ process and/or for a TTI. The UE may perform a UL transmission with one MAC PDU for a new transmission and another MAC PDU for retransmission for the HARQ process and/or in the TTI. For example, the Multiplexing and assembly entity may ignore the condition of not generating the MAC PDU when the UE receives one UL grant for a new transmission and for retransmission for the HARQ process and/or for the TTI. For example, the HARQ entity may indicate the Multiplexing and assembly entity to generate a padding MAC PDU when the UE receives one UL grant for a new transmission and for retransmission for the HARQ process and/or for the TTI. For example, the HARQ entity may obtain the MAC PDU from another/other HARQ buffer when the UE receives one UL grant for a new transmission and for retransmission for the HARQ process and/or for the TTI. The NW may configure 8Tx (or dual codeword or maxRank>4 or maxMIMO-Layers>4 or rank>4 or MIMO layer>4) and a second parameter to indicate UL skipping (e.g., skipUplinkTxDynamic) to the UE. The UE may receive the second parameter of UL skipping (e.g., skipUplinkTxDynamic) from the NW. The UE may receive a first parameter indicating MIMO layers (e.g., maxRank, maxMIMO-Layers) as value above 4 from the NW. The UE may receive one UL grant for a new transmission of one TB/MAC PDU and for retransmission of another TB/MAC PDU indicated by a PDCCH, for a given HARQ process(es) and/or for a given TTI.

In one example, the UE may generate a MAC PDU for a HARQ process and/or for a TTI regardless of whether the UE has available data or not when the UE receives one UL grant for a new transmission and for retransmission for the HARQ process and/or for the TTI. The UE may generate MAC PDU for a given TTI when the UE has no data available for transmission and/or when the UE receives one UL grant for a new transmission and for retransmission for a HARQ process and/or for a TTI. With the LCP procedure, the UE may not generate a MAC PDU(s) if the UE has no data available for transmission, the MAC entity is configured with a second parameter (e.g., skipUplinkTxDynamic), the grant is addressed to a C-RNTI, and/or the UE does not have one UL grant for two TBs for the HARQ process and/or for the TTI and/or the UE have one UL grant for two TBs both for new transmissions for the HARQ process and/or for the TTI.

In one example, the UE may generate a MAC PDU regardless of whether the UE has available data or not when the UE is configured for 8Tx. With the LCP procedure, the UE may not generate a MAC PDU if the UE have no data available for transmission, the MAC entity is configured with a second parameter (e.g., skipUplinkTxDynamic), the grant is addressed to a C-RNTI, and/or the PHY is not configured for 8Tx.

In one example, the UE may generate MAC PDU(s) regardless of whether the UE has data available for transmission or not when the UL grant is for 8Tx. With the LCP procedure, the UE may not generate a MAC PDU if the UE has no data available for retransmission, the MAC entity is configured with a second parameter (e.g., skipUplinkTxDynamic), and/or the grant is addressed to a C-RNTI not for 8Tx.

In one example, the UE may generate a padding MAC PDU if the UE does not obtain a MAC PDU for a new transmission for a HARQ process and/or for a TTI, when the UE has one UL grant for the new transmission and for retransmission for the HARQ process and/or for the TTI. If a MAC PDU to transmit has not been obtained for a new transmission for the HARQ process and/or for the TTI and a MAC PDU for retransmission has been generated, the UE may indicate the Multiplexing and assembly entity to generate a padding MAC PDU for the new transmission. A padding MAC PDU may not be generated when receiving one UL grant for two TBs both for new transmissions for the HARQ process and/or for the TTI.

In one example, the UE may obtain a MAC PDU from another/other HARQ buffer if the UE does not obtain a MAC PDU for a new transmission for a HARQ process and/or for a TTI, when the UE has one UL grant for the new transmission and for retransmission for the HARQ process and/or for the TTI.

If a MAC PDU to transmit for a new transmission has not been obtained and the UE has one UL grant for the new transmission and for retransmission for the HARQ process and/or for the TTI, the UE may obtain the MAC PDU from the other HARQ buffer associated with the HARQ process and/or the TTI. The UE may not obtain a MAC PDU(s) from another/other HARQ buffer when the UE has one UL grant for two TBs both for new transmissions for the HARQ process and/or for the TTI. The UE may not obtain a MAC PDU(s) for a new transmission when the UE has one UL grant for two TBs both for new transmissions for the HARQ process and/or for the TTI, e.g., if there is no data available for transmission.

In the above examples, one and/or both of the MAC PDUs associated with the given TTI may contain only padding, padding BSR, and/or periodic BSR with a zero MAC SDU.

The following TPs could be considered as examples for the present invention:

For example, if (at least) one MAC PDU (e.g., a first MAC PDU) is to be retransmitted for a HARQ process, (a MAC entity of) the UE may generate a MAC PDU (e.g., a second MAC PDU) corresponding to a UL grant indicated to the HARQ process. Alternatively and/or additionally, if (at least) one MAC PDU (e.g., the first MAC PDU) has been generated for the HARQ process, (the MAC entity of) the UE may generate the MAC PDU (e.g., the second MAC PDU) corresponding to a UL grant indicated to the HARQ process. The UE may receive a UL grant indicated to the HARQ process. The UL grant may be associated with or indicate two TBs. The HARQ process may support two TBs. A first TB of the two TBs may be for a retransmission. A second TB of the two TBs may be for a new transmission. The UL grant may indicate the retransmission and the new transmission. The UE may retransmit a first MAC PDU for the first TB using the UL grant. There may be no available data for the new transmission (for the second TB). A second MAC PDU for the new transmission may contain only padding, padding BSR, and/or periodic BSR with a zero MAC SDU. The UE may generate the second MAC PDU based on the first MAC PDU is to be retransmitted. The UE may generate the second MAC PDU based on the first MAC PDU has been generated.

For example, if (at least) one MAC PDU (e.g., a first MAC PDU) is to be generated for a HARQ process, (a MAC entity of) the UE may generate (both) MAC PDUs (e.g., the first MAC PDU and a second MAC PDU) corresponding to a UL grant indicated to the HARQ process. The UE may receive a UL grant indicated to the HARQ process. The UL grant may be associated with or indicate two TBs. The HARQ process may support two TBs for new transmissions. The UL grant may indicate two new transmissions. There may be no available data for one of the new transmissions. The first MAC PDU for one of the new transmissions may be generated with available data. The second MAC PDU for one of the new transmissions may contain only padding, padding BSR, and/or periodic BSR with a zero MAC SDU. The UE may generate the second MAC PDU based on the first MAC PDU is to be generated.

To solve the issue, the UE may skip both UL transmissions for 8Tx for a HARQ process and/or for a TTI. The UE may skip UL transmissions and/or not generate any MAC PDUs for a HARQ process for a given TTI if the UE has no data available for transmission when the UE receives one UL grant for a new transmission and for retransmission for the HARQ process and/or for the TTI. The UE may skip UL transmissions and/or not generate any MAC PDUs for a HARQ process and/or for a TTI if the UE has no data available for transmission when the UE is configured for 8Tx). The UE may skip UL transmissions and/or not generate any MAC PDUs for a HARQ process and/or for a TTI if the UE has no data available for transmission when the UL grant associated with the HARQ process and/or the TTI are for 8Tx transmission.

The UE may skip both UL transmissions for 8Tx for a HARQ process and/or for a TTI when the UE receives one UL grant for a new transmission and for retransmission and MAC PDUs for the new transmission includes padding only. The UE may skip both UL transmissions for 8Tx for a HARQ process and/or for a TTI when the UE receives one UL grant for a new transmission and for retransmission for the HARQ process and/or for the TTI and the MAC PDU for the new transmission includes only the MAC CE for padding a BSR or periodic BSR with zero MAC SDUs. The UE may skip both UL transmissions for 8Tx for a HARQ process and/or for a TTI when the UE receives one UL grant

---

NOTE 1a: If at least one MAC PDU is to be generated or to be retansmitted for the HARQ process, the MAC entity generates MAC PDU(s) corresponding to the UL grant indicated to the HARQ process.
NOTE 1a: If at least one MAC PDU is to be generated or has been generated for the HARQ process, the MAC entity generates MAC PDU(s) corresponding to the UL grant indicated to the HARQ process.

for a new transmission and for retransmission for the HARQ process and/or for the TTI and the MAC PDU for the new transmission includes only the MAC CE for a padding BSR or periodic BSR with zero MAC SDUs and a MAC for retransmission has been generated.

NW may request an aperiodic CSI and/or UCI for a HARQ process and/or for UL transmission(s) when scheduling a UE with a new transmission and a retransmission for the HARQ process and/or for a UL grant.

The following TPs could be considered as examples for the present invention:

---

The UE is not expected to be scheduled a new transmission and a retransmission for a HARQ process and/or for a UL grant and/or for a TTI, when/if maxRank > 4 or maxMIMO-Layers > 4 is configured and/or UL skipping is configured and/or there is no data available for transmission and/or aperiodic CSI is not requested and/or UCI is not multiplexed on a PUSCH and/or the for a PUSCH transmission, for the HARQ process and/or for a UL grant and/or for the TTI.

The UE is not expected to generate a MAC PDU for a new transmission for a HARQ process and/or for a UL grant and/or for a TTI comprising only the MAC CE for padding BSR or periodic BSR with zero MAC SDUs when/if a retransmission is scheduled for the HARQ process and/or for a UL grant and/or for the TTI and/or maxRank > 4 or maxMIMO-Layers > 4 is configured and/or UL skipping is configured and/or there is no data available for transmission and/or aperiodic CSI is not requested and/or UCI is not multiplexed on a PUSCH and/or the for a PUSCH transmission, for the HARQ process and/or for the TTI.

---

For example, the Multiplexing and assembly entity may not generate any MAC PDU when there is no data available for transmission and the UE receives one UL grant for a new transmission and for retransmission for a HARQ process and/or for a TTI. For example, the HARQ entity may discard a MAC PDU for retransmission (e.g., which has been generated previously) if the other MAC PDU for a new transmission for the HARQ process and/or for the TTI is not obtained. For example, the HARQ entity may not instruct the PHY to generate a transmission if a MAC PDU for a new transmission for a HARQ process and/or for a TTI is not obtained and a MAC PDU for retransmission has been generated. The UE may not perform transmission for a HARQ process and/or in a TTI if a MAC PDU for a new transmission for the HARQ process and/or for the TTI is not obtained and a MAC PDU for retransmission for the HARQ process and/or for the TTI has been generated.

The NW may configure 8Tx (or dual codeword or maxRank>4 or maxMIMO-Layers>4 or rank>4 or MIMO layer>4) for UL and a second parameter (e.g., skipUplinkTxDynamic) to the UE. The UE may receive one UL grant for a new transmission of one TB/MAC PDU and for retransmission of another TB/MAC PDU.

In one example, the UE may discard a MAC PDU for retransmission for a HARQ process and/or for a TTI or flush HARQ buffer associated with a MAC PDU for retransmission for a HARQ process for a TTI if the other MAC PDU for the HARQ process and/or for the TTI would not be obtained when the UE receives one UL grant for a new transmission and for retransmission for the HARQ process and/or for the TTI. If a MAC PDU for a new transmission for a HARQ process and/or for a TTI is not obtained, the UE may discard the other MAC PDU for retransmission for the HARQ process and/or for the TTI. The UE may flush the related HARQ buffer associated with the HARQ process and/or the TTI and/or not instruct the identified HARQ process, e.g., for the TTI, to trigger a retransmission.

In one example, the UE may not instruct the PHY in the UE to generate a transmission if a MAC PDU for a new transmission for a HARQ process and/or for a TTI is not obtained when the UE receives one UL grant for the new transmission and for retransmission for a HARQ process and/or for a TTI. If the UE receives one UL grant for a new transmission and for retransmission for a HARQ process and/or for a TTI and a MAC PDU for the new transmission for the HARQ process and/or for the TTI is obtained, the UE may instruct to generate a transmission for the MAC PDU. Otherwise, the UE may flush the related HARQ buffer. The To solve the issue, the UE may not skip any UL transmissions for 8Tx. The UE may not skip UL transmissions and/or may generate two MAC PDUs (for a given TTI) when the UE receives one or two UL grants for two TBs (for a TTI). The two MAC PDUs could correspond to dual codeword and/or 8Tx and/or maxRank>4 and/or maxMIMO-Layers>4 and/or rank>4 and/or MIMO layer>4. The two MAC PDUs may be indicated by a (same) DCI/PDCCH. The UE may not skip UL transmissions and/or may generate two MAC PDUs for one or two UL grants (for a given TTI) when the UE receives the UL grant(s) for two TBs (for the TTI) and/or when at least one of the two MAC PDUs is to be generated. The UE may not skip UL transmissions and/or may generate two MAC PDUs for one or two UL grants (for a given TTI) when the UE is configured for 8Tx. The UE may not skip UL transmissions and/or may generate two MAC PDUs for one or two UL grants (for a given TTI) when the UL grant(s) (associated with the TTI) is for 8Tx. The UE may not skip UL transmissions and/or may generate two MAC PDUs for one or two UL grants (for a given TTI) when the UE receives the UL grant(s) (for the TTI) indicating (or associated with) two TBs and one of the two TBs is able to accommodate (all) available data of the UE (e.g., if one of the MAC PDUs accommodates (all) available data and there is only padding left for the other MAC PDUs). The UE may not skip UL transmissions and/or may generate two MAC PDUs (for a given TTI) when the UE receives UL grant(s) indicated (or associated with) two TBs (for the TTI) and one of the MAC PDUs (or TBs) includes padding only. The UE may not skip UL transmissions and/or may generate two MAC PDUs for one or two UL grants (for a given TTI) when the UE receives UL grant(s) indicated (or associated with) two TBs (for the TTI) and one of the MAC PDUs (or TBs) includes only the MAC CE for a padding BSR or periodic BSR with zero MAC SDUs. The UE may not skip UL transmissions and/or may generate two MAC PDUs for one or two UL grants (for a given TTI) when the UE receives the UL grant(s) indicated (or associated with) two TBs (for the TTI) and one of them is able to accommodate all available data of the UE (e.g., if one of the MAC PDUs accommodates available data and there is only padding left for the other MAC PDUs). The UE may not skip UL transmissions and/or may generate two MAC PDUs for one or two UL grants (for a given TTI) when the UE receives UL grant(s) indicating (or associated with) two TBs (for the TTI), one of the MAC PDUs (or TBs) includes only the MAC CE for a padding BSR or periodic BSR with zero MAC SDUs and the other of the MAC PDUs (or TBs) included data or a MAC SDU. The "8Tx" could be referred to, replaced by or be supplement by "dual codeword", "maxRank>4", "maxMIMO-Layers>4", "rank>4", "MIMO layer>4" and/or "UL spatial multiplexing".

For example, the Multiplexing and assembly entity may separate or split the available data to the MAC PDUs associated with a UL grant(s) (and/or a HARQ process). The UE may separate or split padding (and/or the MAC CE for a padding BSR only and/or a periodic BSR with zero MAC SDUs) to the MAC PDUs associated with a UL grant(s) (and/or a HARQ process). The UE ensures both MAC PDUs comprise UE data. The UE ensures both MAC PDUs comprise MAC SDU(s). The UE ensures both MAC PDUs comprise data (and padding). The UE ensures both MAC PDUs comprise MAC PDU and (at least) one of padding, MAC CE for a padding BSR, and a periodic BSR with zero MAC SDUs. The UE ensures both MAC PDUs do not comprise padding only. The UE ensures both MAC PDUs do not comprise the MAC CE for a padding BSR only and/or a periodic BSR with zero MAC SDUs only. One MAC PDU could accommodate available data of the UE. The UE ensures both MAC PDUs comprise UE data even if one MAC PDU could accommodate available data. The UE generates two PDUs since both PDUs comprise UL data. The UE generates two PDUs since both PDUs do not comprise padding only. The UE generates two PDUs since both PDUs do not comprise only MAC CE for a padding BSR or periodic BSR with zero MAC SDUs. The UE may separate or split the available data to the MAC PDUs associated with a UL grant(s) (and/or a HARQ process) if UL skipping is configured. The UE may separate or split the available data to the MAC PDUs for a UL grant(s) (and/or a HARQ process) if UL skipping is configured. The UE may separate or split padding to the MAC PDUs associated with a UL grant(s) (and/or a HARQ process) if UL skipping is configured. The UE may separate or split padding to the MAC PDUs for a UL grant(s) (and/or a HARQ process) if UL skipping is configured.

The UE does not separate or split the available data to the MAC PDUs associated with a UL grant(s) (and/or a HARQ process) if one MAC PDU could not accommodate available data of the UE. The UE does not separate or split the available data to the MAC PDUs for a UL grant(s) (and/or a HARQ process) if one MAC PDU could not accommodate available data of the UE. The UE does not separate or split padding (and/or the MAC CE for a padding BSR and/or a periodic BSR with zero MAC SDUs) to the MAC PDUs associated with a UL grant(s) (and/or a HARQ process) if one MAC PDU could not accommodate available data of the UE. The UE does not separate or split padding (and/or the MAC CE for a padding BSR and/or a periodic BSR with zero MAC SDUs) to the MAC PDUs for a UL grant(s) (and/or a HARQ process) if one MAC PDU could not accommodate available data of the UE. The UE could put data in one MAC PDU and put data and padding (and/or the MAC CE for a padding BSR and/or a periodic BSR with zero MAC SDUs) in the other MAC PDU if one MAC PDU could not accommodate available data of the UE. The UE could put data in one MAC PDU and put data and padding in the other MAC PDU if two MAC PDUs could accommodate available data of the UE. The UE does not separate or split the available data to the MAC PDUs associated with a UL grant(s) (and/or a HARQ process) if UL skipping is not configured. The UE does not separate or split the available data to the MAC PDUs for a UL grant(s) (and/or a HARQ process) if UL skipping is not configured. The UE does not separate or split padding to the MAC PDUs associated with a UL grant(s) (and/or a HARQ process) if UL skipping is not configured. The UE does not separate or split padding to the MAC PDUs for a UL grant(s) (and/or a HARQ process) if UL skipping is not configured.

For example, the Multiplexing and assembly entity may ignore the condition of not generating a MAC PDU. For example, the HARQ entity may indicate the Multiplexing and assembly entity to generate a padding MAC PDU. For example, the HARQ entity may obtain the MAC PDU from another/other HARQ buffer.

The NW may configure 8Tx (or dual codeword or maxRank>4 or maxMIMO-Layers>4 or rank>4 or MIMO layer>4) and a parameter to indicate UL skipping (e.g., skipUplinkTxDynamic) to the UE. The UE configured with 8Tx may receive a UL grant indicating two TBs (for a given TTI).

In one example, the UE may generate MAC PDUs associated with a UL grant (for a single HARQ process or for two associated or paired HARQ processes) regardless of whether the UE has enough available data when the UL grant indicates two TBs. The UE may generate MAC PDUs associated with a UL grant as long as there is data available and/or when/if one MAC PDU of the MAC PDUs is to be generated when the UE receives the UL grant indicating two TBs. The UE may generate MAC PDUs for a UL grant regardless of whether the UE has enough available data when the UE receive the UL grant indicating two TBs. With the LCP procedure, the UE may not generate a MAC PDU if the UE does not have available data, the MAC entity is configured with a second parameter (e.g., skipUplinkTxDynamic), the grant is addressed to a C-RNTI, and the UE is not indicated two TBs for a UL grant.

In one example, the UE may generate MAC PDUs regardless of whether the UE has enough available data when the UE is configured for 8Tx. The UE may generate MAC PDUs as long as there is data available and/or when/if one MAC PDU of the MAC PDUs is to be generated when the UE is configured for 8Tx. With the LCP procedure, the UE may not generate a MAC PDU if the UE does not have available data, the MAC entity is configured with a second parameter (e.g., skipUplinkTxDynamic), the grant is addressed to a C-RNTI, and the UE is not configured for 8Tx.

In one example, the UE may generate MAC PDUs regardless of whether the UE has enough available data when the UL grant is for 8Tx. The UE may generate MAC PDUs regardless of whether the UE has enough available data as long as there is data available and/or when/if one MAC PDU of the MAC PDUs is to be generated when the UL grant is for 8Tx. With the LCP procedure, the UE may not generate a MAC PDU if the UE does not have available data, the MAC entity is configured with a second parameter (e.g., skipUplinkTxDynamic), and the grant is addressed to a C-RNTI not for 8Tx.

In one example, the UE may generate a padding MAC PDU if the UE does not obtain a MAC PDU for a UL grant, when the UE has a UL grant indicating two TBs. If a MAC PDU to transmit has not been obtained and the UE has a UL grant indicating two TBs, the UE may indicate the Multiplexing and assembly entity to generate a padding MAC PDU.

In one example, the UE may obtain a MAC PDU from another/other HARQ buffer if the UE does not obtain a MAC PDU for a UL grant, when the UE has a UL grant indicating two TBs. If a MAC PDU to transmit has not been obtained and the UE has a UL grant indicating two TBs, the UE may obtain the MAC PDU from the other HARQ buffer associated with the UL grant.

One and/or both of the MAC PDUs associated with the UL grant may contain only padding, padding BSR, and/or periodic BSR with a zero MAC SDU.

To solve the issue, the UE may not skip any UL transmissions for 8Tx under (or in response to) a first condition(s). The UE skips UL transmissions for one TB for 8Tx under a second condition(s). The UE may not skip UL transmissions and/or may generate two MAC PDUs for a UL grant when the UE receives a UL grant indicating two TBs under (or in response to) a first condition(s). The UE may skip UL transmissions for a (single) TB and/or may generate a (single) MAC PDU (e.g., of MAC PDUs) for a UL grant when the UE receives a UL grant indicating two TBs under (or in response to) a second condition(s). The two MAC PDUs could correspond to dual codeword and/or 8Tx. The UE may not skip UL transmissions and/or may generate two MAC PDUs for a UL grant when the UE receives a UL grant indicating two TBs and/or when at least one of the two MAC PDUs is to be generated under (or in response to) a first condition(s). The UE may skip UL transmissions for a (single) TB and/or may generate a (single) MAC PDU (e.g., of MAC PDUs) for a UL grant when the UE receives a UL grant indicating two TBs and/or when at least one of the two MAC PDUs is to be generated under a second condition(s). The UE may not skip UL transmissions and/or may generate two MAC PDUs for a UL grant when the UE is configured for 8Tx under (or in response to) a first condition(s). The UE may skip UL transmissions for a (single) TB and/or may generate a (single) MAC PDU (e.g., of MAC PDUs) for a UL grant when the UE is configured for 8Tx under (or in response to) a second condition(s). The UE may not skip UL transmissions and/or may generate two MAC PDUs for a UL grant when the UL grant is for 8Tx under (or in response to) a first condition(s). The UE may skip UL transmissions for a (single) TB and/or may generate a (single) MAC PDU (e.g., of MAC PDUs) for a UL grant when the UL grant is for 8Tx under (or in response to) a second condition(s). The UE may not skip UL transmissions and/or may generate two MAC PDUs for a UL grant when the UE receives a UL grant indicating two TBs and one of them is able to accommodate (all) available data of the UE (e.g., if one of the MAC PDUs accommodates (all) available data and there is only padding left for the other MAC PDUs) under (or in response to) a first condition(s). The UE may skip a UL transmission for a (single) TB and/or may generate a (single) MAC PDU (e.g., of MAC PDUs, e.g., comprising all available data) for a UL grant when the UE receives a UL grant indicating two TBs and one of them is able to accommodate (all) available data of the UE (e.g., if one of the MAC PDUs accommodates (all) available data and there is only padding left for the other MAC PDUs) under (or in response to) a second condition(s). The UE may not skip UL transmissions and/or may generate two MAC PDUs for a UL grant when the UE receives a UL grant indicating two TBs and one of the MAC PDUs (associated with the UL grant) includes padding only under (or in response to) a first condition(s). The UE may skip UL transmissions for a (single) TB (e.g., with padding only) and/or may generate a (single) MAC PDU (e.g., of MAC PDUs, e.g., comprising data) for a UL grant when the UE receives a UL grant indicating two TBs and one of the MAC PDUs (or MAC PDU associated with the UL grant) includes padding only under (or in response to) a second condition(s). The UE may not skip UL transmissions and/or may generate two MAC PDUs for a UL grant when the UE receives a UL grant indicating two TBs and one of the MAC PDUs (or MAC PDU associated with the UL grant) includes only the MAC CE for a padding BSR or periodic BSR with zero MAC SDUs under (or in response to) a first condition(s). The UE may skip UL transmissions for a (single) TB (e.g., includes only the MAC CE for a padding BSR or periodic BSR with zero MAC SDUs) and/or may generate a (single) MAC PDU (e.g., of MAC PDUs, e.g., comprising data) for a UL grant when the UE receives a UL grant indicating two TBs and one of the MAC PDUs (or MAC PDU associated with the UL grant) includes only the MAC CE for padding BSR or periodic BSR with zero MAC SDUs under (or in response to) a second condition(s). The UE may not skip UL transmissions and/or may generate two MAC PDUs for a UL grant when the UE receives a UL grant indicating two TBs and one of them is able to accommodate all available data of the UE (e.g., if one of the MAC PDUs accommodates available data and there is only padding left for the other MAC PDUs) under (or in response to) a first condition(s). The UE may skip UL transmissions for a (single) TB (with padding only) and/or may generate a (single) MAC PDU (e.g., of MAC PDUs, e.g., comprising data) for a UL grant when the UE receives a UL grant indicating two TBs and one of them is able to accommodate all available data of the UE (e.g., if one of the MAC PDUs accommodates available data and there is only padding left for the other MAC PDUs) under (or in response to) a second condition(s). The UE may not skip UL transmissions and/or may generate two MAC PDUs for a UL grant when the UE receives a UL grant indicating two TBs, one of the MAC PDUs (or MAC PDU associated with the UL grant) includes only the MAC CE for a padding BSR or periodic BSR with zero MAC SDUs and the other of the MAC PDUs (associated with the UL grant) included data or MAC SDU under (or in response to) a first condition(s). The UE may skip UL transmissions for a (single) TB (e.g., with zero MAC SDUs) and/or may generate a (single) MAC PDU (e.g., of MAC PDUs, e.g., comprising data) for a UL grant when the UE receives a UL grant indicating two TBs, one of the MAC PDUs (or MAC PDU associated with the UL grant) includes only the MAC CE for a padding BSR or periodic BSR with zero MAC SDUs and the other of the MAC PDUs (or MAC PDU associated with the UL grant) included data or MAC SDU under (or in response to) a second condition(s). The UL grant may be for a single HARQ process or for two associated (or paired) HARQ processes. The UL grant indicating two TBs may not be associated with different HARQ entities. The UL grant could be associated with one HARQ process id. The UL grant could be associated with two (related or paired) HARQ processes for 8Tx.

Additionally and/or alternatively, the UL transmissions could contain a new transmission and a retransmission corresponding to a single HARQ process (at a timing). The UE could perform both of the UL transmissions (e.g., generate a MAC PDU or a TB for the new transmission and perform the retransmission) for 8Tx under the first condition(s). The UE may not (be allowed to) skip any of the UL transmissions for 8Tx under the first condition(s). The UE may not perform or could (be allowed to) skip (part of) the UL transmissions (e.g., not generate a MAC PDU or a TB for the new transmission and/or not perform the retransmission) under the second condition(s). For example, the UE may not perform or could (be allowed to) skip the new transmission and could perform (only) the retransmission if at least one of the second condition(s) is met. For example, the UE may not perform or could (be allowed to) skip the retransmission and could perform (only) the new transmission if at least one of the second condition(s) is met. For example, the UE may not perform or could (be allowed to) skip both the retransmission and the new transmission if at least one of the second condition(s) is met.

The first condition(s) could be one or more of, and/or could comprise, the following:
- If/when the two TBs and/or the two codewords are for a same Transmission-Reception Point (TRP);
- If/when the two TBs and/or the two codewords are precoded jointly and/or together;
- If/when the two TBs and/or the two codewords are precoded with a same precoder;
- If/when the two TBs and/or the two codewords are associated with a same Transmission Configuration Indicator (TCI) state and/or a same SRI and/or a same beam and/or a same UE beam and or a same NW beam;
- If/when the two TBs and/or the two codewords are for a codebook based transmission;
- If/when the two TBs and/or the two codewords are associated with a same Timing Advance (TA);
- If/when the two TBs and/or the two codewords are not both self-decodable;
- If/when the two TBs and/or the two codewords are encoded (e.g., via channel coding) jointly and/or together;
- If/when the two TBs and/or the two codewords are for different TRPs;
- If/when the two TBs and/or the two codewords are precoded separately or independently;
- If/when the two TBs and/or the two codewords are precoded with different precoders;
- If/when the two TBs and/or the two codewords are associated with different TCI states and/or different SRIs and/or different beams and/or different UE beams and/or different NW beams;
- If/when the two TBs and/or the two codewords are for non-codebook based transmissions;
- If/when the two TBs and/or the two codewords are associated with different TAs;
- If/when the two TBs and/or the two codewords are both self-decodable; and/or
- If/when the two TBs and/or the two codewords are encoded (e.g., via channel coding) separately or independently.

The second condition(s) could be one or more of, and/or could comprise, the following:
- If/when the two TBs and/or the two codewords are for different TRPs;
- If/when the two TBs and/or the two codewords are precoded separately or independently;
- If/when the two TBs and/or the two codewords are precoded with different precoders;
- If/when the two TBs and/or the two codewords are associated with different TCI states and/or different SRIs and/or different beams and/or different UE beams and/or different NW beams;
- If/when the two TBs and/or the two codewords are for non-codebook based transmissions;
- If/when the two TBs and/or the two codewords are associated with different TAs;
- If/when the two TBs and/or the two codewords are both self-decodable;
- If/when the two TBs and/or the two codewords are encoded (e.g., via channel coding) separately or independently;
- If/when the two TBs and/or the two codewords are for a same TRP;
- If/when the two TBs and/or the two codewords are precoded jointly and/or together;
- If/when the two TBs and/or the two codewords are precoded with a same precoder;
- If/when the two TBs and/or the two codewords are associated with a same TCI state and/or a same SRI and/or a same beam and/or a same UE beam and/or a same NW beam;
- If/when the two TBs and/or the two codewords are for codebook based transmissions;
- If/when the two TBs and/or the two codewords are associated with a same TA;
- If/when the two TBs and/or the two codewords are not both self-decodable; and/or
- If/when the two TBs and/or the two codewords are encoded (e.g., via channel coding) jointly and/or together.

Allowing skipping of a single TB under some condition(s) could avoid transmission with padding only (e.g., reduce unnecessary power consumption/interference/resource consumption) while also avoiding issues of generating/reception of the transmission (e.g., decoding at NW side). The transmission of TB with padding only is skipped. The transmission of TB without data is skipped. The UE does not generate a MAC PDU with padding only. The UE does not generate a MAC PDU without data.

To solve the issue, the UE may skip both UL transmissions for 8Tx for a UL grant. The UE may skip UL transmissions and/or not generate any MAC PDUs for a UL grant if the UE does not have enough available data when the UE receives a UL grant indicating two TBs. The UE may skip UL transmissions and/or not generate any MAC PDUs for a UL grant if the UE does not have enough available data when the UE is configured with 8Tx. The UE may skip UL transmissions and/or not generate any MAC PDUs for a UL grant if the UE does not have enough available data when the UL grant is for 8Tx transmission.

The UE may skip both UL transmissions for 8Tx for a UL grant when the UE receives a UL grant indicating two TBs and one of them is able to accommodate available data of the UE. The UE may skip both UL transmissions for 8Tx for a UL grant. The UE may skip both UL transmissions for 8Tx for a UL grant when the UE receives a UL grant indicating two TBs and one of MAC PDUs associated with the UL grant includes padding only. The UE may skip both UL transmissions for 8Tx for a UL grant when the UE receives a UL grant indicating two TBs and one of the MAC PDUs (associated with the UL grant) includes only the MAC CE for a padding BSR or periodic BSR with zero MAC SDUs. The UE may skip both UL transmissions for 8Tx for a UL grant. when the UE receives a UL grant indicating two TBs, one of the MAC PDUs (associated with the UL grant) includes only the MAC CE for a padding BSR or periodic BSR with zero MAC SDUs and the other of the MAC PDUs included data or MAC SDU.

The UE may skip UL transmissions and/or not generate any MAC PDUs for a UL grant when: the UE receives a UL grant indicating two TBs and one of them is able to accommodate available data of the UE; the UE receives a UL grant indicating two TBs and MAC PDUs associated with the UL grant includes padding only; when the UE receives a UL grant indicating two TBs and one of the MAC PDUs (or MAC PDU associated with the UL grant) includes only the MAC CE for a padding BSR or periodic BSR with zero MAC SDUs; and/or the UE receives a UL grant indicating two TBs, one of the MAC PDUs (or MAC PDU associated with the UL grant) includes only the MAC CE for a padding BSR or periodic BSR with zero MAC SDUs and the other of the MAC PDUs included data or MAC SDU.

For example, the Multiplexing and assembly entity may not generate any MAC PDU when available data is not enough for both TBs for a UL grant. For example, the HARQ entity may discard a MAC PDU if the other MAC PDU for the UL grant is not obtained. For example, the HARQ entity may not instruct the PHY to generate a transmission if any of the MAC PDUs associated with a UL grant is/are not obtained.

The NW may configure 8Tx and a second parameter (e.g., skipUplinkTxDynamic) to the UE. The UE may be indicated two TBs for a UL grant (at a same TTI).

In one example, the UE may discard a MAC PDU if the other MAC PDU associated with the UL grant is not obtained when the UE receives a UL grant indicating two TBs. If a MAC PDU associated with a UL grant has not been obtained, the UE may discard the other MAC PDU associated with the UL grant. If the other MAC PDU associated with the UL grant has not been obtained, the UE may discard the MAC PDU. The UE may flush the related HARQ buffer associated with the UL grant and not deliver the MAC PDU associated with the UL grant for the identified HARQ process.

In one example, the UE may not instruct the PHY in the UE to generate a transmission if not both MAC PDUs associated with a UL grant are obtained when the UE receives a UL grant indicating two TBs. If the UE receives a UL grant indicating two TBs and the other MAC PDU associated with the UL grant is obtained, the UE may instruct to generate a transmission for the MAC PDU. Otherwise, the UE may flush the related HARQ buffer.

The UE may be configured with 8Tx (e.g., by receiving a parameter indicating MIMO layers with value above 4) and UL skipping (e.g., by receiving a parameter indicating UL skipping). The UE may receive a DCI/PDCCH indicating UL transmission for two transport blocks. The DCI could be a DCI format associated with 8Tx. The DCI could be DCI format 4. The DCI enables two transport blocks. The DCI indicates neither the combination of $I_{MCS}=0$ and $N_{PRB}>1$ nor the combination of $I_{MCS}=28$ and $N_{PRB}=1$ for both transport blocks. The UE (MAC) generates one PDU for one of the two transport blocks. UE (MAC) does not generate one PDU for the other of the two transport blocks. The UE (MAC) does not generate one PDU for the other of the two transport blocks due to UL skipping. The UE (MAC) does not generate one PDU for the other of the two transport blocks due to one PDU is sufficient to accommodate available data of the UE. UE (MAC) does not generate one PDU for the other of the two transport blocks due to the one PDU for the other of the two transport blocks comprising padding only. The UE (MAC) does not generate one PDU for the other of the two transport blocks due to the one PDU for the other of the two transport blocks comprising only the MAC CE for a padding BSR or periodic BSR with zero MAC SDUs.

The UE (PHY) does not perform UL (PUSCH) transmission in response to the DCI. The UE (PHY) does not perform a PUSCH transmission in response to the DCI if one MAC PDU is generated. The UE (PHY) does not perform a PUSCH transmission in response to the DCI if one (or the other) MAC PDU is not generated. The UE (PHY) does not perform a PUSCH transmission in response to the DCI if only one MAC PDU is generated. The UE (PHY) performs a PUSCH transmission in response to the DCI if two MAC PDUs are generated. The UE (PHY) performs a PUSCH transmission in response to the DCI only if two MAC PDUs are generated. The UE (PHY) does not perform a PUSCH transmission in response to the DCI if no MAC PDU or only one MAC PDU is generated.

The UE (PHY) disables a TB for the UL (PUSCH) transmission. The UE (PHY) disables a TB for the PUSCH transmission even if the DCI does not disable the TB. The E (PHY) disables a TB for the PUSCH transmission due to absence of one MAC PDU. The UE (PHY) disables a TB for the PUSCH transmission if one MAC PDU is generated. The UE (PHY) enables TB for the PUSCH transmission if one MAC PDU is generated. The UE (PHY) disables a specific or predefined TB for the PUSCH transmission if one MAC PDU is generated. The UE (PHY) disables TB1 for the PUSCH transmission if one MAC PDU is generated. The UE PHY disables TB2 for the PUSCH transmission if one MAC PDU is generated. The UE (PHY) enables the other TB. The UE (PHY) disables a specific or predefined codeword for the PUSCH transmission if one MAC PDU is generated. The UE (PHY) disables codeword 1 for the PUSCH transmission if one MAC PDU is generated. The UE (PHY) disables codeword 0 for the PUSCH transmission if one MAC PDU is generated. The UE (PHY) enables the other codeword. The UE uses the enabled TB to carry the generated PDU. The UE (PHY) uses the enabled codeword to carry the generated PDU. The UE (PHY) uses a number of layer(s) to perform the UL transmission wherein the number is different from a (layer) number indicated by the DCI. The UE (PHY) may determine the number (for transmission) based on a "Precoding information and number of layers" field of the DCI. The UE (PHY) may determine the number (for transmission) based on a "Precoding information and number of layers" field of the DCI and assume one TB/codeword is disabled. The UE (PHY) may determine the number (for transmission) from a column of one codeword (even though the DCI indicates two codewords enabled). The UE (PHY) may determine the precoder based on a "Precoding information and number of layers" field of the DCI and use a column of one codeword (even though the DCI indicate two codewords enabled). The UE (PHY) may determine the precoder from a column of one codeword (even though the DCI indicates two codewords enabled). The difference of the number of layers is due to the UE disabling one TB (by itself) (instead of being disabled by DCI). The UE (PHY) uses a precoder to perform the UL transmission wherein the precoder is different from a precoder indicated by the DCI. The UE (PHY) uses a precode to perform the UL transmission based on a "Precoding information and number of layers" field of the DCI. The UE (PHY) determines the precoder based on a "Precoding information and number of layers" field of the DCI and assumes one TB/codeword is disabled. The UE (PHY) may determine the precoder based on a "Precoding information and number of layers" field of the DCI and use a column of one codeword (even though the DCI indicates two codewords enabled). The UE (PHY) may determine the precoder from a column of one codeword (even though the DCI indicates two codewords enabled). The difference of precoder is due to UE disable one TB (by itself) (instead of disabled by DCI). The UE (PHY) disables a TB for the PUSCH transmission if one (or the other) MAC PDU is not generated. The UE (PHY) disables a TB for the PUSCH transmission if only one MAC PDU is generated. The UE (PHY) does not disable a TB for the UL (PUSCH) transmission if two MAC PDUs are generated. The UE (PHY) enables both TBs for the UL (PUSCH) transmission if two MAC PDUs are generated. The PUSCH could be a new transmission. Since the number of codeword(s) (or TB(s)) is identical to the number of generated MAC PDU(s) (e.g., after disabling one TB), the UE is able to perform a corresponding PUSCH transmission.

The following demonstrates an example for the case of 4 antenna ports:

| One codeword: Codeword 0 enabled Codeword 1 disabled | | Two codewords: Codeword 0 enabled Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| ... | ... | ... | ... |
| 23 | 1 layer: TPMI = 23 | 15 | 2 layers: TPMI = 15 |
| 24 | 2 layers: TPMI = 0 | 16 | 3 layers: TPMI = 0 |
| 25 | 2 layers: TPMI = 1 | 17 | 3 layers: TPMI = 1 |
| ... | ... | ... | ... |
| 39 | 2 layers: TPMI = 15 | 27 | 3 layers: TPMI = 11 |
| 40-63 | reserved | 28 | 4 layers: TPMI = 0 |
| | | 29-63 | Reserved |

Conventionally, the UE would determine a number of layer(s) and precoder (Transmitted Precoding Matrix Indicator (TPMI)) based on the column associated with two code words (the right most column) when the DCI indicates both codewords are enabled and also based on (a "Precoding information and number of layers" field of) DCI. For example, when the "Precoding information and number of layers" is equal to 1 and DCI enables two codewords, the UE would perform a UL transmission with 2 TBs, 2 layers, TPMI=1. The above embodiment suggests to use the combination of the column associated with one codeword. For example, the UE could perform the UL transmission with 1 TB, 1 layer, TPMI=1 (e.g., based on the value of "Precoding information and number of layers" is equal to 1). Alternatively, a specific entry of the column could be used. For example, the UE could perform the UL transmission with 1 TB, 1 layer, TPMI=0 (e.g., the lowest entry or a predefined entry, or a specific entry of the one codeword column).

The UE (PHY) performs a UL transmission for one (generated) MAC PDU. The UE (PHY) performs a UL transmission for one MAC PDU if one MAC PDU is generated. The UE (PHY) does not perform a UL transmission for the other MAC PDU not generated by MAC. The UE (PHY) performs a UL transmission with one codeword (or TB). The codeword may be codeword 0. The codeword may be codeword 1. The UE (PHY) uses a number of layer(s) to perform the UL transmission wherein the number is different from a (layer) number indicated by the DCI. The UE (PHY) may determine the number (for transmission) based on a "Precoding information and number of layers" field of the DCI. The UE (PHY) may determine the number (for transmission) based on a "Precoding information and number of layers" field of the DCI and assume one TB/codeword is disabled. The UE (PHY) may determine the number (for transmission) from a column of one codeword (even though the DCI indicates two codewords enabled). The UE (PHY) may determine the precoder based on a "Precoding information and number of layers" field of the DCI and use a column of one codeword (even though the DCI indicate two codewords enabled). The UE (PHY) may determine the precoder from a column of one codeword (even though the DCI indicates two codewords enabled). The difference of the number of layers is due to the UE disabling one TB (by itself) (instead of disabled by DCI). The UE (PHY) uses a precoder to perform the UL transmission wherein the precoder is different from a precoder indicated by the DCI. The UE (PHY) uses a precoder to perform the UL transmission based on a "Precoding information and number of layers" field of the DCI. The UE (PHY) determines the precoder based on a "Precoding information and number of layers" field of the DCI and assumes one TB/codeword is disabled. The UE (PHY) may determine the precoder based on a "Precoding information and number of layers" field of the DCI and use a column of one codeword (even though the DCI indicate two codewords enabled). The UE (PHY) may determine the precoder from a column of one codeword (even though the DCI indicates two codewords enabled). The difference of the precoder is due to the UE disabling one TB (by itself) (instead of disabled by DCI).

The UE (PHY) performs a UL transmission for two MAC PDUs if two MAC PDUs are generated. The UE (PHY) performs a UL transmission with two codewords. The UE (PHY) uses a number of layer(s) and/or a precoder to perform a UL transmission wherein the number of layers and the precoder is determined based on DCI. The UE (PHY) uses a number of layer(s) and/or a precoder to perform a UL transmission from the column of two codewords. In other words, the UE follows the conventional way to determine number of layer(s) and/or a precoder to perform a UL transmission if two MAC PDUs are generated.

The NW may need to try different decoding hypotheses since the NW may not know the number of TB(s) and/or the number of layer(s) and/or the precoder used. The NW may not know since the NW may not know if one or two MAC PDUs would be generated by the UE (which is related to the buffer status of the UE). The NW may need to blind decode the different hypotheses. For example, the NW could decode with a hypothesis of two MAC PDUs generated and another hypothesis of one MAC PDU generated.

The UE (PHY) performs a UL transmission for one MAC PDU. The UE (PHY) performs a UL transmission for one MAC PDU if one MAC PDU is generated. The UE (PHY) does not perform a UL transmission for the other MAC PDU not generated by MAC. The UE (PHY) performs a UL transmission for one MAC PDU if one MAC PDU is generated. The UE (PHY) performs a UL transmission with two codewords (or TBs). One of the two codewords (or TBs) is used to carry the (generated) MAC PDU. The other of the two codewords (or TBs) is used to carry a set of bits. The set of bits may be randomly generated. The set of bits may be of specific values or predefined values, e.g., all 0's or all 1's or 0101, . . . . The set of bits may be padding bits or dummy bits. The set of bits may be generated by PHY. The set of bits are not received from MAC. One of the two codewords (or TBs) comprise data from the UE. The other of the two codewords (or TBs) does not comprise data from the UE. The other of the two codewords (or TBs) is a special codeword (or TB). The other of the two codewords (or TBs) is a predefined codeword (or TB). The other of the two codewords (or TBs) is a dummy codeword (or TB). The other of the two codewords (or TBs) is filled with pre-known or random information.

The above solution(s) could be applied for some condition(s) and not applied for some other condition(s). The some condition(s) could be one or more of the first conditions as described above. The some other condition(s) could be one or more of the second conditions as described above.

In the above embodiments, the precoder may be for 8Tx.

Throughout the present disclosure, one or more of the embodiments/concepts/methods/examples could be combined, in whole or in part.

Throughout the present disclosure, if/when a TB/codeword is self-decodable, decoding of the TB/codeword could be done successfully by itself without requiring and/or depending on decoding of the other TB/codeword and/or any other TB/codeword.

Throughout the present disclosure, "8Tx" could be referred to, replaced by or be supplement by "dual codeword" or "two TB transmission" or "dual codeword transmission" or "maxRank>4" or "maxMIMO-Layers>4" or "rank>4" or "MIMO layer>4" or "UL spatial multiplexing". The "8Tx" or "dual codeword" or "two TB transmission" or "dual codeword transmission" or "maxRank>4" or "maxMIMO-Layers>4" or "rank>4" or "MIMO layer>4" could be used interchangeably.

Throughout the present disclosure, a TTI may be or be referred to/as a slot(s), a subframe(s), a mini-slot(s), a subslot, an sTTI, a symbol(s), 2 symbols, 3 symbols, 7 symbols, or a duration for a data channel. A TTI may be or be referred to as a (specific) timing, time duration, and/or time point, e.g., indicated by a DCI/PDCCH.

Throughout the present disclosure, a UL transmission may be a PUSCH transmission.

Throughout the present disclosure, "be not allowed to" could be replaced by "prevent from" or "prohibit from".

Throughout the present disclosure, "NW is/may be not allowed to configure" could be replaced by "UE is/may be not expected to be configured".

Throughout the present disclosure, "NW is not allowed to indicate" could be replaced by "UE is not expected to be indicated".

Throughout the present disclosure, the UE could be configured by the NW with a single cell.

Throughout the present disclosure, UL grants associated with a TTI, UL grants for a given TTI, and/or UL grants at a given TTI could be used interchangeably. UL grants associated with a TTI, UL grants for a given TTI, and/or UL grants at a given TTI are the UL grants received for the same TTI (for one serving cell) (for a HARQ entity).

Throughout the present disclosure, MAC PDUs associated with a TTI, MAC PDUs for a given TTI, and/or MAC PDUs at a given TTI could be used interchangeably. MAC PDUs associated with a TTI, MAC PDUs for a given TTI, and/or MAC PDUs at a given TTI are the MAC PDUs to be generated (and transmitted) for the UL grants received for the same TTI.

Throughout the present disclosure, for the TTI, at the TTI, and/or associated with the TTI could be used interchangeably.

Throughout the present disclosure, two TBs and/or two MAC PDUs may be associated with one UL grant or two UL grants.

Throughout the present disclosure, one UL grant could be used for a new transmission for one TB/MAC PDU and for a transmission for another TB/MAC PDU.

Throughout the present disclosure, an aperiodic CSI is not requested and/or no UCI is to be multiplexed for a PUSCH and/or for a PUSCH transmission and/or for the TTI. The PUSCH transmission may be a two TB transmission, e.g., of a new transmission and a retransmission.

Throughout the present disclosure, the UL grant could be indicated via a DCI (e.g., DCI_format 0_1). The (one) UL grant could indicate via a first NDI associated with a first transport block (TB). The (another) UL grant could indicate a second NDI associated with a second transport block (TB). The (one) UL grant could indicate whether the first TB is a new transmission or a retransmission based on the first NDI. The (another) UL grant could indicate whether the second TB is a new transmission or a retransmission based on the second NDI.

Throughout the present disclosure, a soft buffer is associated with a (DL) HARQ process and a HARQ buffer is associated with a (UL) HARQ process.

The UE may receive configurations related to 8Tx (or dual codeword or two TB transmission or dual codeword transmission or maxRank>4 or maxMIMO-Layers>4 or rank>4 or MIMO layer>4). The UE may be configured for 8Tx (or dual codeword or two TB transmission or dual codeword transmission or maxRank>4 or maxMIMO-Layers>4 or rank>4 or MIMO layer>4) by the NW. The UE may receive the UL grants dynamically on a PDCCH, e.g., for 8Tx (or dual codeword or two TB transmission or dual codeword transmission or maxRank>4 or maxMIMO-Layers>4 or rank>4 or MIMO layer>4). The UE may be referred to as the UE, a MAC of the UE, a PHY of the UE, a HARQ entity of the UE, a Multiplexing and assembly entity of the UE, or a HARQ process of the UE.

The UE may be referred to as the UE or a MAC entity of the UE.

The UE may be an LTE device. The UE may be an NR device. The UE may be a NR-light device. The UE may be a reduced capability device. The UE may be a mobile phone. The UE may be a wearable device. The UE may be a sensor. The UE may be a stationary device.

The NW may be a base station. The NW may be an access point. The NW may be an Evolved Node B (eNB). The NW may be an NR Node B (gNB). Network, network node, base station, access point, eNB, and/or gNB could be used interchangeably throughout the present disclosure.

Various examples and embodiments of the present invention are described below. For the methods, alternatives, concepts, examples, and embodiments detailed above and herein, the following aspects and embodiments are possible.

Figure 5:
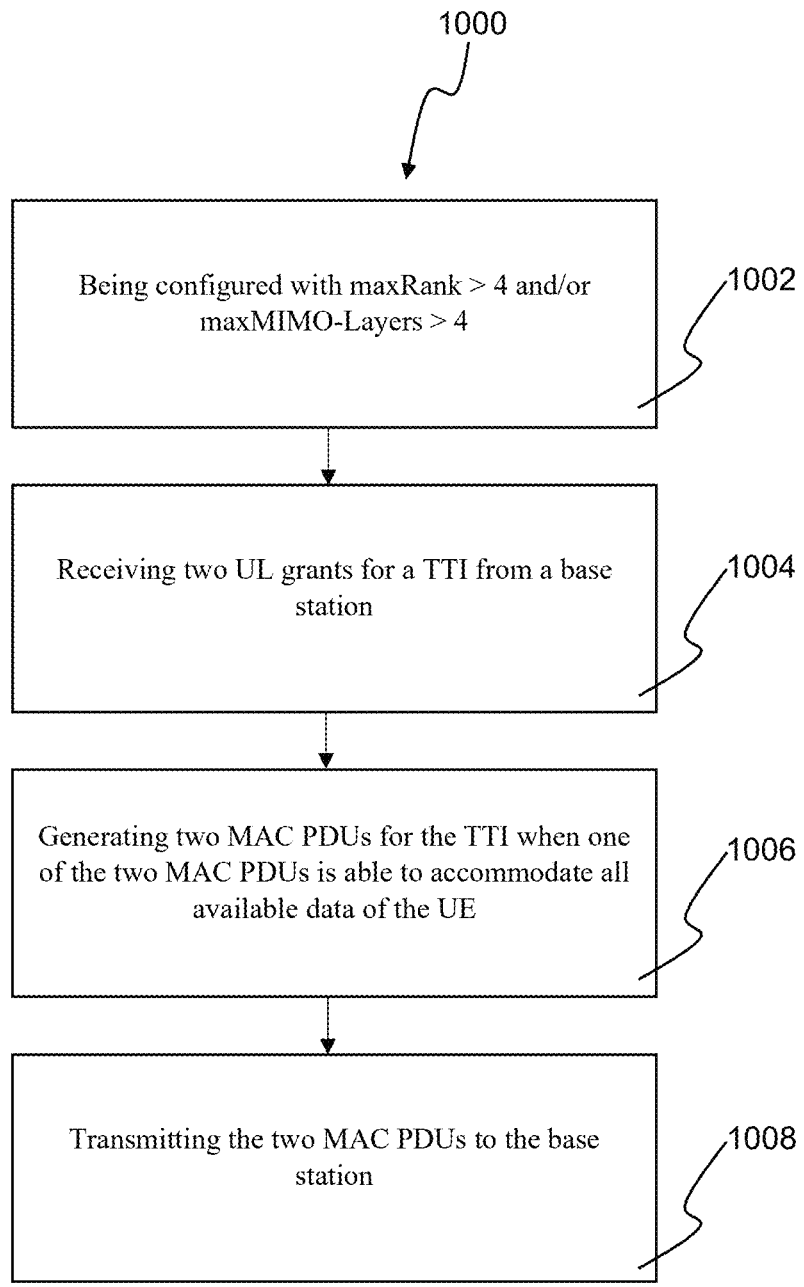
FIG. 5 is a flow diagram of a method of a UE in a wireless communication system comprising being configured with maxRank>4 and/or maxMIMO-Layers>4, and UL skipping, receiving two UL grants for a TTI from a base station, generating two MAC PDUs for the TTI when one of the two MAC PDUs is able to accommodate all available data of the UE, and transmitting the two MAC PDUs to the base station, in accordance with embodiments of the present invention.

Referring to FIG. 5, with this and other concepts, systems, and methods of the present invention, a method 1000 for a UE in a wireless communication system comprises being configured with maxRank>4 and/or maxMIMO-Layers>4, and UL skipping (step 1002), receiving two UL grants for a TTI from a base station (step 1004), generating two MAC PDUs for the TTI when one of the two MAC PDUs is able to accommodate all available data of the UE (step 1006), and transmitting the two MAC PDUs to the base station (step 1008).

In various embodiments, the UE configured with maxRank>4 and/or maxMIMO-Layers>4 receives up to two UL grants for the TTI.

In various embodiments, the UE configured with UL skipping does not generate a MAC PDU for a dynamic UL grant if no data is available for the MAC PDU transmission.

In various embodiments, the two UL grants are dynamic UL grants for a HARQ entity.

In various embodiments, there is no aperiodic CSI requested for the TTI.

In various embodiments, one of the two MAC PDUs includes only the MAC CE for a padding BSR or periodic BSR with zero MAC SDUs.

In various embodiments, the method further comprises the UE does not generate any MAC PDU for the TTI when both of the two MAC PDUs do not comprise available data or when both of the two MAC PDUs include only the MAC CE for a padding BSR or periodic BSR with zero MAC SDUs.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with maxRank>4 and/or maxMIMO-Layers>4, and UL skipping; (ii) receive two UL grants for a TTI from a base station; (iii) generate two MAC PDUs for the TTI when one of the two MAC PDUs is able to accommodate all available data of the UE; and (iv) transmit the two MAC PDUs to the base station. Moreover, the CPU 308 can execute the program code 312 to perform all of the described actions, steps, and methods described above, below, or otherwise herein.

Figure 6:
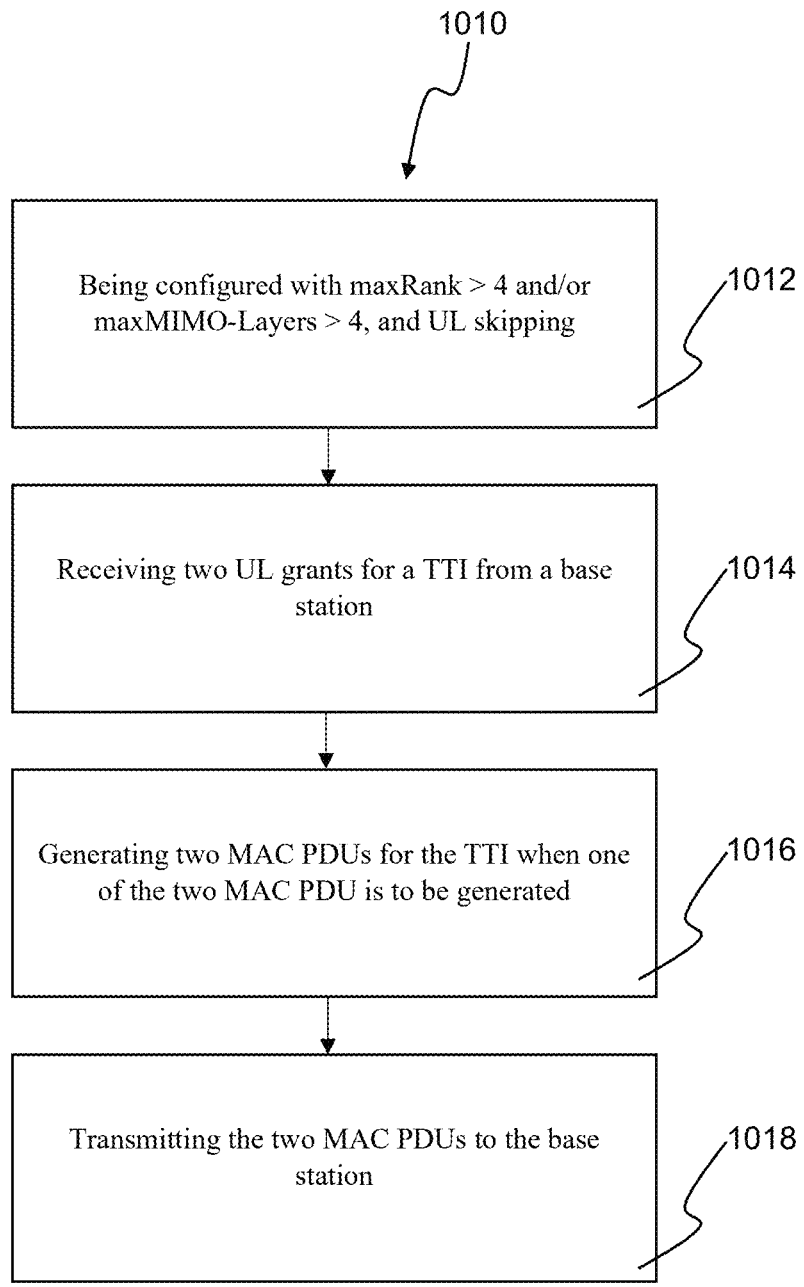
FIG. 6 is a flow diagram of a method of a UE in a wireless communication system comprising being configured with maxRank>4 and/or maxMIMO-Layers>4, and UL skipping, receiving two UL grants for a TTI from a base station, generating two MAC PDUs for the TTI when one of the two MAC PDU is to be generated, and transmitting the two MAC PDUs to the base station, in accordance with embodiments of the present invention.

Referring to FIG. 6, with this and other concepts, systems, and methods of the present invention, a method 1010 for a UE in a wireless communication system comprises being configured with maxRank>4 and/or maxMIMO-Layers>4, and UL skipping (step 1012), receiving two UL grants for a TTI from a base station (step 1014), generating two MAC PDUs for the TTI when one of the two MAC PDU is to be generated (step 1016), and transmitting the two MAC PDUs to the base station (step 1018).

In various embodiments, the UE configured with maxRank>4 and/or maxMIMO-Layers>4 receives up to two UL grants for the TTI.

In various embodiments, the UE configured with UL skipping does not generate a MAC PDU for a dynamic UL grant if no data is available for the MAC PDU transmission.

In various embodiments, the two UL grants are dynamic UL grants for a HARQ entity.

In various embodiments, there is no aperiodic CSI requested for the TTI.

In various embodiments, the method further comprises the UE does not generate any MAC PDU for the TTI when both of the two MAC PDUs do not comprise available data or when both of the two MAC PDUs include only the MAC CE for a padding BSR or periodic BSR with zero MAC SDUs.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with maxRank>4 and/or maxMIMO-Layers>4, and UL skipping; (ii) receive two UL grants for a TTI from a base station; (iii) generate two MAC PDUs for the TTI when one of the two MAC PDU is to be generated; and (iv) transmit the two MAC PDUs to the base station. Moreover, the CPU 308 can execute the program code 312 to perform all of the described actions, steps, and methods described above, below, or otherwise herein.

Figure 7:
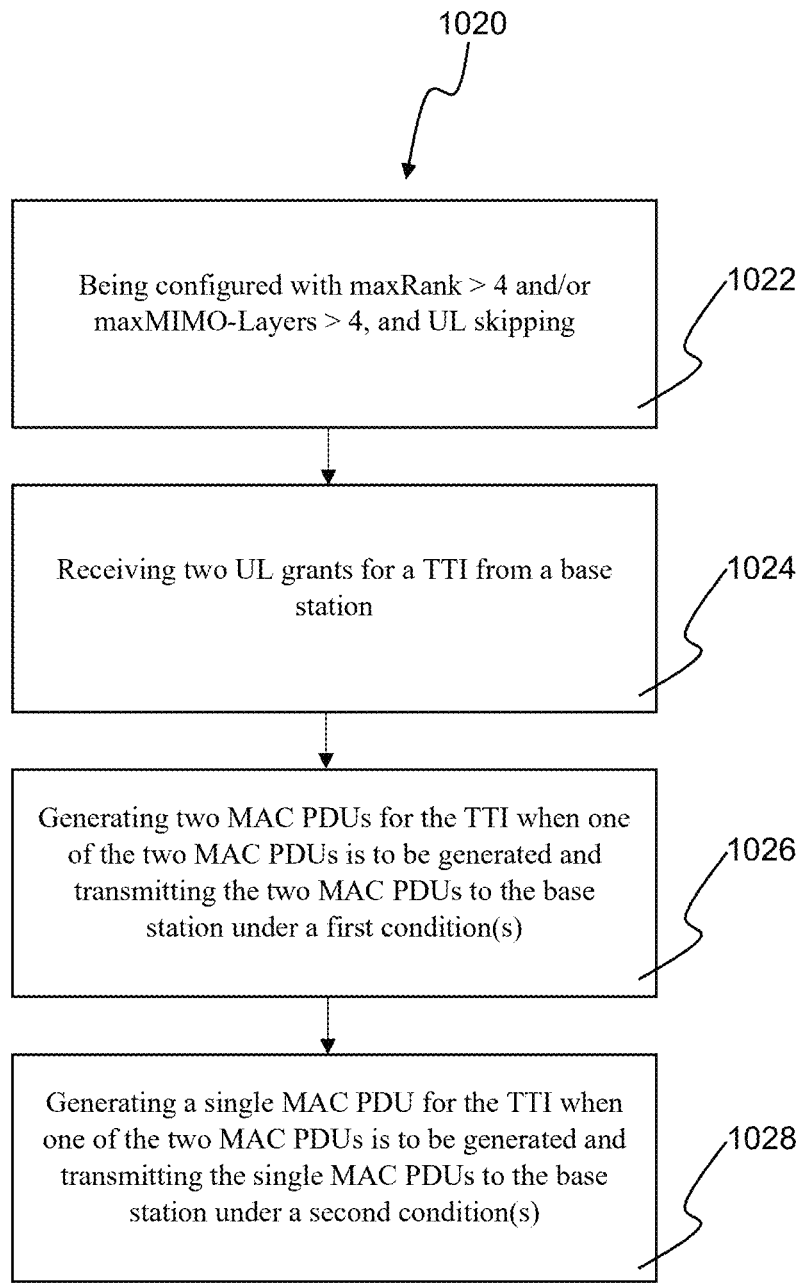
FIG. 7 is a flow diagram of a method of a UE in a wireless communication system comprising being configured with maxRank>4 and/or maxMIMO-Layers>4, and UL skipping, receiving two UL grants for a TTI from a base station, generating two MAC PDUs for the TTI when one of the two MAC PDUs is to be generated and transmitting the two MAC PDUs to the base station under a first condition(s), and generating a single MAC PDU for the TTI when one of the two MAC PDUs is to be generated and transmitting the single MAC PDUs to the base station under a second condition(s), in accordance with embodiments of the present invention.

Referring to FIG. 7, with this and other concepts, systems, and methods of the present invention, a method 1020 for a UE in a wireless communication system comprises being configured with maxRank>4 and/or maxMIMO-Layers>4, and UL skipping (step 1022), receiving two UL grants for a TTI from a base station (step 1024), generating two MAC PDUs for the TTI when one of the two MAC PDUs is to be generated and transmitting the two MAC PDUs to the base station under a first condition(s) (step 1026), and generating a single MAC PDU for the TTI when one of the two MAC PDUs is to be generated and transmitting the single MAC PDUs to the base station under a second condition(s) (step 1028).

In various embodiments, the UE configured with maxRank>4 and/or maxMIMO-Layers>4 receives up to two UL grants for the TTI.

In various embodiments, the UE configured with UL skipping does not generate a MAC PDU for a dynamic UL grant if no data is available for the MAC PDU transmission.

In various embodiments, the two UL grants are dynamic UL grants for a HARQ entity.

In various embodiments, there is no aperiodic CSI requested for the TTI.

In various embodiments, the method further comprises the UE does not generate any MAC PDU for the TTI when both of the two MAC PDUs do not comprise available data or when both of the two MAC PDUs include only the MAC CE for a padding BSR or periodic BSR with zero MAC SDUs.

In various embodiments, a first condition(s) comprises one or more of: if/when the two TBs and/or the two codewords are for a same TRP, if/when the two TBs and/or the two codewords are precoded jointly and/or together, if/when the two TBs and/or the two codewords are precoded with a same precoder, if/when the two TBs and/or the two codewords are associated with a same TCI state and/or a same SRI and/or a same beam and/or a same UE beam and/or a same NW beam, if/when the two TBs and/or the two codewords are for a codebook based transmission, if/when the two TBs and/or the two codewords are associated with a same TA, if/when the two TBs and/or the two codewords are not both self-decodable, and/or if/when the two TBs and/or the two codewords are encoded (e.g., via channel coding) jointly and/or together.

In various embodiments, the second condition(s) comprise one or more of: if/when the two TBs and/or the two codewords are for different TRPs, if/when the two TBs and/or the two codewords are precoded separately or independently, if/when the two TBs and/or the two codewords are precoded with different precoders, if/when the two TBs and/or the two codewords are associated with different TCI states and/or different SRIs and/or different beams and/or different UE beams and/or different NW beams, if/when the two TBs and/or the two codewords are for a non-codebook based transmission, if/when the two TBs and/or the two codewords are associated with different Tas, if/when the two TBs and/or the two codewords are both self-decodable, and/or if/when the two TBs and/or the two codewords are encoded (e.g., via channel coding) separately or independently.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with maxRank>4 and/or maxMIMO-Layers>4, and UL skipping; (ii) receive two UL grants for a TTI from a base station; (iii) generate two MAC PDUs for the TTI when one of the two MAC PDUs is to be generated and transmit the two MAC PDUs to the base station under a first condition(s); and (iv) generate a single MAC PDU for the TTI when one of the two MAC PDUs is to be generated and transmit the single MAC PDUs to the base station under a second condition(s). Moreover, the CPU 308 can execute the program code 312 to perform all of the described actions, steps, and methods described above, below, or otherwise herein.

Figure 8:
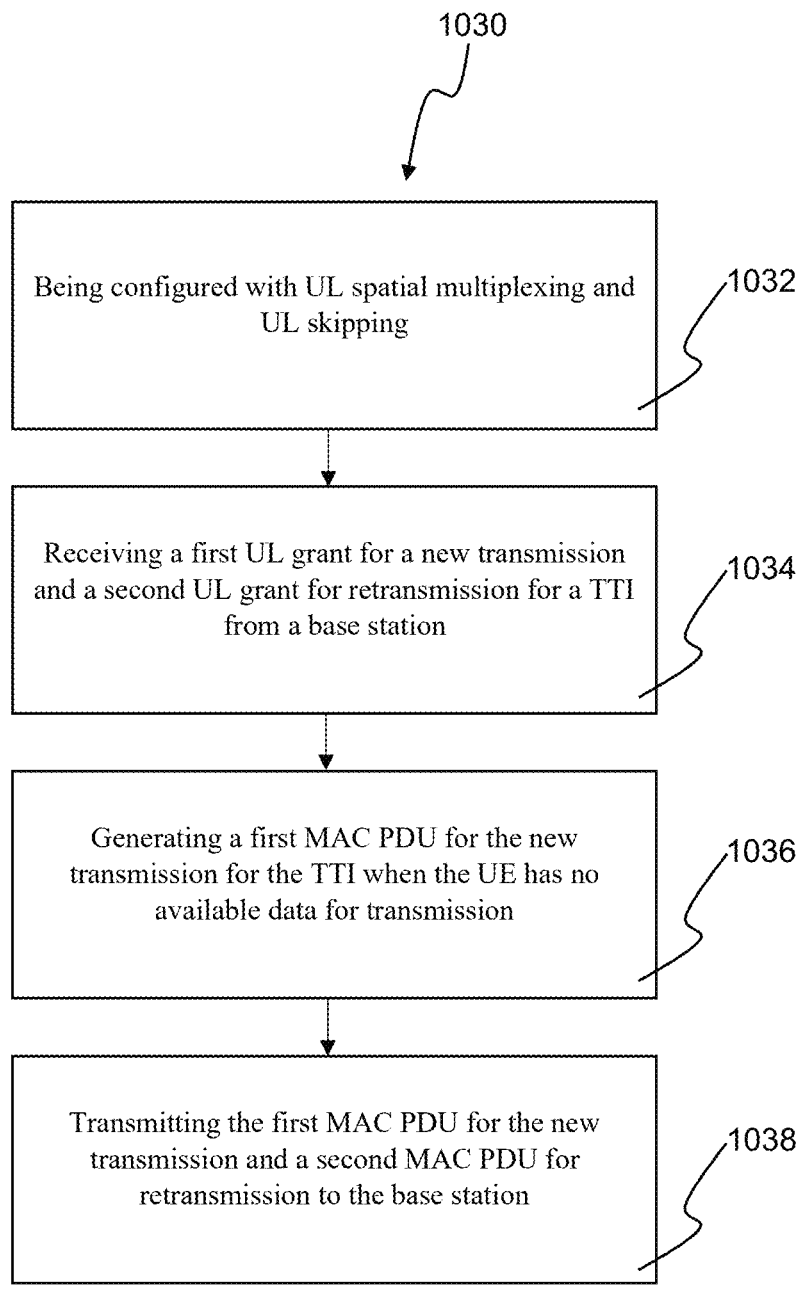
FIG. 8 is a flow diagram of a method of a UE in a wireless communication system comprising being configured with UL spatial multiplexing and UL skipping, receiving a first UL grant for a new transmission and a second UL grant for retransmission for a TTI from a base station, generating a first MAC PDU for the new transmission for the TTI when the UE has no available data for transmission, and transmitting the first MAC PDU for the new transmission and a second MAC PDU for retransmission to the base station, in accordance with embodiments of the present invention.

Referring to FIG. 8, with this and other concepts, systems, and methods of the present invention, a method 1030 for a UE in a wireless communication system comprises being configured with UL spatial multiplexing and UL skipping (step 1032), receiving a first UL grant for a new transmission and a second UL grant for retransmission for a TTI from a base station (step 1034), generating a first MAC PDU for the new transmission for the TTI when the UE has no available data for transmission (step 1036), and transmitting the first MAC PDU for the new transmission and a second MAC PDU for retransmission to the base station (step 1038).

In various embodiments, the UE configured with UL spatial multiplexing receives up to two UL grants for the TTI.

In various embodiments, the UE configured with UL skipping does not generate a MAC PDU for a dynamic UL grant when the UE receives one or a single dynamic UL grant if there is no data available for transmission.

In various embodiments, the UE configured with UL skipping does not generate a MAC PDU(s) for two dynamic UL grants both for the new transmission if there is no data available for transmission.

In various embodiments, the two UL grants are dynamic UL grants for a HARQ entity.

In various embodiments, there is no aperiodic CSI requested for the TTI and/or no UCI to be multiplexed on a PUSCH (e.g., for the TTI and/or for the first MAC PDU and the second MAC PDU).

In various embodiments, the first MAC PDU includes only the MAC CE for a padding BSR or periodic BSR with zero MAC SDUs.

In various embodiments, the method further comprises the UE does not generate any MAC PDU for a second TTI if the UE receives two UL grants for new transmissions of a third MAC PDU and a fourth MAC PDU for the second TTI when the third MAC PDU and the fourth MAC PDU both do not comprise available data or when the third MAC PDU and the fourth MAC PDU include only the MAC CE for the padding BSR or periodic BSR with zero MAC SDUs.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with UL spatial multiplexing and UL skipping; (ii) receive a first UL grant for a new transmission and a second UL grant for retransmission for a TTI from a base station; (iii) generate a first MAC PDU for the new transmission for the TTI when the UE has no available data for transmission; and (iv) transmit the first MAC PDU for the new transmission and a second MAC PDU for retransmission to the base station. Moreover, the CPU 308 can execute the program code 312 to perform all of the described actions, steps, and methods described above, below, or otherwise herein.

Figure 9:
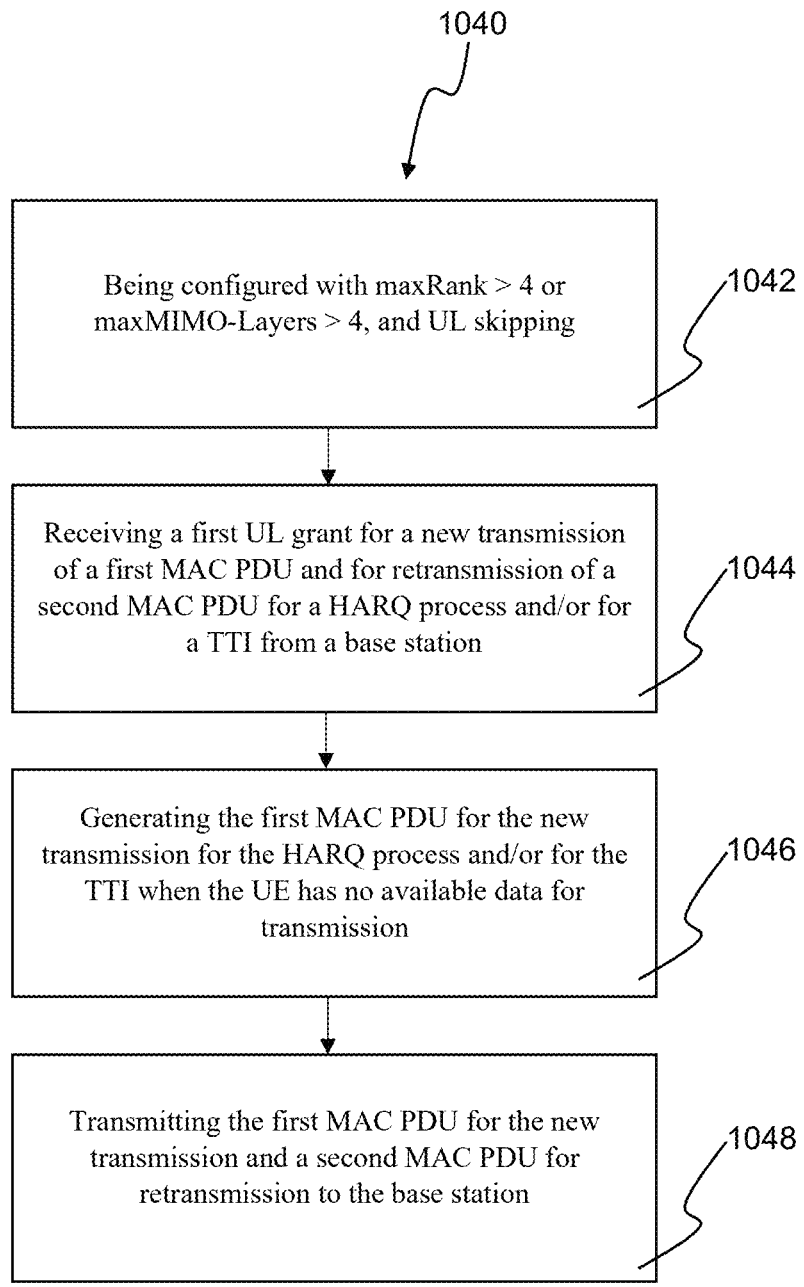
FIG. 9 is a flow diagram of a method of a UE in a wireless communication system comprising being configured with maxRank>4 or maxMIMO-Layers>4, and UL skipping, receiving a first UL grant for a new transmission of a first MAC PDU and for retransmission of a second MAC PDU for a HARQ process and/or for a TTI from a base station, generating the first MAC PDU for the new transmission for the HARQ process and/or for the TTI when the UE has no available data for transmission, and transmitting the first MAC PDU for the new transmission and a second MAC PDU for retransmission to the base station, in accordance with embodiments of the present invention.

Referring to FIG. 9, with this and other concepts, systems, and methods of the present invention, a method 1040 for a UE in a wireless communication system comprises being configured with maxRank>4 or maxMIMO-Layers>4, and UL skipping (step 1042), receiving a first UL grant for a new transmission of a first MAC PDU and for retransmission of a second MAC PDU for a HARQ process and/or for a TTI from a base station (step 1044), generating the first MAC PDU for the new transmission for the HARQ process and/or for the TTI when the UE has no available data for transmission (step 1046), and transmitting the first MAC PDU for the new transmission and a second MAC PDU for retransmission to the base station (step 1048).

In various embodiments, the UE configured with maxRank>4 or maxMIMO-Layers>4 receives a UL grant for up to two TBs or MAC PDUs for the HARQ process and/or for the TTI.

In various embodiments, the UE configured with UL skipping does not generate a MAC PDU for a dynamic UL grant when the UE receives dynamic a UL grant for a single TB/MAC PDU if there is no data available for transmission.

In various embodiments, the UE configured with UL skipping does not generate a MAC PDU(s) for a dynamic UL grant for two TBs or MAC PDUs both for new transmissions if there is no data available for transmission.

In various embodiments, the first UL grant is a dynamic UL grant for a HARQ entity.

In various embodiments, there is no aperiodic CSI requested for the TTI and/or no UCI to be multiplexed on a PUSCH (e.g., for the HARQ process and/or for the TTI and/or for the first MAC PDU and the second MAC PDU).

In various embodiments, the first MAC PDU includes only the MAC CE for a padding BSR or periodic BSR with zero MAC SDUs.

In various embodiments, the method further comprises the UE does not generate any MAC PDU for a second TTI if the UE receives a second UL grant for new transmissions of a third MAC PDU and a fourth MAC PDU for the second TTI when the third MAC PDU and the fourth MAC PDU both do not comprise available data or when the third MAC PDU and the fourth MAC PDU include only the MAC CE for a padding BSR or periodic BSR with zero MAC SDUs.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with maxRank>4 or maxMIMO-Layers>4, and UL skipping; (ii) receive a first UL grant for a new transmission of a first MAC PDU and for retransmission of a second MAC PDU for a HARQ process and/or for a TTI from a base station; (iii) generate the first MAC PDU for the new transmission for the HARQ process and/or for the TTI when the UE has no available data for transmission; and (iv) transmit the first MAC PDU for the new transmission and a second MAC PDU for retransmission to the base station. Moreover, the CPU 308 can execute the program code 312 to perform all of the described actions, steps, and methods described above, below, or otherwise herein.

Another concept of the present invention is that if a first uplink grant associated with a HARQ process has been received, a UE could determine whether to consider a first NDI and a second NDI of the HARQ process to have been toggled based on at least a previous uplink grant associated with the HARQ process. The previous uplink grant could be addressed to a MAC entity of the UE's Configuring Schedule (CS)-Radio Network Temporary Identifier (RNTI). The previous uplink grant could be a configured uplink grant.

The UE could consider both the first NDI and the second NDI to have been toggled (regardless of the value of the NDIs) when or if the previous uplink grant is addressed to the MAC entity's CS-RNTI or is a configured uplink grant.

The previous uplink grant or the configured uplink grant could indicate transmission of a single TB.

The first uplink grant could indicate or schedule two TBs (including a first TB and a second TB).

The first NDI could be associated with a first TB associated with the HARQ process.

The second NDI could be associated with a second TB associated with the HARQ process.

The first TB and the second TB could be included in a single HARQ buffer.

Additionally and/or alternatively, the UE may not determine whether to consider the second NDI to have been toggled or not based on the previous uplink grant. The UE does not determine whether the second NDI to have been toggled based on the previous uplink grant when the previous uplink grant does not indicate or schedule multiple TBs. The UE could consider the first NDI to have been toggled in response to or due to the previous uplink grant (and does not determine the second NDI to have been toggled or not toggled based on the previous uplink grant). The UE could determine whether the second NDI is toggled or not based on (NDI value of) a second previous uplink grant. The second previous uplink grant could indicate or schedule multiple TBs. The second previous uplink grant could be addressed to a C-RNTI.

Alternatively, the UE could determine whether to consider both the first NDI and the second NDI to have been toggled based on the previous uplink grant when or if the previous uplink grant scheduled or indicates a single TB (transmission).

Additionally and/or alternatively, if a first downlink assignment associated with a HARQ process has been received, a UE could determine whether to consider a first NDI and a second NDI of the HARQ process to have been toggled based on at least a previous downlink assignment associated with the HARQ process. The previous downlink assignment could be addressed to a MAC entity of the UE's CS-RNTI. The previous downlink assignment could be a configured downlink assignment or Multicast and Broadcast Services (MBS) multicast. The previous downlink assignment could be based on Semi-Persistent Scheduling (SPS) configuration.

The UE could consider both the first NDI and the second NDI to have been toggled (regardless of the value of the NDIs) when or if the previous downlink assignment is addressed to the MAC entity's CS-RNTI or is a configured downlink assignment or MBS multicast.

The previous downlink assignment or the configured downlink assignment could indicate transmission/reception of a single TB.

The first downlink assignment could indicate or schedule two TBs (including a first TB and a second TB).

The first NDI could be associated with a first TB associated with the HARQ process.

The second NDI could be associated with a second TB associated with the HARQ process.

The first TB and the second TB could be included in a single soft buffer.

Additionally and/or alternatively, the UE may not determine whether to consider the second NDI to have been toggled or not based on the previous downlink assignment. The UE does not determine whether the second NDI to have been toggled based on the previous downlink assignment when the previous downlink assignment does not indicate or schedule multiple TBs. The UE could consider the first NDI to have been toggled in response to or due to the previous downlink assignment (and does not determine the second NDI to have been toggled or not toggled based on the previous downlink assignment). The UE could determine whether the second NDI is toggled or not based on (NDI value of) a second previous downlink assignment. The second previous downlink assignment could indicate or schedule multiple TBs. The second previous downlink assignment could be addressed to a C-RNTI.

Additionally and/or alternatively, the UE could determine whether to consider the second NDI (in addition to the first NDI) to have been toggled or not based on at least a TB size of the single TB associated with the previous uplink grant or the previous downlink assignment. Additionally and/or alternatively, the UE could determine whether to consider the second NDI (in addition to the first NDI) to have been toggled or not based on at least whether the single TB shares a same part of a HARQ/soft buffer or overlaps (in HARQ/soft buffer storage) with the second TB associated with the second NDI.

For example, the UE could consider the second NDI (e.g., both the first and the second NDI) to have been toggled in response to the previous uplink grant or the previous downlink assignment if or when the second TB would overwrite or could be overlapped with the single TB in the HARQ/soft buffer in the HARQ process. The UE may not consider the second NDI (e.g., both the first and the second NDI) to have been toggled in response to the previous uplink grant or the previous downlink assignment if or when the second TB would not be overlapped with the single TB in the HARQ/soft buffer in the HARQ process.

In one example, the UE may use a first UL grant for one TB transmission. The UE may transmit a third TB at a first timing using the first UL grant with a first HARQ process. The first UL grant may be a UL grant received for a CS-RNTI or a configured UL grant. The UE may store the third TB into a HARQ buffer for the first HARQ process. Then the UE may receive a second UL grant indicating two TB transmissions. The UE may receive the second UL grant with a first NDI value and a second NDI value. The UE may transmit a first TB and a second TB at a second timing using the second UL grant with the first HARQ process. The UE may consider the first NDI to have been toggled based on the first TB would overwrites or could be overlapped with the third TB in the HARQ buffer of the first HARQ process. The UE may consider the second NDI to have been toggled based on the second TB would overwrite or could be overlapped with the third TB in the HARQ buffer of the first HARQ process.

In one example, the UE may use a first DL assignment for one TB transmission. The UE may receive a third TB at a first timing using the first DL assignment with a first HARQ process. The first DL assignment may be a DL assignment received for a CS-RNTI or Group (G)-CS-RNTI, or a configured downlink assignment for unicast or MBS multicast. The UE may store the third TB into a soft buffer for the first HARQ process. Then the UE may receive a second DL assignment indicating two TB transmissions. The UE may receive the second DL assignment with a first NDI value and a second NDI value. The UE may transmit a first TB and a second TB at a second timing using the second DL assignment with the first HARQ process. The UE may consider the first NDI to have been toggled based on the first TB would overwrite or could be overlapped with the third TB in the soft buffer of the first HARQ process. The UE may consider the second NDI to have been toggled based on the second TB would overwrite or could be overlapped with the third TB in the soft buffer of the first HARQ process.

Various examples and embodiments of the present invention are described below. For the methods, alternatives, concepts, examples, and embodiments detailed above and herein, the following aspects and embodiments are possible.

The UE could be configured with uplink spatial multiplexing (or 8Tx) and/or downlink spatial multiplexing. Throughout the present disclosure, the uplink spatial multiplexing and/or 8Tx may be, be replaced by, be represent by, be referred to as "dual codeword", "maxRank>4" or "maxMIMO-Layers>4". When the UE is configured with uplink spatial multiplexing (or 8Tx UL), the UE may be configured with maxRank>4 and/or maxMIMO-Layers>4.

The UE could be configured with Semi-Persistent Scheduling and/or a configured UL grant.

The first TB (associated with the second UL grant) could share a same storing space (e.g., stored partially or totally overlapped) in the HARQ buffer as the third TB. Additionally and/or alternatively, the second TB associated with the second UL grant may not share a same storing space (stored separately) in the HARQ buffer as the third TB.

Additionally and/or alternatively, the first TB could be transport block 1 (or transport block 2) indicated by and/or associated with (Modulation and a coding scheme, New data indicator, and/or Redundancy version associated with a transport block 1 indicated in) DCI format 0_1 associated with the (second) UL grant. The Modulation and coding scheme, New data indicator, and/or Redundancy version associated with transport block 1 could be a first HARQ information.

Additionally and/or alternatively, the second TB could be transport block 2 (or transport block 1) indicated by and/or associated with (Modulation and coding scheme, New data indicator, and/or Redundancy version associated with transport block 2 indicated in) DCI format 0_1 associated with the (second) UL grant. The Modulation and coding scheme, New data indicator, and/or Redundancy version associated with transport block 2 could be a second HARQ information.

Example text proposals for [1] 3GPP TS 36.321 V15.11.0 are shown below and one or multiple text proposals could be adopted to achieve the present invention (additions/modifications shown with underlining):

- - - Example 1 Start - - -

5.3.1 DL Assignment Reception

Downlink assignments received on the PDCCH both indicate that there is a transmission on a DL-SCH for a particular MAC entity and provide the relevant HARQ information.

. . .

When the MAC entity has a C-RNTI, Temporary C-RNTI, CS-RNTI, G-RNTI or G-CS-RNTI, the MAC entity shall for each PDCCH occasion during which it monitors PDCCH and for each Serving Cell:
1> if a downlink assignment for this PDCCH occasion and this Serving Cell has been received on the PDCCH for the MAC entity's C-RNTI, or Temporary C-RNTI, or G-RNTI configured for multicast MTCH:
2> if this is the first downlink assignment for this Temporary C-RNTI:
3> consider the NDI to have been toggled.
2> if the downlink assignment is for the MAC entity's C-RNTI, and if the previous downlink assignment indicated to the HARQ entity of the same HARQ process was either a downlink assignment received for the MAC entity's CS-RNTI or G-CS-RNTI, or a configured downlink assignment for unicast or MBS multicast; or
2> if the downlink assignment is for the MAC entity's G-RNTI configured for multicast MTCH, and if the previous downlink assignment indicated to the HARQ entity of the same HARQ process was either a downlink assignment received for the MAC entity's CS-RNTI or G-CS-RNTI, or other G-RNTI, or C-RNTI, or a configured downlink assignment for unicast or MBS multicast:
3> consider the NDI(s) to have been toggled regardless of the value of the NDI.

- - - Example 1 End - - -

- - - Example 2 Start - - -

5.3.1 DL Assignment Reception

Downlink assignments received on the PDCCH both indicate that there is a transmission on a DL-SCH for a particular MAC entity and provide the relevant HARQ information.

. . .

When the MAC entity has a C-RNTI, Temporary C-RNTI, CS-RNTI, G-RNTI or G-CS-RNTI, the MAC entity shall for each PDCCH occasion during which it monitors PDCCH and for each Serving Cell:
1> if a downlink assignment for this PDCCH occasion and this Serving Cell has been received on the PDCCH for the MAC entity's C-RNTI, or Temporary C-RNTI, or G-RNTI configured for multicast MTCH:
2> if this is the first downlink assignment for this Temporary C-RNTI:
3> consider the NDI to have been toggled.
2> if the downlink assignment is for the MAC entity's C-RNTI, and if the previous downlink assignment indicated to the HARQ entity of the same HARQ process was either a downlink assignment received for the MAC entity's CS-RNTI or G-CS-RNTI, or a configured downlink assignment for unicast or MBS multicast; or
2> if the downlink assignment is for the MAC entity's G-RNTI configured for multicast MTCH, and if the previous downlink assignment indicated to the HARQ entity of the same HARQ process was either a downlink assignment received for the MAC entity's CS-RNTI or G-CS-RNTI, or other G-RNTI, or C-RNTI, or a configured downlink assignment for unicast or MBS multicast:
3> consider the NDI of the TB (corresponding to the previous downlink assignement) to have been toggled regardless of the value of the NDI.

- - - Example 2 End - - -

- - - Example 3 Start - - -

5.4.1 UL Grant Reception
1> if an uplink grant for this Serving Cell has been received on the PDCCH for the MAC entity's C-RNTI or Temporary C-RNTI; or
1> if an uplink grant has been received in a Random Access Response:
2> if the uplink grant is for MAC entity's C-RNTI and if the previous uplink grant delivered to the HARQ entity for the same HARQ process was either an uplink grant received for the MAC entity's CS-RNTI or a configured uplink grant:
3> consider the NDI(s) to have been toggled for the corresponding HARQ process regardless of the value of the NDI.

- - - Example 3 End - - -

- - - Example 4 Start - - -

5.4.1 UL Grant Reception
1> if an uplink grant for this Serving Cell has been received on the PDCCH for the MAC entity's C-RNTI or Temporary C-RNTI; or 1> if an uplink grant has been received in a Random Access Response:
2> if the uplink grant is for MAC entity's C-RNTI and if the previous uplink grant delivered to the HARQ entity for the same HARQ process was either an uplink grant received for the MAC entity's CS-RNTI or a configured uplink grant:
3> consider the NDI of the TB (corresponding to the previous uplink grant) to have been toggled for the corresponding HARQ process regardless of the value of the NDI.

- - - Example 4 End - - -

All concepts, examples, aspects, alternatives, and embodiments above (e.g., for the first concept) could be combined into one or more new concepts, examples, aspects, alternatives, and embodiments, in whole or in part.

Figure 10:
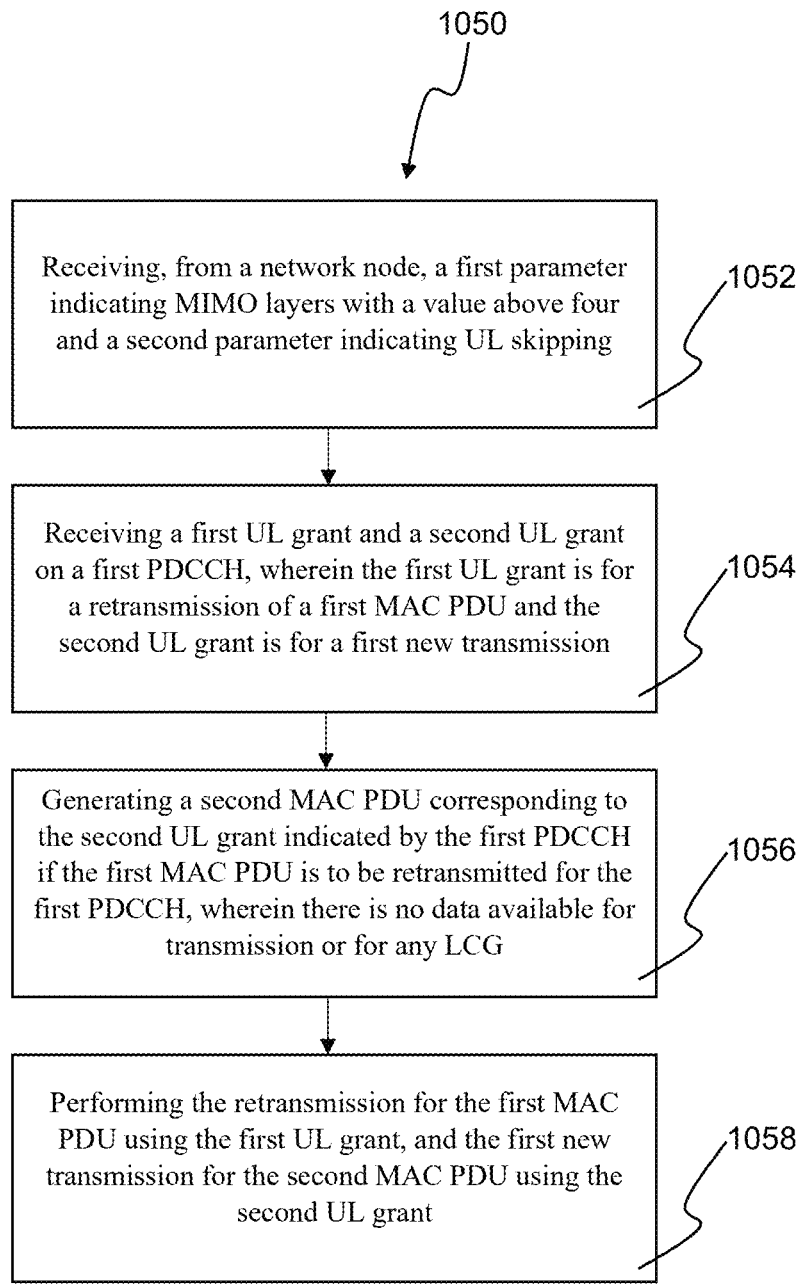
FIG. 10 is a flow diagram of a method of a UE in a wireless communication system comprising receiving, from a network node, a first parameter indicating MIMO layers with a value above four and a second parameter indicating UL skipping, receiving a first UL grant and a second UL grant on a first PDCCH, generating a second MAC PDU corresponding to the second UL grant indicated by the first PDCCH if a first MAC PDU is to be retransmitted for the first PDCCH, and performing the retransmission for the first MAC PDU using the first UL grant, and the first new transmission for the second MAC PDU using the second UL grant, in accordance with embodiments of the present invention.

Referring to FIG. 10, with this and other concepts, systems, and methods of the present invention, a method 1050 for a UE in a wireless communication system comprises receiving, from a network node, a first parameter indicating MIMO layers with a value above four and a second parameter indicating UL skipping (step 1052), receiving a first UL grant and a second UL grant on a first PDCCH, wherein the first UL grant is for a retransmission of a first MAC PDU and the second UL grant is for a first new transmission (step 1054), generating a second MAC PDU corresponding to the second UL grant indicated by the first PDCCH if the first MAC PDU is to be retransmitted for the first PDCCH, wherein there is no data available for transmission or for any LCG (step 1056), and performing the retransmission for the first MAC PDU using the first UL grant, and the first new transmission for the second MAC PDU using the second UL grant (step 1058).

In various embodiments, the second MAC PDU comprises a zero MAC SDU.

In various embodiments, the first MAC PDU is generated before receiving the first PDCCH.

In various embodiments, the first PDCCH indicates a first NDI for the first UL grant, a second NDI for the second UL grant, and/or UL transmissions for two TBs.

In various embodiments, the first NDI is not toggled and the second NDI is toggled.

In various embodiments, there is no aperiodic CSI requested for a PUSCH transmission of the first new transmission and the retransmission, and/or there is no UCI to be multiplexed for the PUSCH transmission of the first new transmission and the retransmission.

In various embodiments, the first parameter indicating the MIMO layers is maxRank or maxMIMO-Layers, and the second parameter indicating UL skipping is skipUplinkTx-Dynamic or enhancedSkipUplinkTxDynamic.

In various embodiments, the method further comprises receiving a third UL grant for a second new transmission on a second PDCCH for the first MAC PDU before receiving the first PDCCH.

In various embodiments, the second PDCCH indicates a third NDI for the third UL grant, wherein the third NDI is toggled.

In various embodiments, the method further comprises: receiving a fourth UL grant for a third new transmission and a fifth UL grant for a fourth new transmission on a third PDCCH, and not generating one or more MAC PDUs for the fourth UL grant and the fifth UL grant if there is no data available for transmission or for any LCG.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive, from a network node, a first parameter indicating MIMO layers with a value above four and a second parameter indicating UL skipping; (ii) receive a first UL grant and a second UL grant on a first PDCCH, wherein the first UL grant is for a retransmission of a first MAC PDU and the second UL grant is for a first new transmission; (iii) generate a second MAC PDU corresponding to the second UL grant indicated by the first PDCCH if the first MAC PDU is to be retransmitted for the first PDCCH, wherein there is no data available for transmission or for any LCG; and (iv) perform the retransmission for the first MAC PDU using the first UL grant, and the first new transmission for the second MAC PDU using the second UL grant. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
    receiving, from a network node, a first parameter indicating Multi-Input Multi-Output (MIMO) layers with a value above four and a second parameter indicating Uplink (UL) skipping;
    receiving a first UL grant and a second UL grant on a first Physical Downlink Control Channel (PDCCH), wherein the first UL grant is for a retransmission of a first Medium Access Control (MAC) Protocol Data Unit (PDU) and the second UL grant is for a first new transmission;
    generating a second MAC PDU corresponding to the second UL grant indicated by the first PDCCH if the first MAC PDU is to be retransmitted for the first PDCCH, wherein there is no data available for transmission or for any Logical Channel Group (LCG); and
    performing the retransmission for the first MAC PDU using the first UL grant, and the first new transmission for the second MAC PDU using the second UL grant.

2. The method of claim 1, wherein the second MAC PDU comprises a zero MAC Service Data Unit (SDU).

3. The method of claim 1, wherein the first MAC PDU is generated before receiving the first PDCCH.

4. The method of claim 1, wherein the first PDCCH indicates a first New Data Indicator (NDI) for the first UL grant, a second NDI for the second UL grant, and/or UL transmissions for two Transport Blocks (TBs).

5. The method of claim 4, wherein the first NDI is not toggled and the second NDI is toggled.

6. The method of claim 1, wherein:
    there is no aperiodic Channel State Information (CSI) requested for a Physical Uplink Shared Channel (PUSCH) transmission of the first new transmission and the retransmission, and/or
    there is no Uplink Control Information (UCI) to be multiplexed for the PUSCH transmission of the first new transmission and the retransmission.

7. The method of claim 1, wherein the first parameter indicating the MIMO layers is maxRank or maxMIMO-Layers, and the second parameter indicating UL skipping is skipUplinkTxDynamic.

8. The method of claim 1, further comprising receiving a third UL grant for a second new transmission on a second PDCCH for the first MAC PDU before receiving the first PDCCH.

9. The method of claim 8, wherein the second PDCCH indicates a third NDI for the third UL grant, wherein the third NDI is toggled.

10. The method of claim 1, further comprising:
    receiving a fourth UL grant for a third new transmission and a fifth UL grant for a fourth new transmission on a third PDCCH; and not generating one or more MAC PDUs for the fourth UL grant and the fifth UL grant if there is no data available for transmission or for any LCG.

11. A User Equipment (UE), comprising:
a memory; and
a processor operatively coupled with the memory, wherein the processor is configured to execute a program code to:
receive, from a network node, a first parameter indicating Multi-Input Multi-Output (MIMO) layers with a value above four and a second parameter indicating Uplink (UL) skipping;
receive a first UL grant and a second UL grant on a first Physical Downlink Control Channel (PDCCH), wherein the first UL grant is for a retransmission of a first Medium Access Control (MAC) Protocol Data Unit (PDU) and the second UL grant is for a first new transmission;
generate a second MAC PDU corresponding to the second UL grant indicated by the first PDCCH if the first MAC PDU is to be retransmitted for the first PDCCH, wherein there is no data available for transmission or for any Logical Channel Group (LCG); and
perform the retransmission for the first MAC PDU using the first UL grant, and the first new transmission for the second MAC PDU using the second UL grant.

12. The UE of claim 11, wherein the second MAC PDU comprises a zero MAC Service Data Unit (SDU).

13. The UE of claim 11, wherein the first MAC PDU is generated before receiving the first PDCCH.

14. The UE of claim 11, wherein the first PDCCH indicates a first New Data Indicator (NDI) for the first UL grant, a second NDI for the second UL grant, and/or UL transmissions for two Transport Blocks (TBs).

15. The UE of claim 14, wherein the first NDI is not toggled and the second NDI is toggled.

16. The UE of claim 11, wherein:
there is no aperiodic Channel State Information (CSI) requested for a Physical Uplink Shared Channel (PUSCH) transmission of the first new transmission and the retransmission, and/or
there is no Uplink Control Information (UCI) to be multiplexed for the PUSCH transmission of the first new transmission and the retransmission.

17. The UE of claim 11, wherein the first parameter indicating the MIMO layers is maxRank or maxMIMO-Layers, and the second parameter indicating UL skipping is skipUplinkTxDynamic.

18. The UE of claim 11, wherein the processor is further configured to execute the program code to: receive a third UL grant for a second new transmission on a second PDCCH for the first MAC PDU before receiving the first PDCCH.

19. The UE of claim 18, wherein the second PDCCH indicates a third NDI for the third UL grant, wherein the third NDI is toggled.

20. The UE of claim 11, wherein the processor is further configured to execute the program code to:
receive a fourth UL grant for a third new transmission and a fifth UL grant for a fourth new transmission on a third PDCCH; and
not generate one or more MAC PDUs for the fourth UL grant and the fifth UL grant if there is no data available for transmission or for any LCG.

* * * * *